United States Patent
Hyde et al.

(10) Patent No.: US 9,323,499 B2
(45) Date of Patent: Apr. 26, 2016

(54) RANDOM NUMBER GENERATOR FUNCTIONS IN MEMORY

(71) Applicant: Elwha LLC, a limited liability corporation of the State of Delaware, Bellevue, WA (US)

(72) Inventors: Roderick A. Hyde, Redmond, WA (US); Nicholas F. Pasch, Bellevue, WA (US); Clarence T. Tegreene, Mercer Island, WA (US)

(73) Assignee: Elwha LLC, Bellevue, WA (US)

( * ) Notice: Subject to any disclaimer, the term of this patent is extended or adjusted under 35 U.S.C. 154(b) by 353 days.

(21) Appl. No.: 13/725,788

(22) Filed: Dec. 21, 2012

(65) Prior Publication Data

US 2014/0136583 A1 May 15, 2014

Related U.S. Application Data

(63) Continuation-in-part of application No. 13/691,448, filed on Nov. 30, 2012, which is a continuation-in-part of application No. 13/687,983, filed on Nov. 28, 2012, which is a continuation-in-part of application No. 13/678,439, filed on Nov. 15, 2012, which is a continuation-in-part of application No. 13/678,430, filed on Nov. 15, 2012.

(51) Int. Cl.
*G06F 7/58* (2006.01)
(52) U.S. Cl.
CPC ..................................... *G06F 7/588* (2013.01)
(58) Field of Classification Search
None
See application file for complete search history.

(56) References Cited

U.S. PATENT DOCUMENTS

| | | | |
|---|---|---|---|
| 5,303,163 A | 4/1994 | Ebaugh et al. | |
| 5,533,123 A | 7/1996 | Force et al. | |
| 6,366,117 B1 | 4/2002 | Pang et al. | |
| 6,708,273 B1 | 3/2004 | Ober et al. | |
| 7,100,071 B2 | 8/2006 | Olarig | |
| 7,133,498 B2 | 11/2006 | Cacioppo et al. | |
| 7,195,776 B2 | 3/2007 | Helmus | |
| 7,203,842 B2 | 4/2007 | Kean | |
| 7,890,691 B2 | 2/2011 | Jiang | |
| 7,996,642 B1 | 8/2011 | Smith | |
| 8,015,357 B2 | 9/2011 | Strumper et al. | |
| 8,171,204 B2 | 5/2012 | Chow et al. | |
| 8,572,311 B1 | 10/2013 | Shalvi et al. | |
| 8,880,980 B1 * | 11/2014 | Mathew et al. | 714/764 |
| 8,893,267 B1 | 11/2014 | Sathe et al. | |
| 8,935,493 B1 | 1/2015 | Dolan et al. | |
| 2002/0114201 A1 | 8/2002 | Aikawa et al. | |
| 2003/0071734 A1 | 4/2003 | Vodin | |
| 2003/0072190 A1 | 4/2003 | Miki et al. | |
| 2004/0015674 A1 | 1/2004 | Lakhani et al. | |
| 2004/0039845 A1 | 2/2004 | Feldmeier et al. | |
| 2004/0236954 A1 | 11/2004 | Vogt et al. | |
| 2006/0155922 A1 | 7/2006 | Gorobets et al. | |
| 2006/0219776 A1 | 10/2006 | Finn | |
| 2006/0259848 A1 | 11/2006 | Blevins | |
| 2006/0282644 A1 | 12/2006 | Wong | |

(Continued)

*Primary Examiner* — David H Malzahn

(57) ABSTRACT

A memory device includes but is not limited to a substrate, a non-volatile memory array integrated on the substrate, and random number generator logic integrated with the non-volatile memory array on the substrate. The random number generator logic is operable to perform at least one random number generator function in association with the non-volatile memory array. In addition to the foregoing, other aspects are described in the claims, drawings, and text forming a part of the present disclosure.

36 Claims, 36 Drawing Sheets

(56) References Cited

U.S. PATENT DOCUMENTS

| | | |
|---|---|---|
| 2007/0033374 A1 | 2/2007 | Sinclair et al. |
| 2007/0045425 A1 | 3/2007 | Yoshida et al. |
| 2007/0100219 A1 | 5/2007 | Sweitzer et al. |
| 2007/0121575 A1 | 5/2007 | Savry et al. |
| 2007/0129812 A1 | 6/2007 | Ferchau |
| 2007/0136534 A1 | 6/2007 | Mesard et al. |
| 2007/0191728 A1 | 8/2007 | Shennib |
| 2007/0234323 A1 | 10/2007 | Franaszek et al. |
| 2007/0255184 A1 | 11/2007 | Shennib |
| 2007/0294494 A1 | 12/2007 | Conti et al. |
| 2008/0082766 A1 | 4/2008 | Okin et al. |
| 2008/0144349 A1 | 6/2008 | Kato et al. |
| 2008/0193133 A1* | 8/2008 | Krug et al. .................. 398/83 |
| 2008/0263117 A1* | 10/2008 | Rose et al. .................. 708/254 |
| 2009/0049111 A1* | 2/2009 | Chari et al. .................. 708/254 |
| 2009/0103379 A1 | 4/2009 | Zhang et al. |
| 2009/0165086 A1* | 6/2009 | Trichina et al. .................. 726/2 |
| 2009/0172342 A1 | 7/2009 | Wong |
| 2009/0234916 A1 | 9/2009 | Cosentino et al. |
| 2009/0292871 A1 | 11/2009 | Watanabe et al. |
| 2009/0300238 A1 | 12/2009 | Panabaker et al. |
| 2010/0011261 A1 | 1/2010 | Cagno et al. |
| 2010/0027788 A1* | 2/2010 | Tkacik et al. .................. 380/46 |
| 2010/0049751 A1 | 2/2010 | Giampaolo et al. |
| 2010/0064111 A1 | 3/2010 | Kunimatsu et al. |
| 2010/0070549 A1* | 3/2010 | Nagaraj .................. 708/254 |
| 2010/0115330 A1 | 5/2010 | Khatri et al. |
| 2010/0148232 A1 | 6/2010 | Ng et al. |
| 2010/0228912 A1 | 9/2010 | Huang et al. |
| 2010/0241798 A1 | 9/2010 | Wong |
| 2010/0262773 A1 | 10/2010 | Borchers et al. |
| 2010/0293317 A1 | 11/2010 | Confalonieri et al. |
| 2011/0022932 A1 | 1/2011 | Radke |
| 2011/0093670 A1 | 4/2011 | Cherian |
| 2011/0093675 A1 | 4/2011 | Lu et al. |
| 2011/0172498 A1 | 7/2011 | Olsen et al. |
| 2011/0224665 A1 | 9/2011 | Crosby et al. |
| 2011/0307651 A1 | 12/2011 | Wong |
| 2012/0079318 A1 | 3/2012 | Colgrove et al. |
| 2012/0147937 A1 | 6/2012 | Goss et al. |
| 2012/0166759 A1 | 6/2012 | Wong |
| 2012/0172085 A1 | 7/2012 | Vuppu et al. |
| 2012/0179735 A1* | 7/2012 | Ferguson et al. .................. 708/254 |
| 2012/0198152 A1 | 8/2012 | Terry et al. |
| 2012/0224425 A1 | 9/2012 | Fai et al. |
| 2012/0233231 A1* | 9/2012 | Vasyltsov et al. .................. 708/250 |
| 2012/0233232 A1* | 9/2012 | Vergnes et al. .................. 708/251 |
| 2012/0260023 A1 | 10/2012 | Nagai et al. |
| 2012/0265923 A1 | 10/2012 | Kuo et al. |
| 2012/0278584 A1 | 11/2012 | Nagami et al. |
| 2012/0311237 A1 | 12/2012 | Park |
| 2013/0007374 A1 | 1/2013 | Cain, III et al. |
| 2013/0013864 A1 | 1/2013 | Chung et al. |
| 2013/0290792 A1* | 10/2013 | Torla et al. .................. 714/49 |
| 2013/0304979 A1 | 11/2013 | Zimmer et al. |
| 2013/0332705 A1 | 12/2013 | Martinez et al. |
| 2014/0006898 A1 | 1/2014 | Sharon et al. |
| 2014/0040338 A1* | 2/2014 | Van Der Sluis et al. ...... 708/254 |
| 2014/0040532 A1 | 2/2014 | Watanabe et al. |
| 2014/0104966 A1 | 4/2014 | Oh et al. |
| 2014/0136583 A1* | 5/2014 | Hyde .................. G06F 7/588 708/250 |
| 2014/0143593 A1 | 5/2014 | Strauss et al. |

* cited by examiner

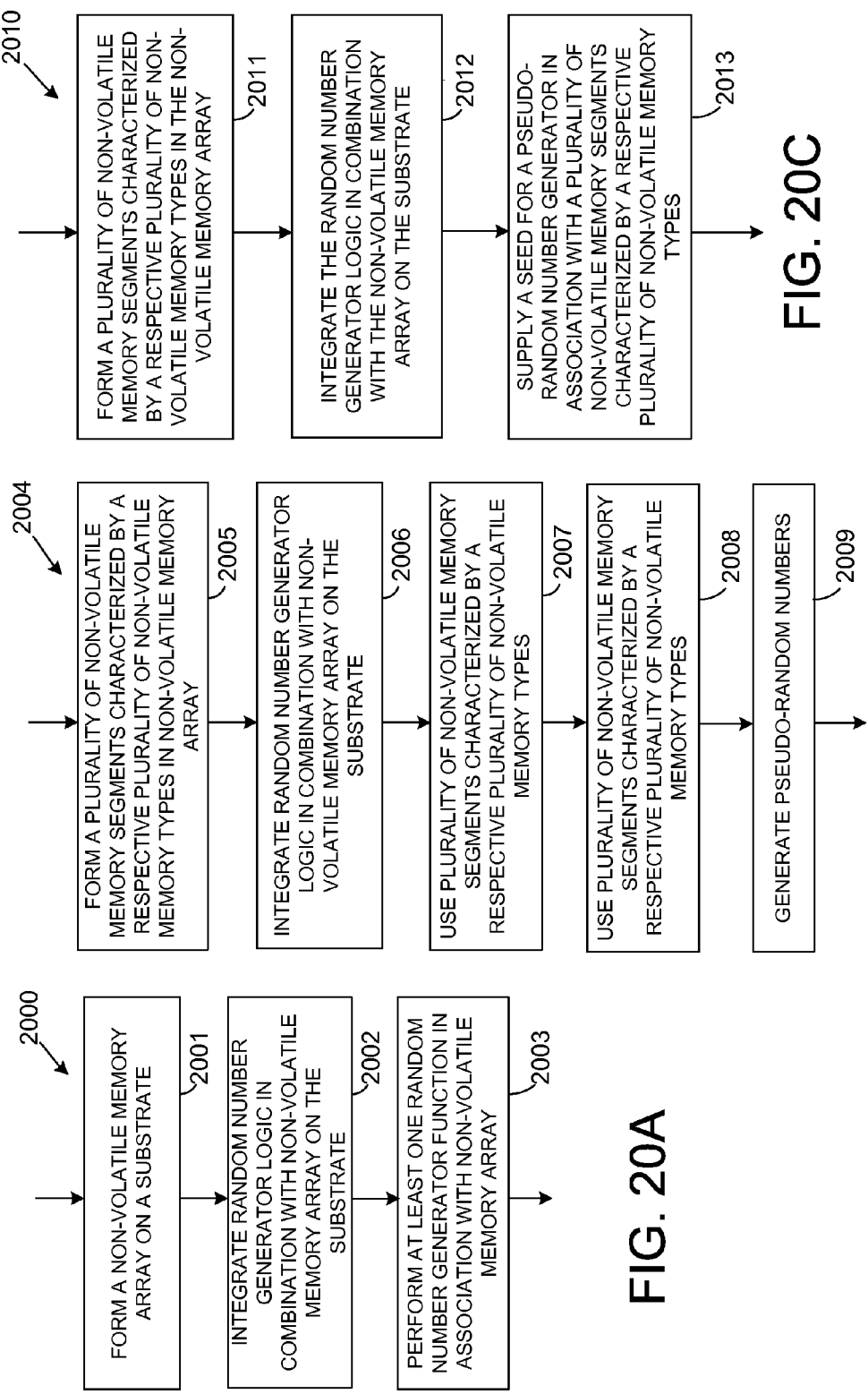

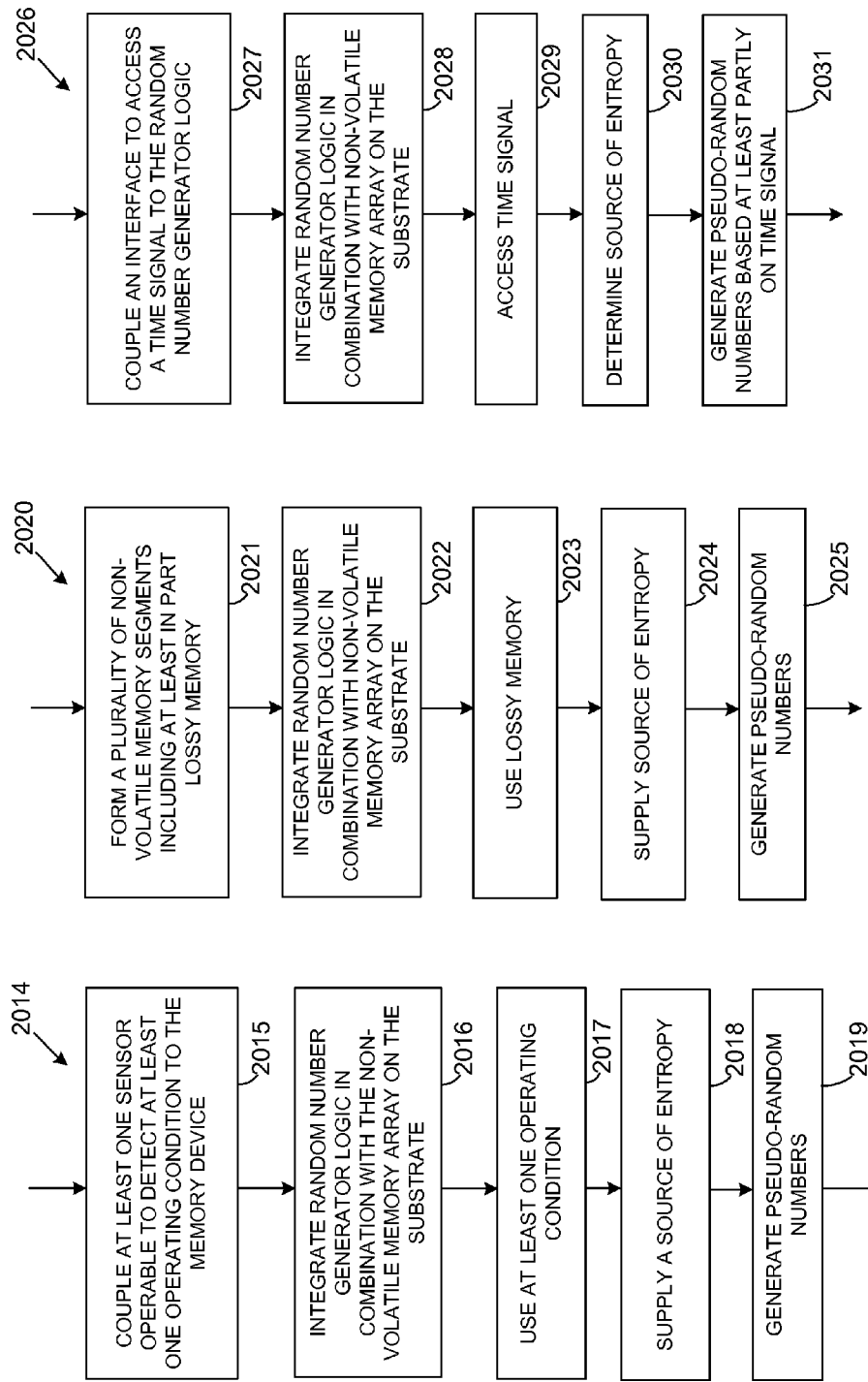

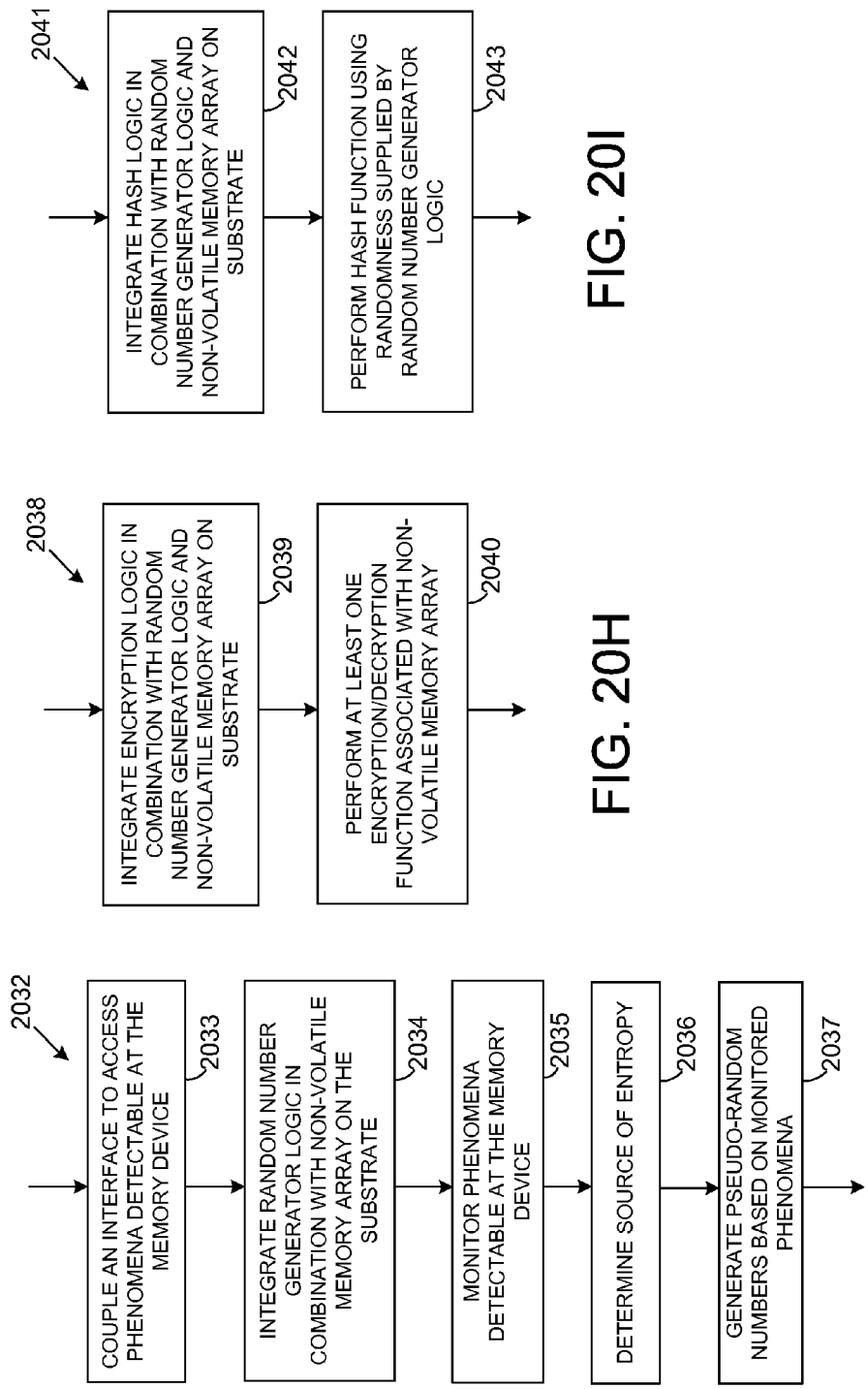

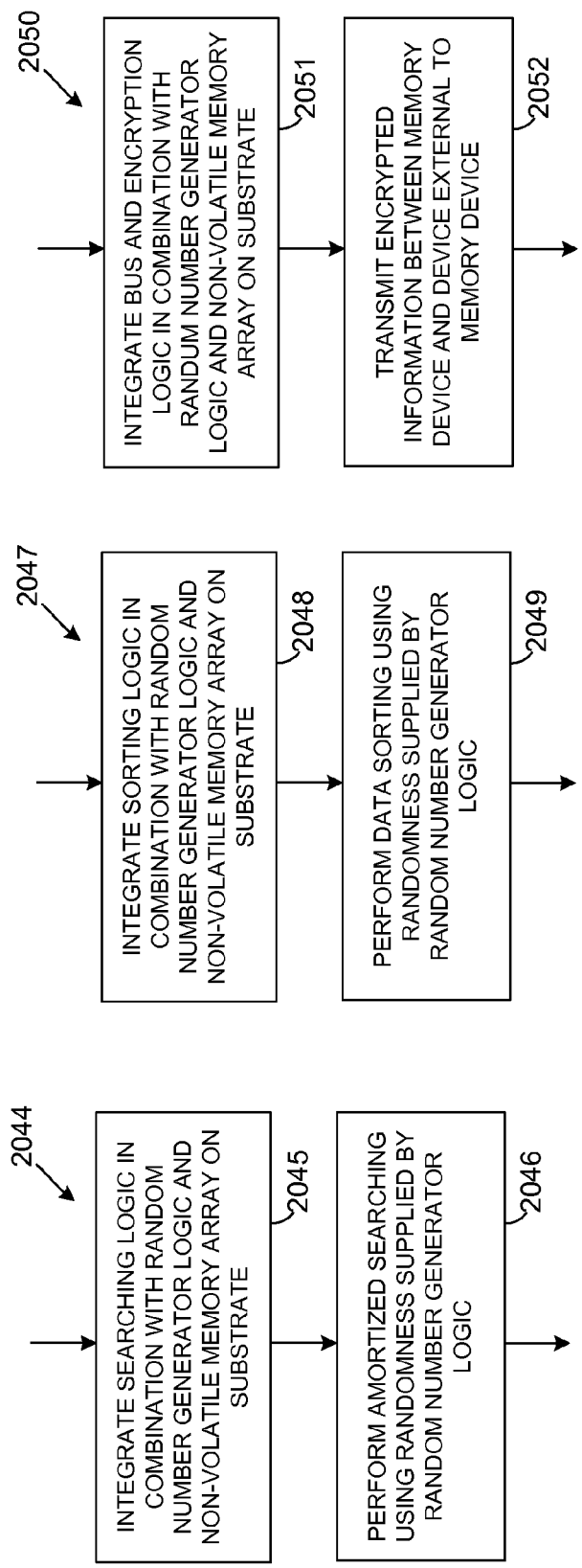

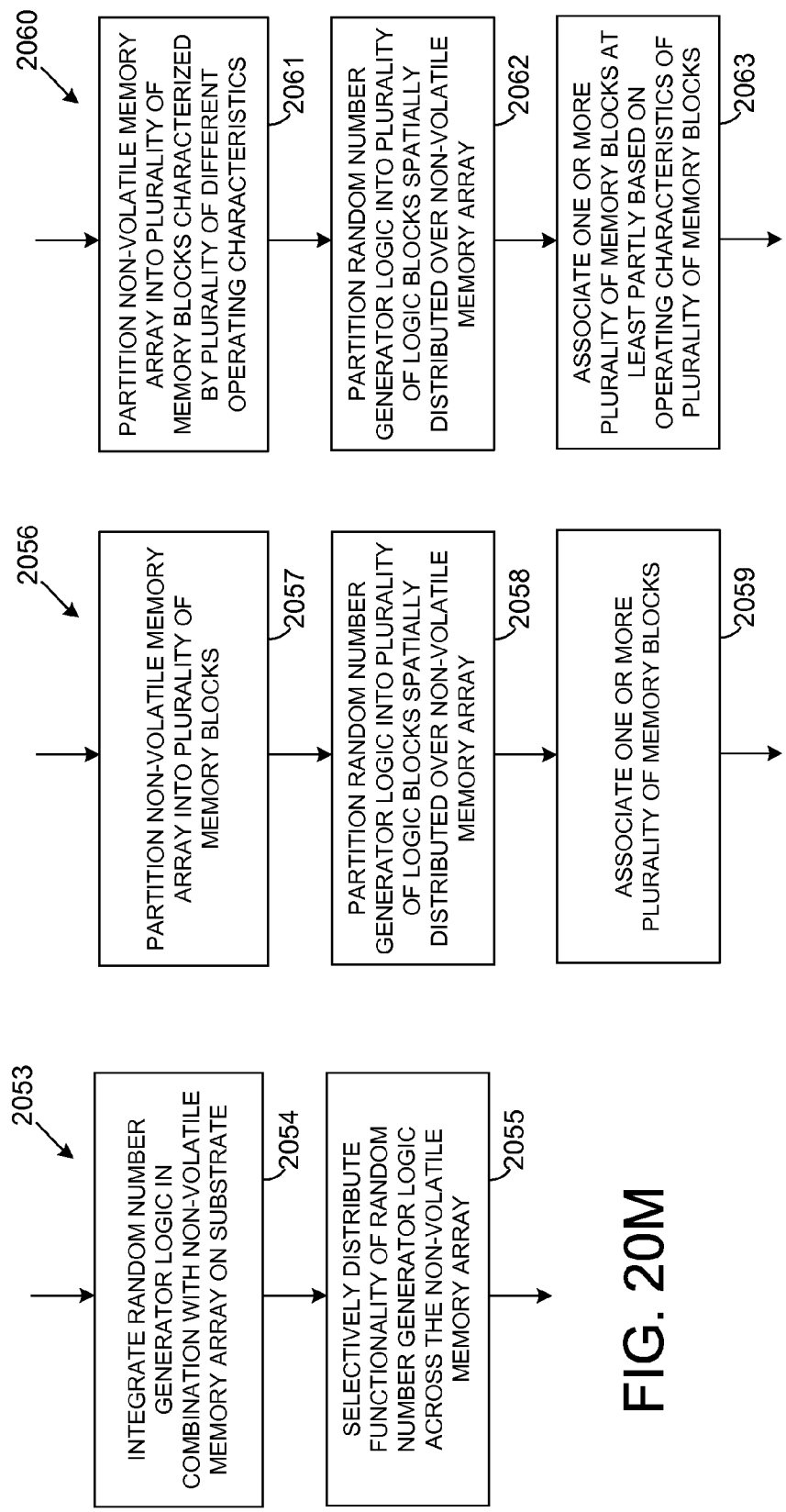

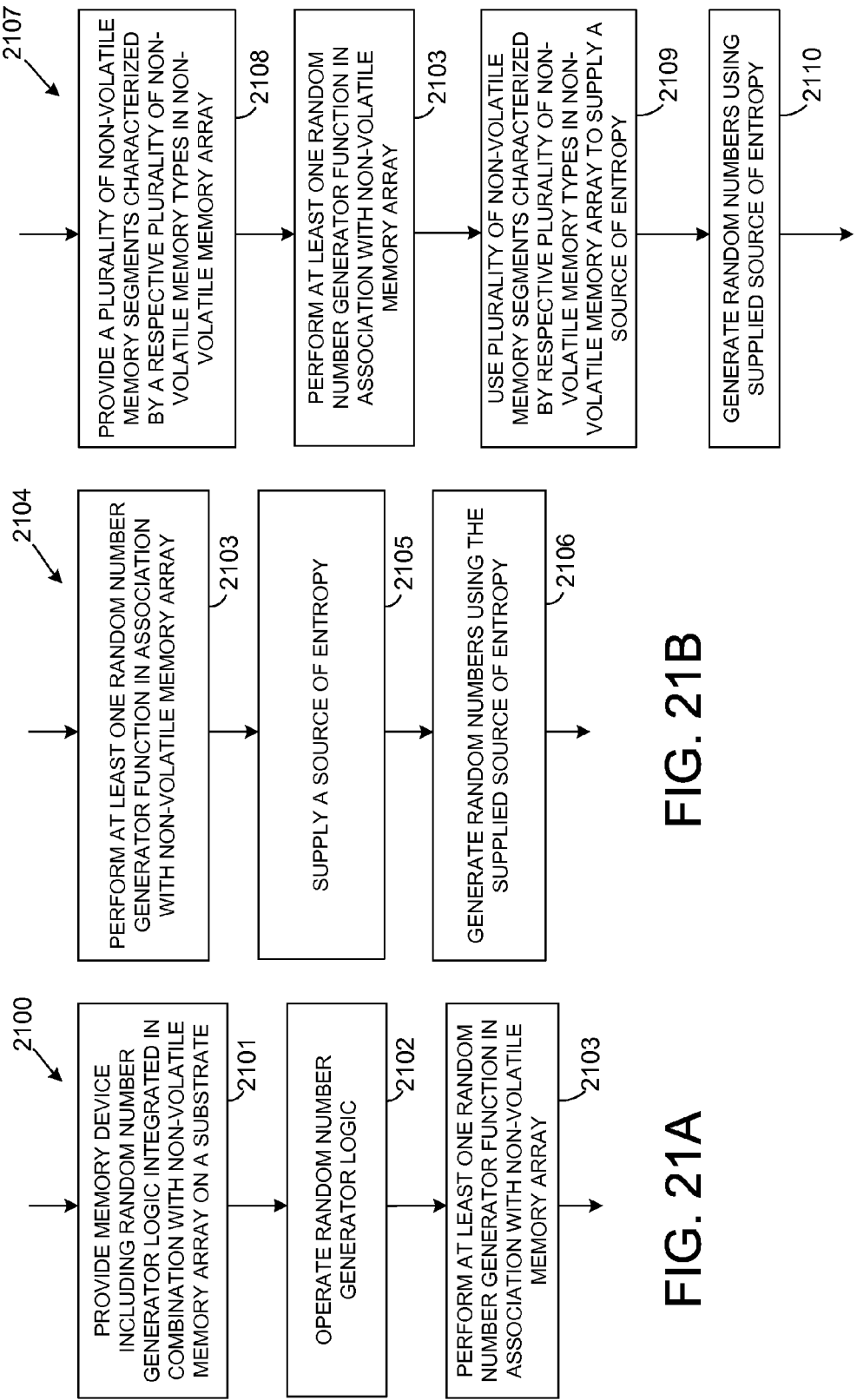

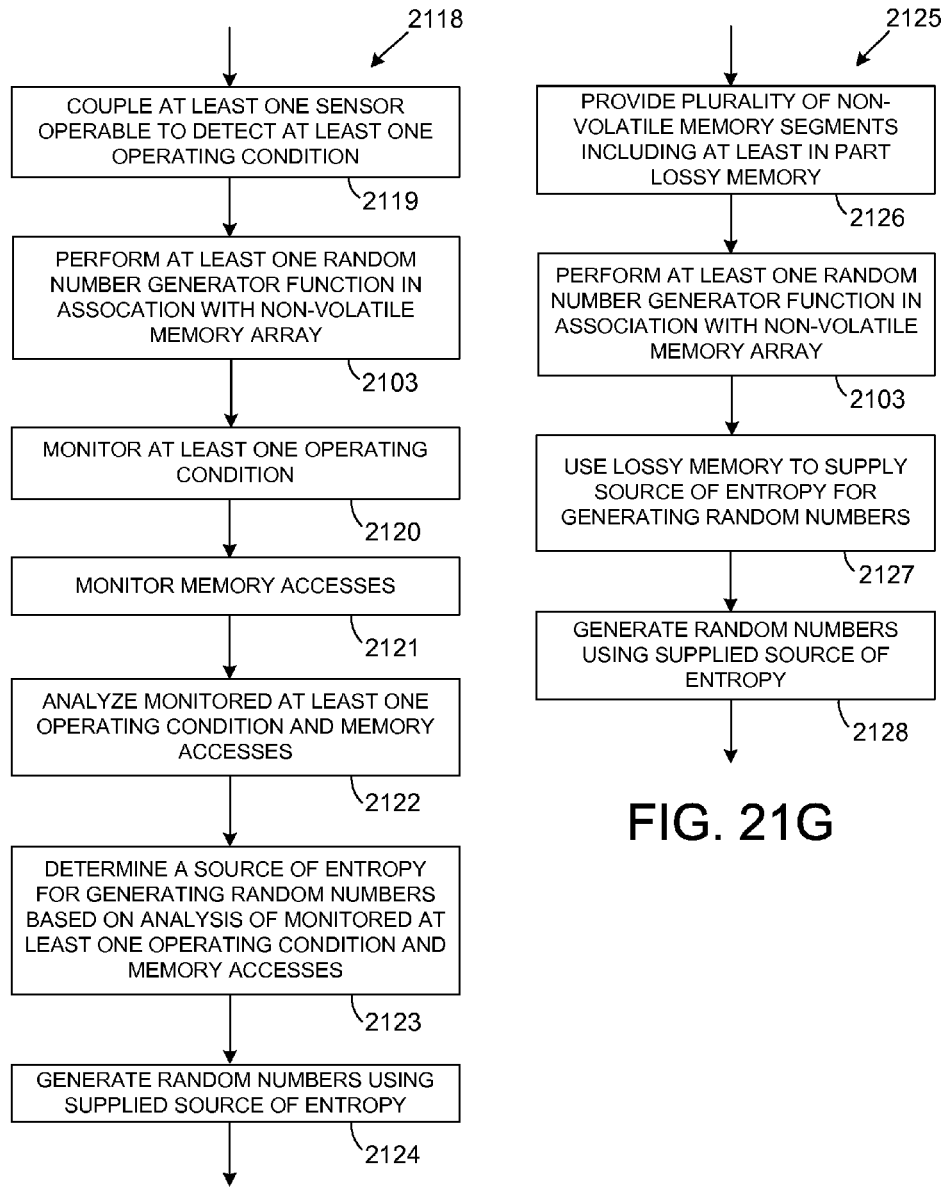

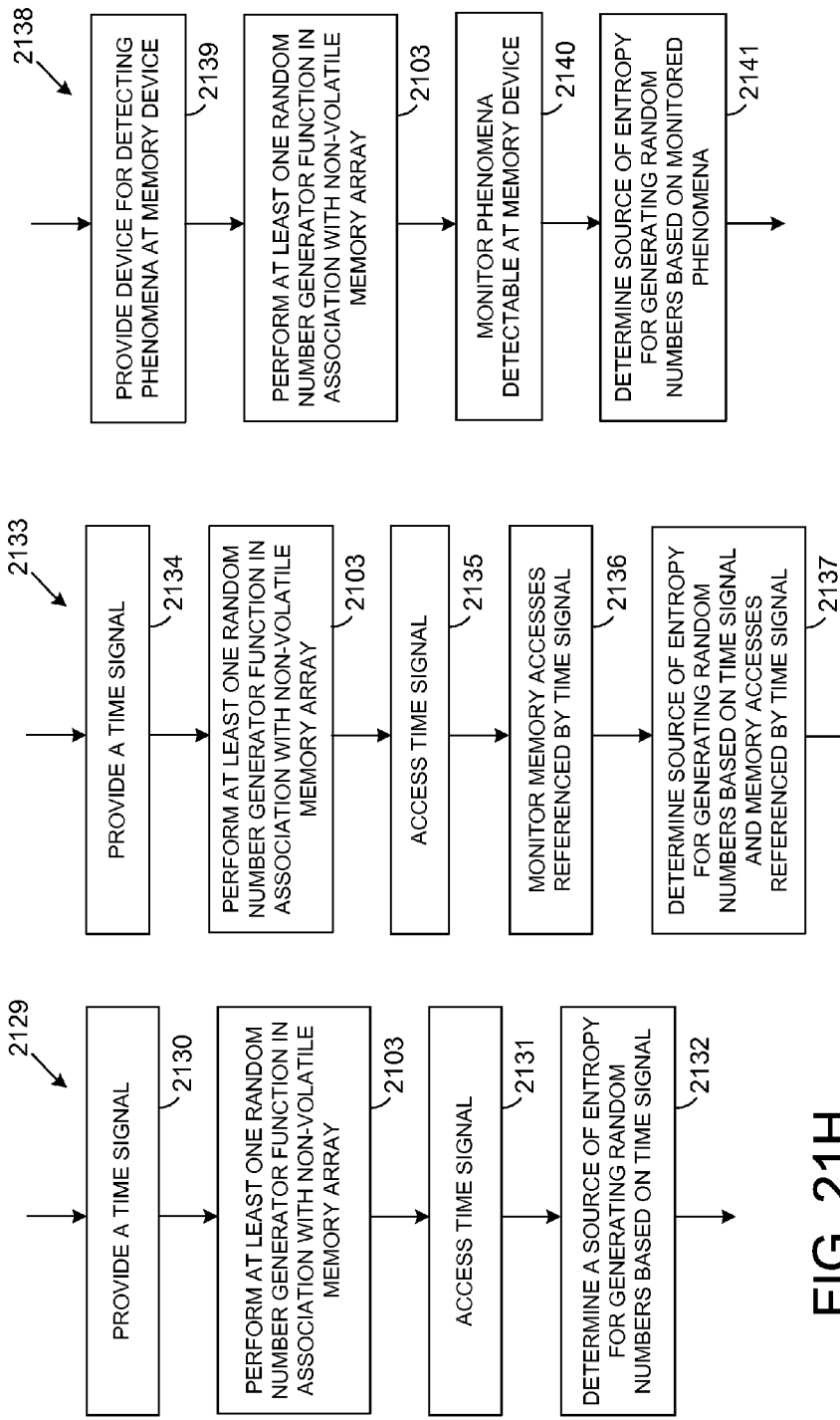

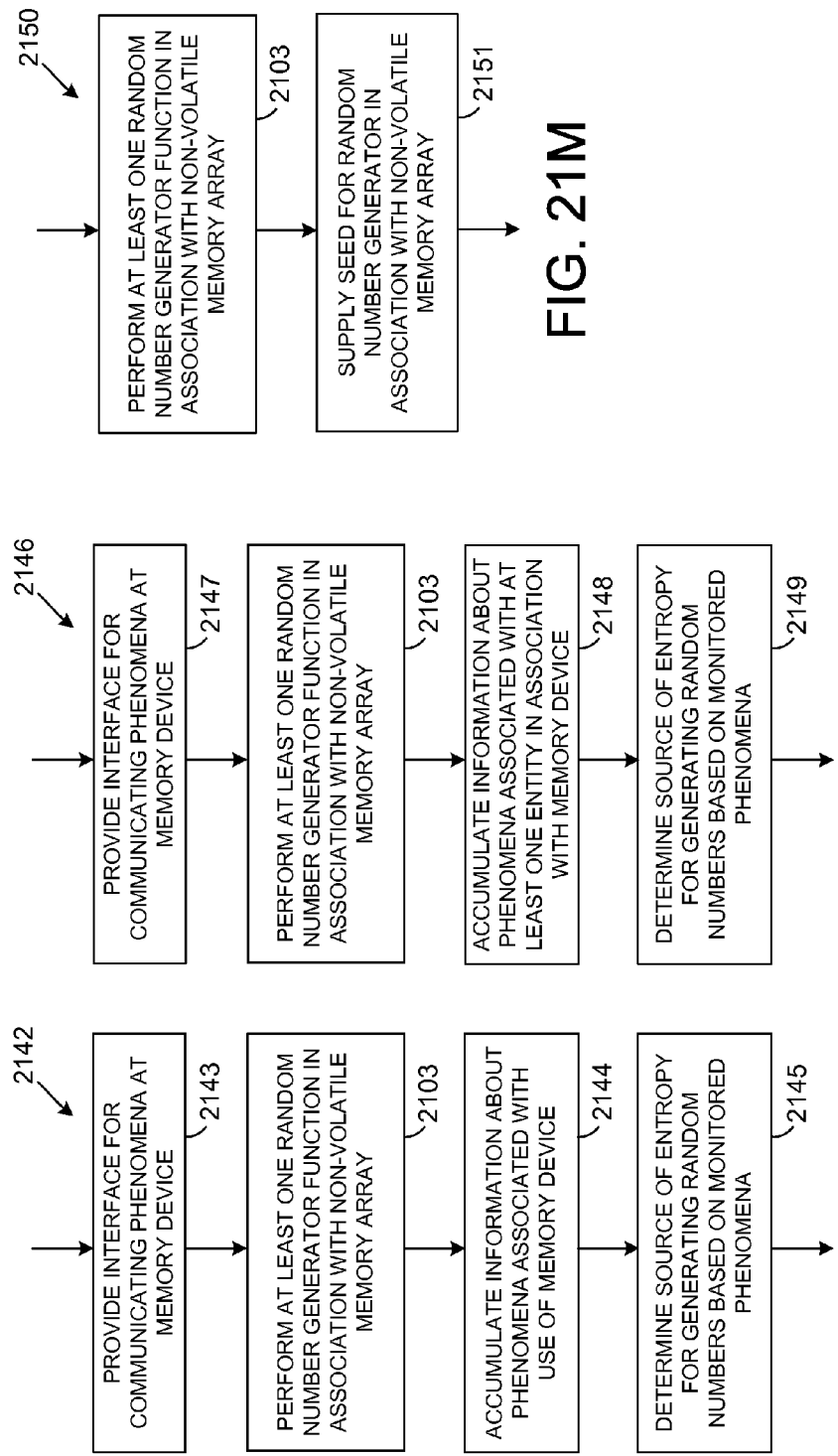

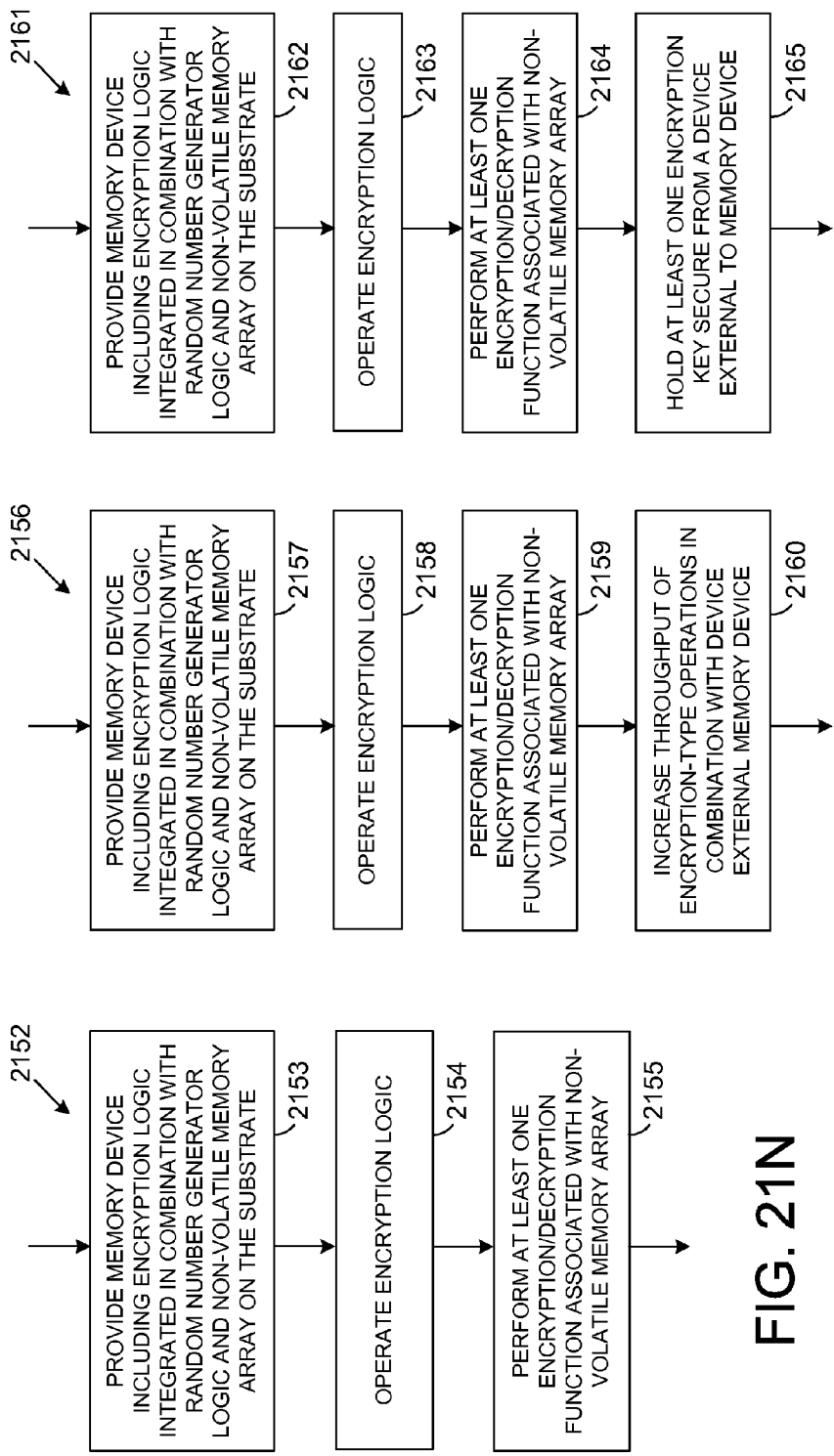

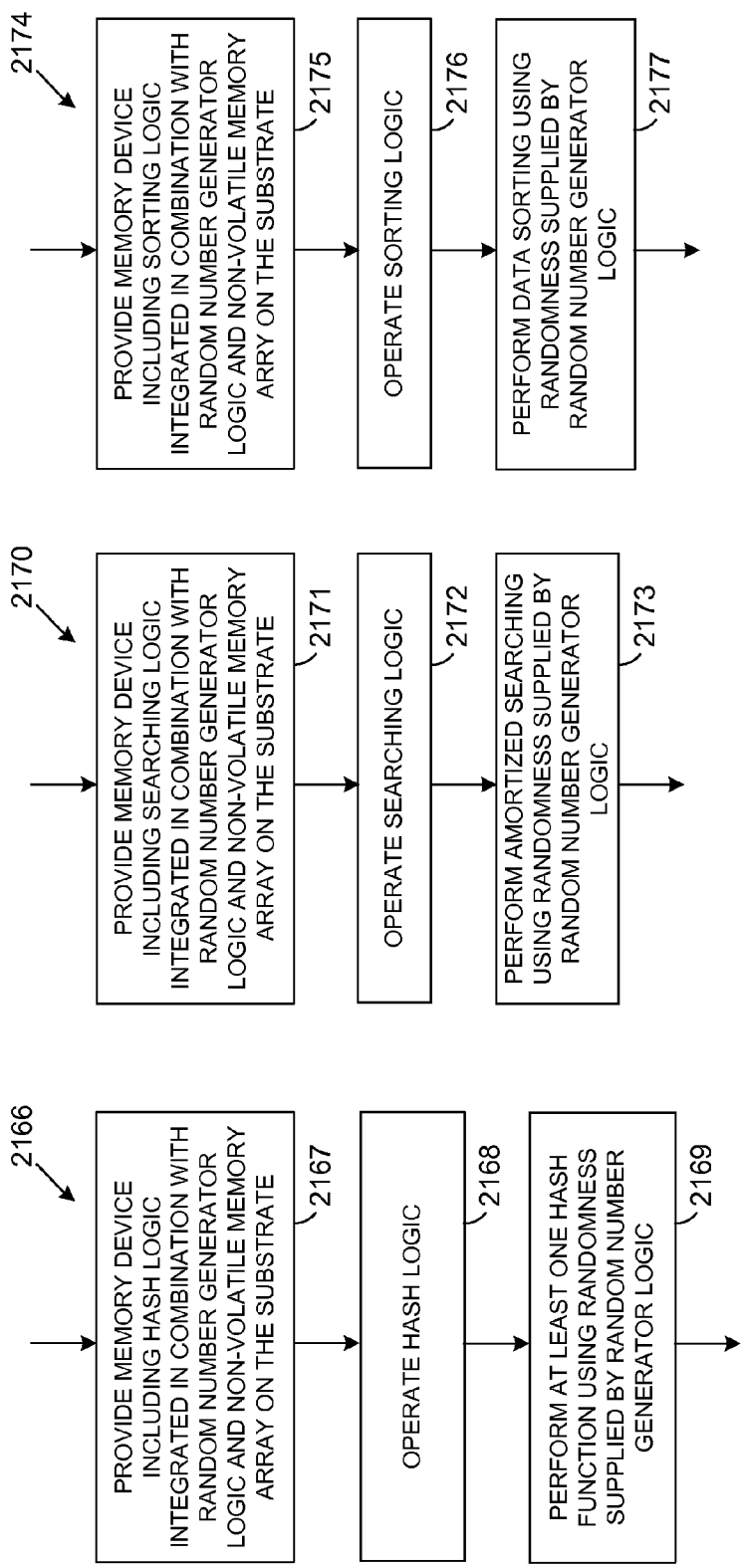

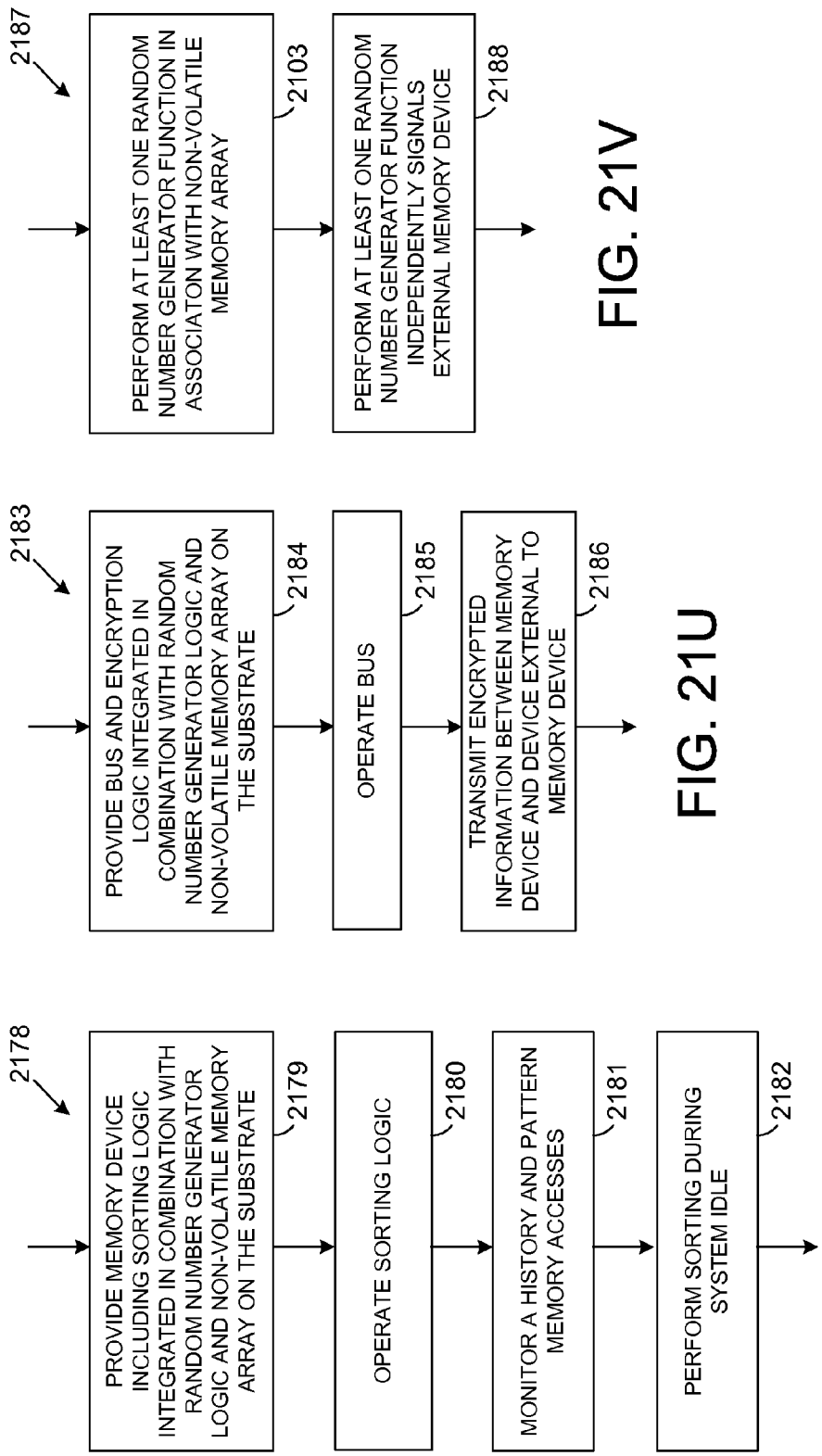

RANDOM NUMBER GENERATOR FUNCTIONS IN MEMORY

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

Priority Applications:

For purposes of the USPTO extra-statutory requirements, the present application constitutes a continuation-in-part of U.S. patent application Ser. No. 13/678,430 entitled Intelligent Monitoring for Computation in Memory, naming Roderick Hyde, Nicholas Pasch, and Clarence T. Tegreene as inventors, filed 15 Nov., 2012, which is currently co-pending or is an application of which a currently co-pending application is entitled to the benefit of the filing date;

For purposes of the USPTO extra-statutory requirements, the present application constitutes a continuation-in-part of U.S. patent application Ser. No. 13/687,983 entitled Error Correction with Non-Volatile Memory on an Integrated Circuit, naming Roderick Hyde, Nicholas Pasch, and Clarence T. Tegreene as inventors, filed 28 Nov., 2012, which is currently co-pending or is an application of which a currently co-pending application is entitled to the benefit of the filing date; and For purposes of the USPTO extra-statutory requirements, the present application constitutes a continuation-in-part of U.S. patent application Ser. No. 13/678,439 entitled Redundancy for Loss-Tolerant Data in Non-Volatile Memory, naming Roderick Hyde, Nicholas Pasch, and Clarence T. Tegreene as inventors, filed 15 Nov., 2012, which is currently co-pending or is an application of which a currently co-pending application is entitled to the benefit of the filing date; and For purposes of the USPTO extra-statutory requirements, the present application constitutes a continuation-in-part of U.S. patent application Ser. No. 13/691,448 entitled Flexible Processors and Flexible Memory, naming Roderick Hyde, Nicholas Pasch, and Clarence T. Tegreene as inventors, filed 30 Nov., 2012, which is currently co-pending or is an application of which a currently co-pending application is entitled to the benefit of the filing date.

Related Applications:

None.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

TECHNICAL FIELD

The present disclosure relates to electronic memory and systems associated with electronic memory.

SUMMARY

In one aspect, a memory device includes but is not limited to a substrate, a non-volatile memory array integrated on the substrate, and random number generator logic integrated with the non-volatile memory array on the substrate. The random number generator logic is operable to perform at least one random number generator function in association with the non-volatile memory array. In addition to the foregoing, other aspects are described in the claims, drawings, and text forming a part of the present disclosure.

In one aspect, a method of manufacturing a memory device includes but is not limited to forming a non-volatile memory array on a substrate, and integrating random number generator logic in combination with the non-volatile memory array on the substrate. The random number generator logic is operable to perform at least one random number generator function in association with the non-volatile memory array. In addition to the foregoing, other aspects are described in the claims, drawings, and text forming a part of the present disclosure.

In one aspect, a method of operating a memory device includes but is not limited to providing the memory device including random number generator logic integrated in combination with the non-volatile memory array on a substrate, and operating the random number generator logic. Operating the random number generator logic includes performing at least one random number generator function in association with the non-volatile memory array. In addition to the foregoing, other aspects are described in the claims, drawings, and text forming a part of the present disclosure.

In one aspect, an information processing system includes but is not limited to a memory device including random number generator logic integrated in combination with the non-volatile memory array on a substrate, and means for performing at least one random number generator function in association with the non-volatile memory array. In addition to the foregoing, other aspects are described in the claims, drawings, and text forming a part of the present disclosure.

In one aspect, an information processing circuit includes but is not limited to a memory circuit including random number generator logic integrated in combination with the non-volatile memory array on a substrate, and circuitry for performing at least one random number generator function in association with the non-volatile memory array. In addition to the foregoing, other aspects are described in the claims, drawings, and text forming a part of the present disclosure.

BRIEF DESCRIPTION OF THE DRAWINGS

Embodiments of the invention relating to both structure and method of operation may best be understood by referring to the following description and accompanying drawings:

Referring to FIGS. 20A through 20P are multiple schematic flow charts depicting several embodiments and/or aspects of a method of manufacturing a memory device that includes random number generator functionality in logic integrated with non-volatile memory.

DETAILED DESCRIPTION

Figure 1A:
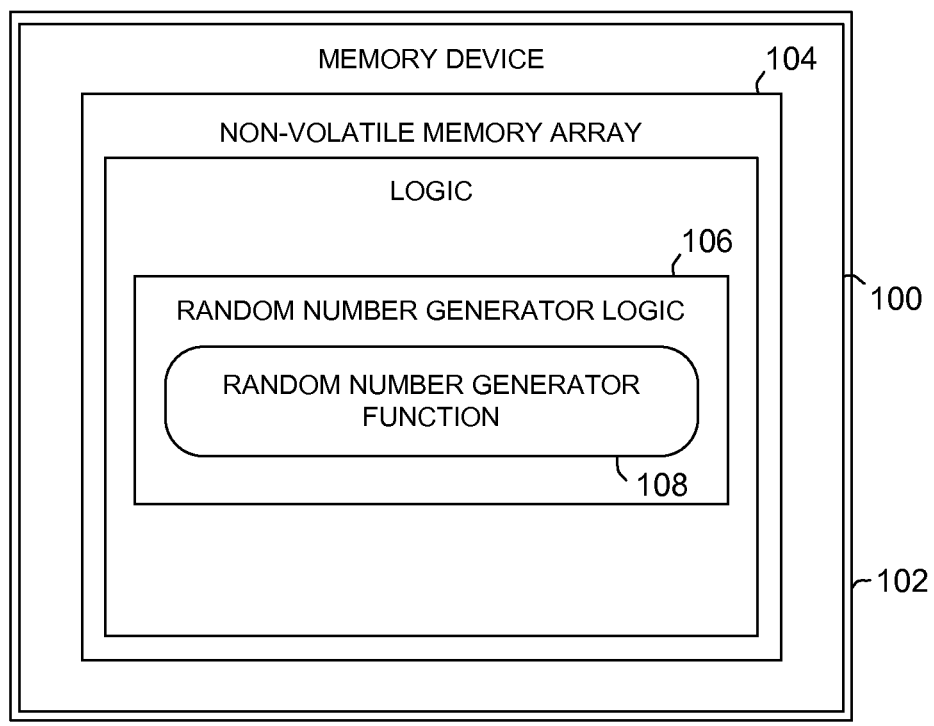
FIGS. 1A and 1B are schematic block diagrams depicting top and side views of embodiments of a memory device that includes random number generator functionality in logic integrated with non-volatile memory.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

While various aspects and embodiments have been disclosed herein, other aspects and embodiments will be apparent to those having ordinary skill in the art. The various aspects and embodiments disclosed herein are for purposes of illustration and are not intended to be limiting, with the true scope and spirit being indicated by the following claims.

The various memory systems and devices disclosed herein are expected to be useful in many applications and contexts, and are further anticipated to be particularly useful in cloud computing and mobile contexts. In some configurations, the disclosed memory systems and devices can be used in system-on-a-chip (SOC) applications as processing and memory are distributed in more and more locations and applications throughout our technologically advancing society. The various memory systems and devices can include non-volatile memory including flash memory and electrically erasable programmable read-only memory (EEPROM) for usage in many electronic devices, such as mobile and cell phones, notebook computers, personal digital assistants, medical devices, medical diagnostic systems, digital cameras, audio players, digital televisions, automotive and transportation engine control units, USB flash personal discs, and global positioning systems.

In various applications and contexts, memory systems can include non-volatile memory integrated with a processor or other logic, and a bus or other communications interface. As non-volatile memories and integrated system continue to evolve, their role in overall systems continue to expand to include various aspects of computation that is facilitated, for example, by phase-change memory in which passage of current switches a memory material between two states, crystalline and amorphous, or additional states that further elevate storage capacity.

Figure 1B:
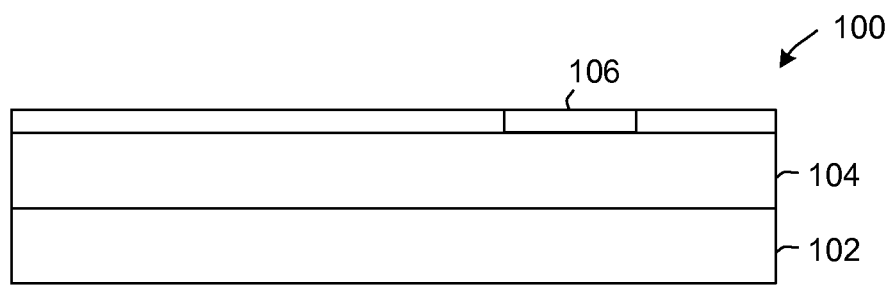

Referring to FIGS. 1A and 1B, schematic block diagrams depict top and side views of embodiments of a memory device that includes random number generator functionality in logic integrated with non-volatile memory. In an illustrative embodiment, a memory device 100 can include a substrate 102, a non-volatile memory array 104 integrated on the substrate 102, and random number generator logic 106 integrated with the non-volatile memory array 104 on the substrate 102. The random number generator logic 106 can be operable to perform at least one random number generator function 108 in association with the non-volatile memory array 104.

The memory device that includes logic integrated with non-volatile memory can include random number generator logic that is closely connected and can be distributed over the memory. Integrating the random number generator logic with memory enables random number generator operations immediate to the data stored in memory, increasing efficiency by avoiding delay awaiting transfer of instructions and data over a bus.

Random number generation associated with memory can be useful for a variety of applications. For example, randomness can be used for sampling of data in the memory, such as by selecting relatively random samples to give insight into expected behavior when impractical to examine all possible cases. Randomness can also be used for simulation of natural phenomena intrinsic to data stored in the memory, for instance to describe physical or mechanical behavior, operations research, and the like. Random number generation can also be used for numerical analysis of data stored in the memory, such as for solving complicated numerical problems. A random number generator can be closed associated with the memory for programming operations such as to supply random data for testing effectiveness of algorithms including algorithms executed by a processor external to the memory and for algorithms encoded in the memory. Random number generations can further be used for decision-making. In some embodiments and/or applications, random number generation can be used to gaming or recreation to apply randomness to various gaming situations. In various embodiments, the memory device can be included in electronic devices, such as mobile and cell phones, notebook computers, personal digital assistants, medical devices, medical diagnostic systems, digital cameras, audio players, digital televisions, automotive and transportation engine control units, USB flash personal discs, global positioning systems, and the like, to enable randomness functionality.

In some applications and/or embodiments, the memory device can include the processing capability a processor or other logic integrated in a distributed manner with non-volatile memory. Accordingly, the memory device 100 can be formed where the random number generator logic 106 operable to perform at least one random number generator function 108 in association with the non-volatile memory array 104 is configured with functionality selectively distributed across the non-volatile memory array 104. In particular applications, the processing capability can be implemented with relatively low speed requirement to enable processors to be available in a ubiquitous manner. Accordingly, information can be acquired in a dispersed manner and intercommunicated over vast systems. Thus processors can be inexpensive and memory readily available for various consumer items. Custom versions of memory including non-volatile memory and RAM can be integrated into virtually any product, enabling widespread preprocessing in items such as door handles to determine who has accessed a location and how the access was made to allow any type of processing on the information. In applications where unpredictability is highly useful, such as security applications, the random number generator logic can operate to exploit variability of various phenomena in different memory types, for example to supply physical randomness in random number generation.

The memory device can facilitate intelligent applications that use randomness by virtue of a large distributed area of processing or logic which can be spread over a relatively large area of memory storage. In some embodiments, the processor can be formed of logic that is relatively low capability or relatively low quality, for example to enable a small number of relatively simple operations, thereby reducing the number of layers of silicon in the integrated circuit chip, and possibly reducing power requirements and heat dissipation. The processing logic of such a processor-in-memory (PIM) can be widely distributed over the area of memory storage. The intelligent monitoring memory device can be formed as at least part of a system-on-a-chip (SOC).

In various embodiments, the memory device can include logic integrated with memory that is formed in a limited number of metal layers within the memory logic. To avoid stacking of multiple layers of silicon processing on the memory chip, the logic can be spread laterally across the memory array circuitry. Limited complexity of operations implemented on the memory device circuit enables slower computation speed in comparison to a typical central processing unit (CPU). Such slower computation speeds are suitable since the limiting factor in transfers of data from a processor to memory is the data bus.

The logic, including random number generator logic, can be configured to reduce the percentage of transistor underutilization, called "dark silicon", by breaking up of the command structure of central blocks. The logic can be further configured to enhance efficiency by performing background operations such as sorting of data within the memory while the system is idle. For example, the logic can access, if available, background information about data characteristics and applications to tailor the memory to the currently-executing application.

In some embodiments, the memory device can be configured with logic with an abbreviated set of specific, basic functions in which simple operations can be off-loaded from a processor external to the memory device and moved onto the memory device. For example, context request blocks can be removed from the processor into the memory device, for example for security purposes since the context request blocks are typically not located in the memory.

Embodiments of the memory device with a reduced-functionality logic can facilitate efficient operation of the memory device while maintaining the integrated circuit simplicity and yield of the memory device. Typically, the number of metal layers in a memory integrated circuit is substantially smaller than that of a processor circuit. Reducing the complexity of the logic can allow fabrication with fewer metal layers.

In various embodiments, functionality logic can be attained by one or more of several techniques. For example, computations can be simplified by implementing relatively simple tasks in the logic or by acknowledging that a particular section of the memory is predominantly subject to a limited number of simple operations which can be implemented in the logic while other operations that rarely are applied to the memory section can be performed by processing external to the memory device. In another example, for operations or applications characterized by a limited or coarse accuracy, such as relatively low-grade video signals, processing can be based on estimation. In a further example, the logic can include support for multiple functions in which circuitry for the different functions can be spread over a distributed area of the non-volatile memory array, forming a large distributed area of simple processing functionality.

Figure 2A:
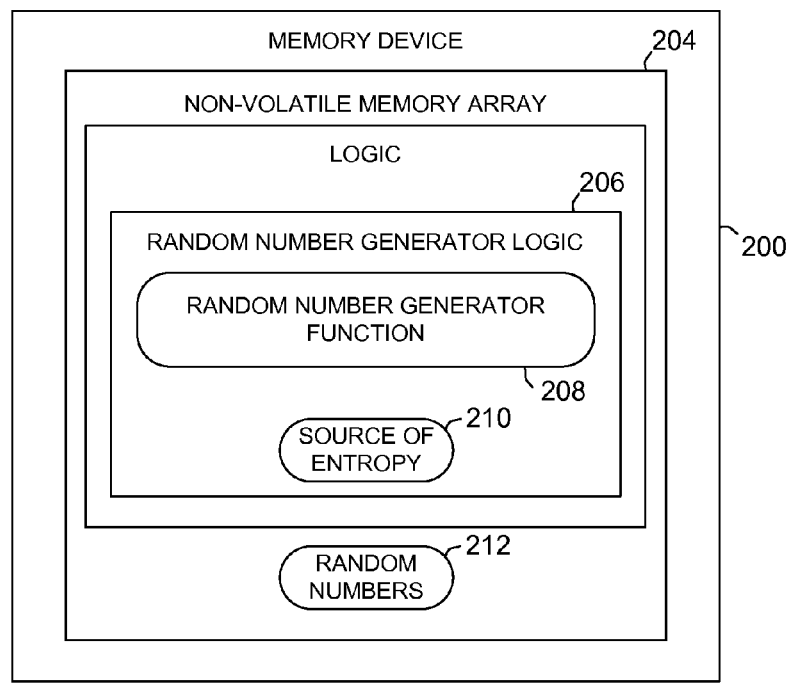
FIGS. 2A and 2B are respective top and side views of schematic block diagrams illustrating embodiments of a memory device that include random number generator functionality in logic integrated with non-volatile memory which gives entropy for use in random number generation.
Figure 2B:
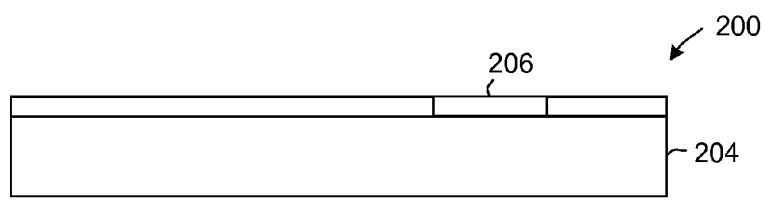

Referring to FIGS. 2A and 2B, respective top and side views of schematic block diagrams illustrate embodiments of a memory device that includes random number generator functionality in logic integrated with non-volatile memory which gives entropy for use in random number generation. In particular embodiments, the memory device 200 can be configured such that the random number generator logic 206 operable to perform at least one random number generator function 208 in association with the non-volatile memory array 204 is operable to supply a source of entropy 210 for generating random numbers 212. In some embodiments, the memory device can include logic, including random number generator logic, that is configured to monitor current patterns in the memory and analyze using entropy laws, for example by determining the fluctuations in data using statistical mechanics techniques. The logic can monitor memory accesses and determine the relative probability that the entropy of the data is currently outside an equilibrium level and so the data is expected to be characterized by increases or decreases over time. The entropy of an isolated system is expected to increase until reaching equilibrium.

The memory device that includes logic integrated with non-volatile memory has inherent characteristics for supplying a good source of entropy for generating random numbers. Circuitry in the logic and memory of the memory device can operate as a physical source of randomness. A physical random number generator can be based on effectively random atomic or subatomic physical phenomenon having unpredictability based on quantum dynamic considerations. Various sources of entropy can include thermal noise, shot noise, avalanche noise in Zener diodes, clock drift, radioactive decay, and similar physical phenomena associated with the integrated circuit of the memory device. Physical phenomena and techniques for measurement typically are characterized by asymmetries and systematic biases that result in a lack of uniform randomness. The logic, including random number generator logic, can include operations that enhance or extract randomness to form a more uniform distribution of results of a non-uniformly random source. Generating the more uniform distribution reduces the bit rate of operations, which is alleviated by the integrated form of the memory device in which the logic for generating a more uniform distribution, for example a cryptographic hash function, functions efficiently by avoiding the transfer of data over a bus.

In various embodiments, the memory device can include a non-volatile memory array which includes one or more suitable memory technology. For example, memory technologies in the memory device can include embedded flash, read-only memory (ROM), electrical fuse (one-time programmable), CMOS floating gate (multiple time programmable), CMOS floating gate (one-time programmable), and anti-fuse (one-time programmable). The different memory technologies can have various advantages and disadvantages for particular operations or applications. Some memory technologies can have relatively high density such as ROM and antifuse, while others have low density (for example electrical fuse and CMOS floating gate). Some technologies have good endurance such as embedded flash, and CMOS floating gate, while others have poor endurance, for example ROM, electrical fuse, CMOS floating gate, and antifuse. Various technologies can have different standby and active current including high current (electrical fuse), medium current (embedded flash and CMOS floating gate), and low current (ROM and antifuse). The memory technologies vary in random access time including fast (ROM and antifuse), medium (embedded flash and CMOS floating gate), and slow (electrical fuse). The memory technologies vary in security including high security (antifuse), medium security (embedded flash and CMOS floating gate), and slow security (ROM and electrical fuse). The memory technologies vary in high and low temperature and voltage tolerance including high tolerance (ROM and antifuse), medium tolerance (electrical fuse), and low tolerance (embedded flash and CMOS floating gate). In a memory device that includes multiple memory sections with more than one memory technology, the logic can monitor a history and pattern of memory accesses and assign memory usage depending on the monitoring. For data or code that changes very frequently, the logic can assign embedded flash. For high volume storage, the logic can assign more dense memory technologies. For applications in which the code changes infrequently, the logic can allocate, for example, ROM and antifuse. The logic can assign memory accesses depending on temperature and voltage conditions that can be measured using sensors or otherwise communicated to the memory device. The logic can determine the security level of an application and assign the memory technology accordingly.

Figure 3A:
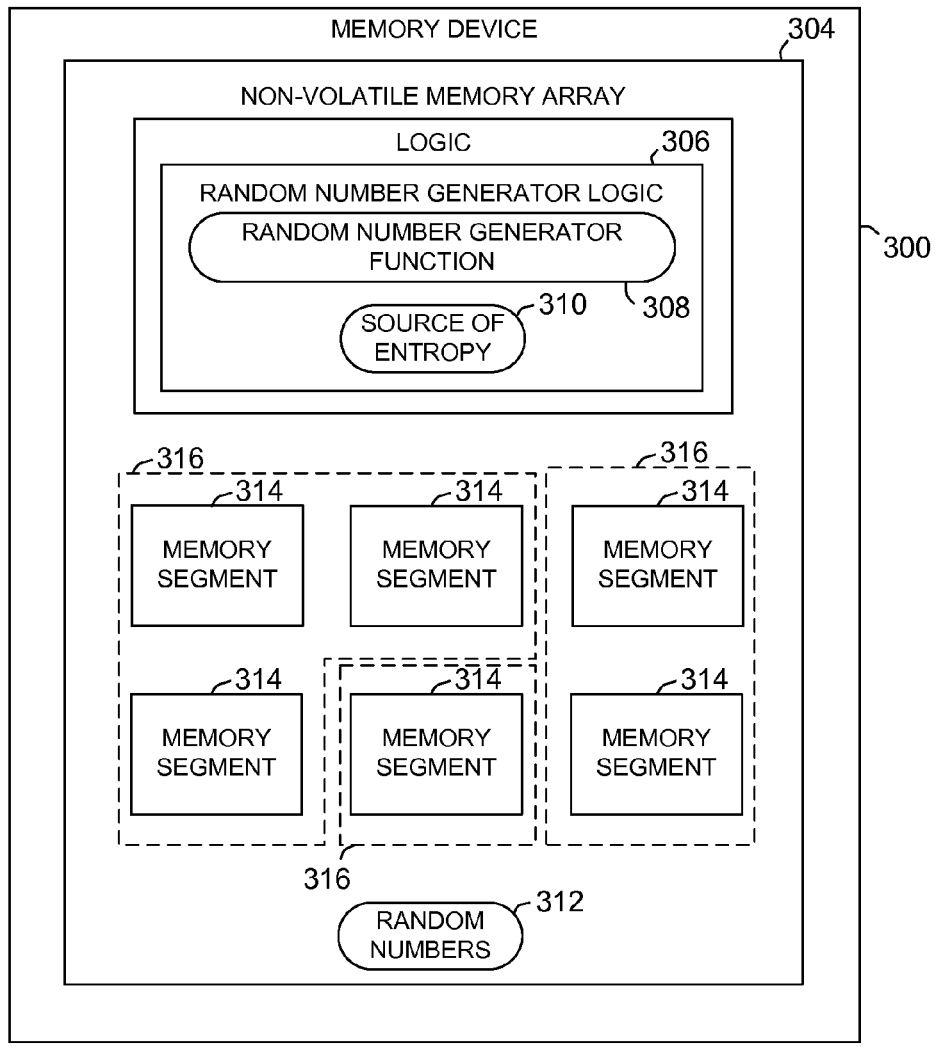
FIGS. 3A and 3B are respective top and side views of schematic block diagrams showing embodiments of a memory device that includes random number generator functionality in logic integrated with non-volatile memory including multiple memory types which can be used to give entropy for use in random number generation.
Figure 3B:
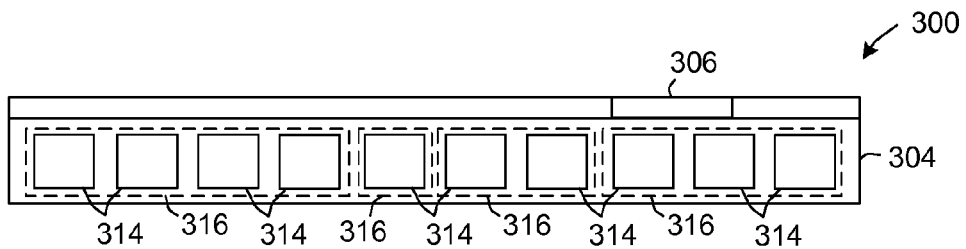

In some arrangements, memory can include portions with different memory types. In embodiments of the memory device depicted in FIGS. 3A and 3B, respective top and side views of schematic block diagrams show embodiments of a memory device that includes random number generator functionality in logic integrated with non-volatile memory including multiple memory types which can be used to give entropy for use in random number generation. The memory device 300 can be formed where the non-volatile memory array 304 includes a plurality of non-volatile memory segments 314 characterized by a respective plurality of non-volatile memory types 316. The random number generator logic 306 operable to perform at least one random number generator function 308 in association with the non-volatile memory array 304 can be operable to use the plurality of non-volatile memory segments 314 characterized by the respective plurality of non-volatile memory types 316 to supply a source of entropy 310 for generating random numbers 312.

The memory device that includes logic integrated with multiple segments of non-volatile memory of different memory types can be exploited to attain a source of entropy for generating random numbers. Circuitry in the logic and multiple memory segments of the memory device can operate as a physical source of randomness. In various embodiments, the source of entropy can supply randomness, for example, by randomly selecting a memory segment, then exploiting randomness of physical phenomena in the selected memory segment. In other embodiments, randomness can be enhanced by combining random effects of the different memory types. For example, the random number generator logic can combine effects of microscopic phenomena that generate a low-level, statistically random noise signal, such as various quantum phenomena such as thermal noise of photoelectric effect. The unpredictable character of such processes can be used to assert randomness. The random number generator logic can include or can access a transducer to convert an aspect of the physical phenomena to an electrical signal, an amplifier and other components, devices or circuitry to increase the amplitude of the random fluctuations to a macroscopic level. The random number generator logic can also include or be connected to access a device such as an analog to digital converter to convert the signal to a digital number. Repeatedly sampling the randomly varying signal can form a series of random numbers.

In various embodiments, the information processing system can include multiple types of memory technology, for example including charge memory or resistive memory. An information processing system can include sections of charge memory and resistive memory and the logic can assign applications to exploit the advantages and diminish the consequences of disadvantages of either type of memory. Charge memories induce a voltage which is detected during read operations in response to require amounts of charge. In non-volatile storage, flash memories precisely control the discrete charge placed on a floating gate. In volatile storage, DRAM not only places charge in a storage capacitor but also mitigate subthreshold charge leakage through the access device using capacitors that are sufficiently large to store charge for reliable sensing and using transistors that are sufficiently large to exert effective control over the channel. Resistive memories use electrical current to induce a change in atomic structure, changing the resistance detected during reads. Resistive memories are more suitable for scaling than charge memories by avoiding precise charge placement and control. Programming via techniques such as current injection scale with cell size. Phase-change memory (PCM), spin-torque transfer (STT) magneto-resistive RAM (M-RAM), and ferroelectric RAM (FRAM) are examples of resistive memories.

The non-volatile memory array can include memory portions formed of memory technologies characterized by high performance under particular operating conditions. Phase change RAM (PCRAM) is a memory technology with highly favorable small cell size and thus density. The information processing system which includes at least a portion of PCRAM can further include logic that monitors and determines operating conditions and can assign memory accesses to PCRAM in low power high performance conditions.

The logic can allow less-than-perfect performance for suitable applications and/or contexts. The logic can determine and use Quality-of-Service (QoS) ratings for processor in memory (POM), and assign priority of performance to sections of memory. For relatively high performance applications, the device may be configured to work perfectly and the logic can specify that only highly reliable memory is used. Other applications can operate at a lower QoS and the logic can select memory accordingly. Other examples of non-volatile memory technologies with various QoS ratings can include resistive RAM (R-RAM) and spin-transfer torque RAM (STT-RAM). R-RAM can be any memory technology that relies of resistance change to store information, for example including space-charge-limited-current (SCLC), filament, programmable-metallization-cell (PMC), Schottkey contact and traps (SCT). R-RAM can be characterized by non-volatility, high-speed, high-performance, zero standby power, and, in some arrangements, high density. For an information processing system that includes at least a portion of the memory in the form of R-RAM, the logic can monitor memory accesses and determine whether a particular application is characterized by high-speed and high-performance, and assign the R-RAM memory portion for the application.

For example, the logic can determine and use QoS ratings, and assign priority of performance to sections of memory. For relatively high performance applications, the device may be configured to work perfectly and the logic can specify that only highly reliable memory is used. The logic can perform an error detection operation and determine whether too many errors are occurring according to a predetermined threshold and, if so, the logic can shift to higher performing memory. The logic can start an application with a determined QoS rating and monitor errors to iteratively select an appropriate memory segment that is tailored to application characteristics and performance.

In another example application, an information processing system can include a non-volatile memory array and includes at least a portion of the memory in the form of STT-RAM. STT-RAM can be characterized by improved performance via overdriving. Overdriving the gate voltage of an NMOS transistor in the STT-RAM can increase $V_{GS}$ and thus enhance the driving strength of the NMOS transistor. The logic can be configured to manage overdriving, for example, by monitoring memory access operations such as reading, writing, erasing, driving write-line voltage, and the like, and control overdriving according to the particular application.

In some embodiments, the memory device can include logic that write-protects a selected location, block, or portion of memory. In particular implementations, the random number generator logic can be used to select the location that is write-protected. Subsequent erroneous writes to the protected area can activate the logic to perform predetermined handling such as repairing an error, performing an exit and restart, generating an error report, or the like.

Figure 4A:
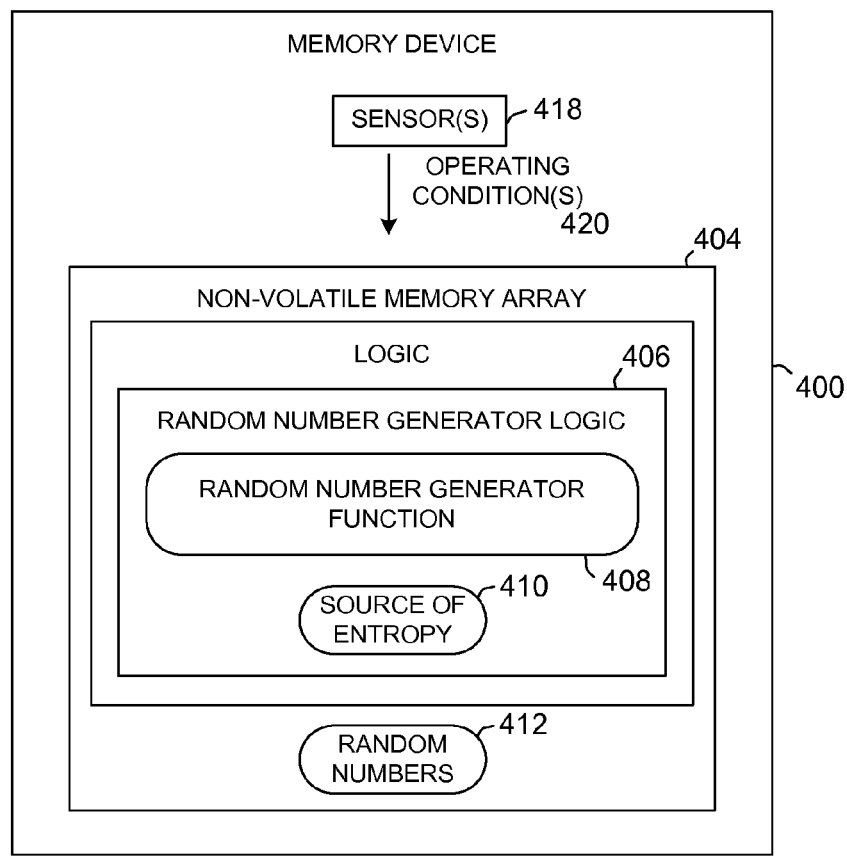
FIGS. 4A and 4B are respective top and side views of schematic block diagrams illustrating embodiments of a memory device that includes random number generator functionality in logic integrated with non-volatile memory and is capable of operating in combination with one or more sensors integrated with the apparatus to detect and react to operating conditions.
Figure 4B:
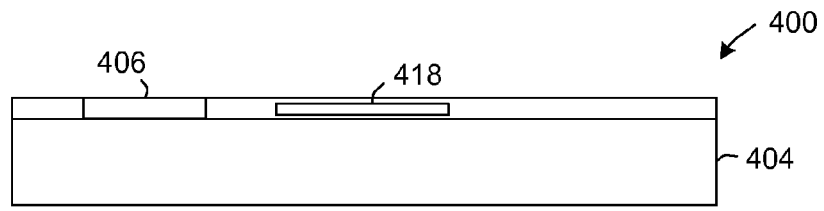

Referring to FIGS. 4A and 4B, respective top and side views of schematic block diagrams illustrate embodiments of a memory device that includes random number generator functionality in logic integrated with non-volatile memory and is capable of operating in combination with one or more sensors integrated with the apparatus to detect and react to operating conditions. For example, the memory device can be integrated used in a medical implant such as an orthopedic implant (knee, hip, shoulder, elbow, and the like), a cardiology implant such as a pacemaker, anti-tachycardia device, defibrillator, and the like. The memory device can include any suitable type of sensor such as motion or position sensors, electrical signal sensors, pressure sensors, oxygen sensors, and the like. The processor and memory can be configured to facilitate monitoring for therapeutic and diagnostic purposes, and delivery of therapy.

Figure 5A:
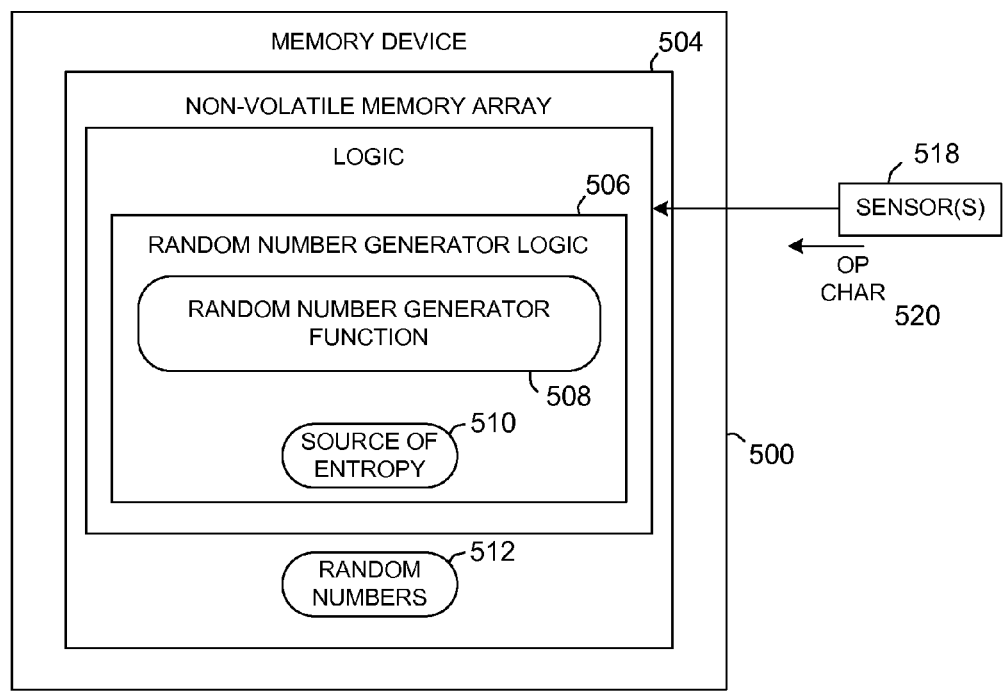
FIGS. 5A and 5B are respective top and side views of schematic block diagrams showing embodiments of a memory device that includes random number generator functionality in logic integrated with non-volatile memory and is capable of operating in combination with one or more sensors external to the apparatus to detect and react to operating conditions.
Figure 5B:
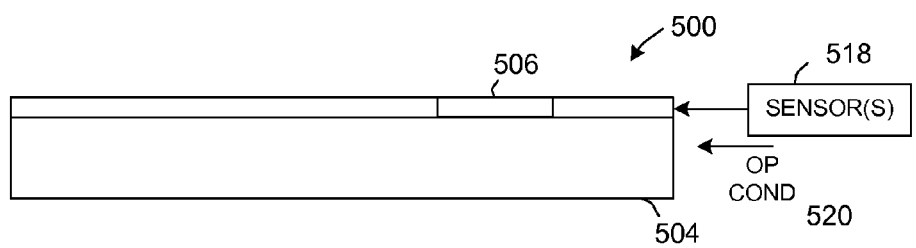

Referring to FIGS. 5A and 5B, respective top and side views of schematic block diagrams show embodiments of a memory device that includes random number generator functionality in logic integrated with non-volatile memory and is capable of operating in combination with one or more sensors external to the apparatus to detect and react to operating conditions. For example, the memory device can be used in a product in the form of an environmental monitor such as for usage in environmental-critical applications such as computer and network data centers, hospitals, and museums. The memory device can be used with any suitable type of environment sensor such as thermometers, pressure sensors, magnetic field sensors, moisture sensors, and the like. The environmental monitor can be used to monitor and maintain the environment within selected limits.

Referring to FIGS. 4A, 4B, 5A, and 5B, the memory device 400, 500 can further include at least one sensor 418, 518 operable to detect at least one operating condition 420, 520. The random number generator logic 406, 506 operable to perform at least one random number generator function 408, 508 in association with the non-volatile memory array 404, 504 can be operable to use the at least one operating condition 420, 520 to supply a source of entropy 410, 510 for generating random numbers 412, 512.

Thus, the random number generator logic can be operable to generate random numbers based on randomness in physical phenomena detected by a sensor. For example, the memory device can incorporate sensors or other components that detect phenomena which can be monitored by the logic to detect random aspects of magnetic fields, temperature, velocity, rotation, acceleration, inclination, gravity, humidity, moisture, vibration, pressure, sound, electrical fields or conditions such as voltage, current, power, resistance, and other physical aspects of the environment to enable the random number generator logic to perform actions to improve randomness.

In some embodiments and/or applications, the memory device 400, 500 can further include at least one sensor 418, 518 operable to detect at least one operating condition 420, 520. The random number generator logic 406, 506 operable to perform at least one random number generator function 408, 508 in association with the non-volatile memory array 404, 504 can be operable to monitor the at least one operating condition 420, 520, monitor memory accesses, analyze the monitored at least one operating condition 420, 520 and memory accesses, and determine a source of entropy 410, 510 for generating random numbers 412, 512 based on the analysis of the monitored at least one operating condition 420, 520 and memory accesses.

The memory device can include any suitable sensor for detecting a condition that may be useful to supply entropy for random number generation. Example sensors can measure voltage, current, capacitance, resistance, inductance, capacitive/resistive, and other electrical or magnetic phenomena. Other suitable sensors can sense touch, tactile phenomena, pressure, vibration, velocity, acceleration, rotation, angular acceleration, angular velocity, and the like. Some sensors can sense ionic potential, optical radiation, electrochemical potential, infrared radiation, temperature, ionizing radiation, moisture, and the like.

In an embodiment of a memory device that includes multiple memory types or technologies, the sensor can detect electrical characteristics such as voltage or current and the random number generator logic can use randomness in the electrical characteristics to supply entropy for random number generation.

In an embodiment of a memory device that includes multiple memory types or technologies, the sensor can detect electrical characteristics such as voltage or current and the logic can determine whether the energy drive is sufficient to drive the memory reliably. If the energy drive is insufficient for a particular type of memory, the logic can shift memory accesses to a memory type that can be reliably driven.

In various embodiments, logic can be operable to monitor the operating condition, monitor memory accesses, analyze the monitored operating conditions and memory accesses, predict expected outcomes based on the monitored operating conditions and memory accesses, and allocate memory accesses based on the predicted expected outcomes. In a particular application, the memory device can include logic configured to predict different possible outcomes, for example predicting several possible outcomes and preparing for each, then use sensors, measurements, and monitoring to determine which outcome to activate at a particular time.

Figure 6A:
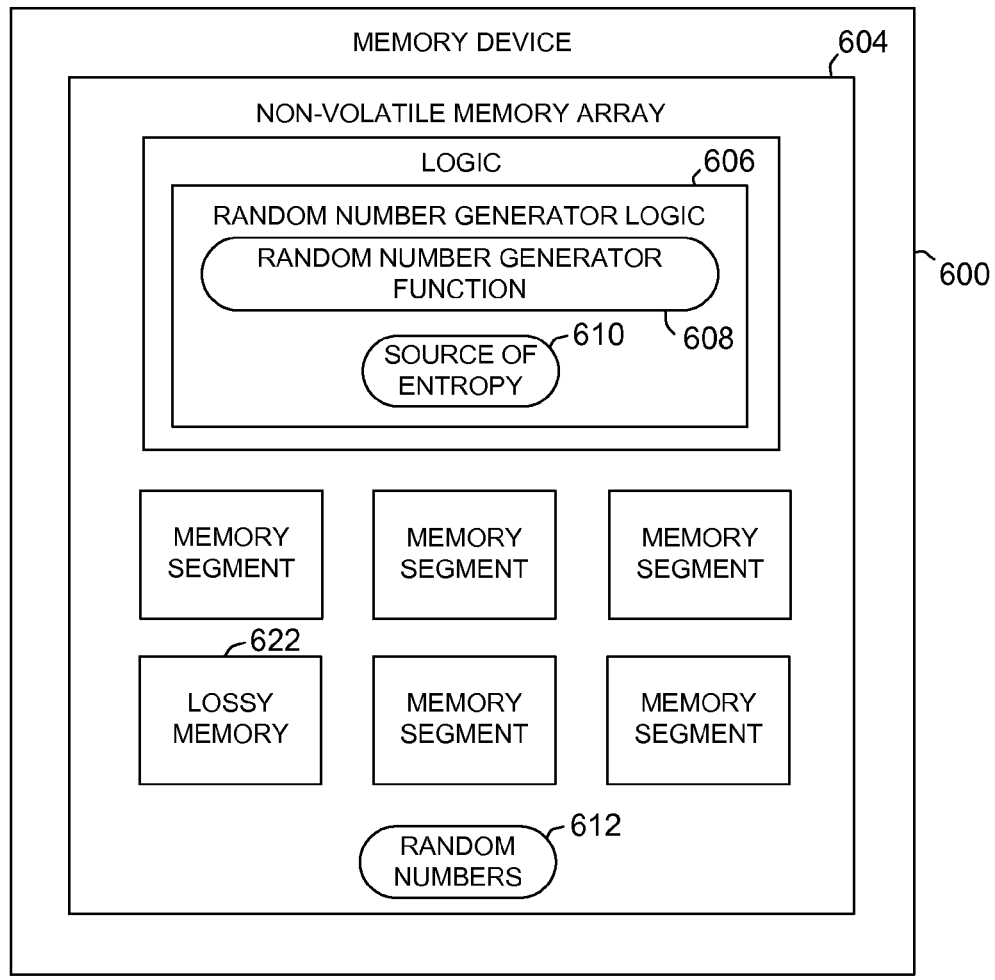
FIGS. 6A and 6B are schematic block diagrams illustrating respective top and side view of an embodiment of a memory device that includes random number generator functionality in logic integrated with non-volatile memory including lossy memory which can be used to supply entropy for random number generation.
Figure 6B:
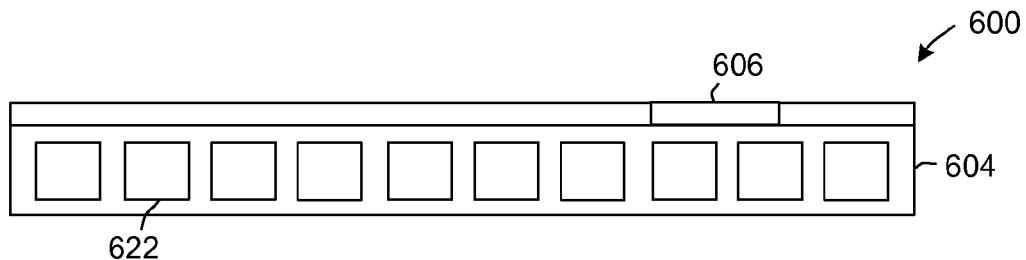

Referring to FIGS. 6A and 6B, schematic block diagrams illustrate respective top and side view of an embodiment of a memory device that includes random number generator functionality in logic integrated with non-volatile memory including lossy memory which can be used to supply entropy for random number generation. Hence, the memory device 600 can be constructed with the non-volatile memory array 604 including at least in part lossy memory 622. The random number generator logic 606 operable to perform at least one random number generator function 608 in association with the non-volatile memory array 604 can be operable use the lossy memory 622 to supply a source of entropy 610 for generating random numbers 612.

For a memory that includes sufficiently large and inexpensive memory, the processor or logic can perform a copy function at random intervals determined by the random number generator logic, for example in a selected range of cycle rates, to copy the state to a redundant fast memory for copying to a slow memory, and to facilitate decision-making in memory. Thus, the memory can control sampling with the logic including sampling functionality, and sampling of fast memory. For applications or contexts such as video handling in which only intermittent frames are sufficient to produce a suitable video image, a backup into lossy memory may be suitable to enable a basic recovery of data. In some embodiments, the memory may include excess memory in the form of flip-chip via a dedicated bus to send data from a first fast memory to a second fast memory. Variability of performance in the lossy memory can be exploited to supply a source of entropy for random number generation.

In some applications, what is desired is a capability to store large amounts of data while allowing some amount of inaccuracy or error. Such an application can be video streaming.

The memory device can thus be formed with at least a portion of the memory that is very inexpensive but lossy.

In some embodiments or applications, a capability for the memory device to efficiently support both bit maps and vector graphics may be useful. Accordingly, the memory device can be configured so that the memory includes a portion that is bit-mapped and a portion that is vector memory. For example, part of the memory can be optimized for pictures and video (JPEG) and another portion optimized for more computational applications. An example of such that context that would benefit from both memory types is a mobile telephone with camera and/or video functionality.

Figure 7A:
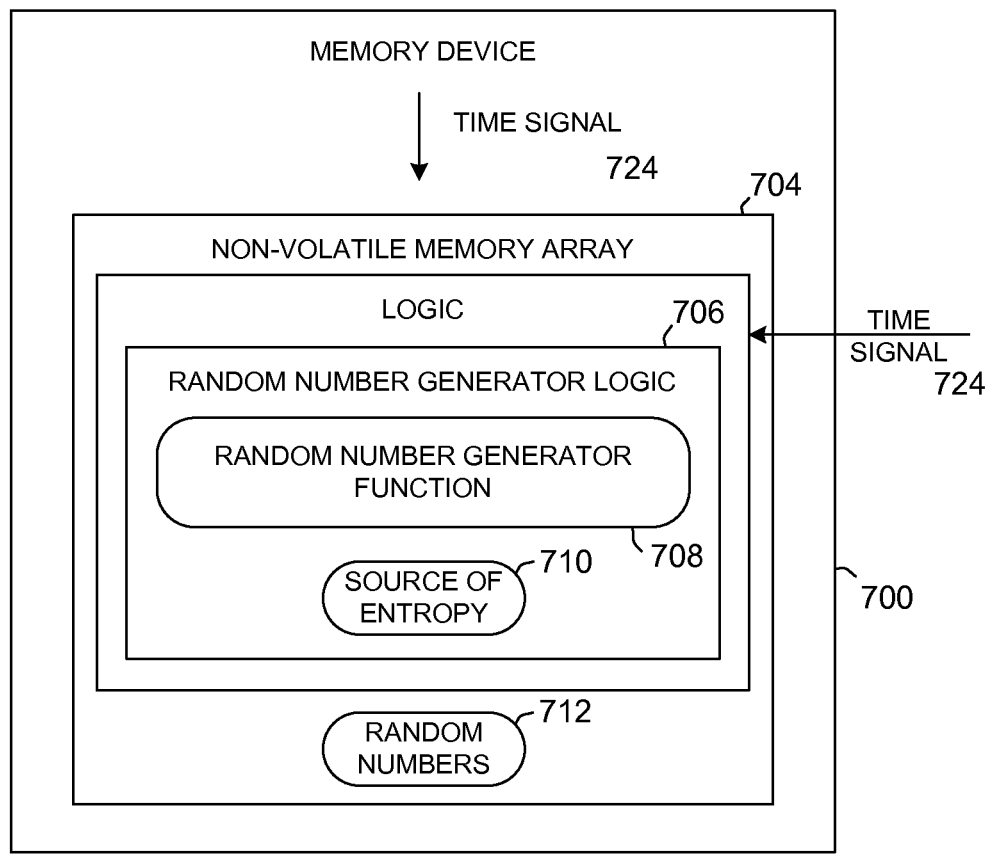
FIGS. 7A and 7B are schematic block diagrams showing respective top and side view of an embodiment of a memory device that includes random number generator functionality in logic integrated with non-volatile memory and uses a time signal at least in part as a source of entropy for random number generation.
Figure 7B:
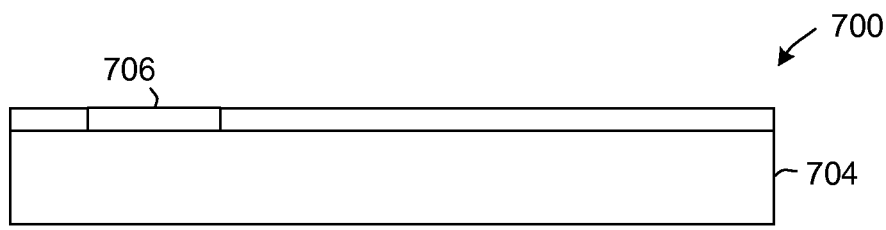

Referring to FIGS. 7A and 7B, schematic block diagrams show respective top and side view of an embodiment of a memory device that includes random number generator functionality in logic integrated with non-volatile memory and uses a time signal at least in part as a source of entropy for random number generation. Accordingly, the memory device 700 can be arranged in a manner that the random number generator logic 706 operable to perform at least one random number generator function 708 in association with the non-volatile memory array 704 is operable to access a time signal 724 and determine a source of entropy 710 for generating random numbers 712 based on the time signal 724.

In some embodiments of the memory device depicted in FIGS. 7A and 7B, the memory device 700 can be configured such that the random number generator logic 706 operable to perform at least one random number generator function 708 in association with the non-volatile memory array 704 is operable to access a time signal 724, monitor memory accesses referenced by the time signal 724, and determine a source of entropy 710 for generating random numbers 712 based on the time signal 724 and the memory accesses referenced by the time signal 724.

The time signal can be used to supply an extrinsic source of entropy. In an example embodiment and/or application, the random number generator function can be a hash function or other suitable function that uses entropy from a time signal such as the tick count since boot time, the current time, various high-performance performance counters, high-precision logic counters that are internal to the memory device integrated circuit, high-precision processor or CPU counters external to the memory device integrated circuit, and the like.

For example, the memory device can include logic that takes into consideration that, at different times, the loads are expected to be different. In a particular instance, the memory device may be used in a data center in which some of the activity is work-related, and other activity is recreational. The logic can be configured to allocated different types of memory accordingly, for example to handle volumes of streaming video and audio content during non-working hours.

Figure 8A:
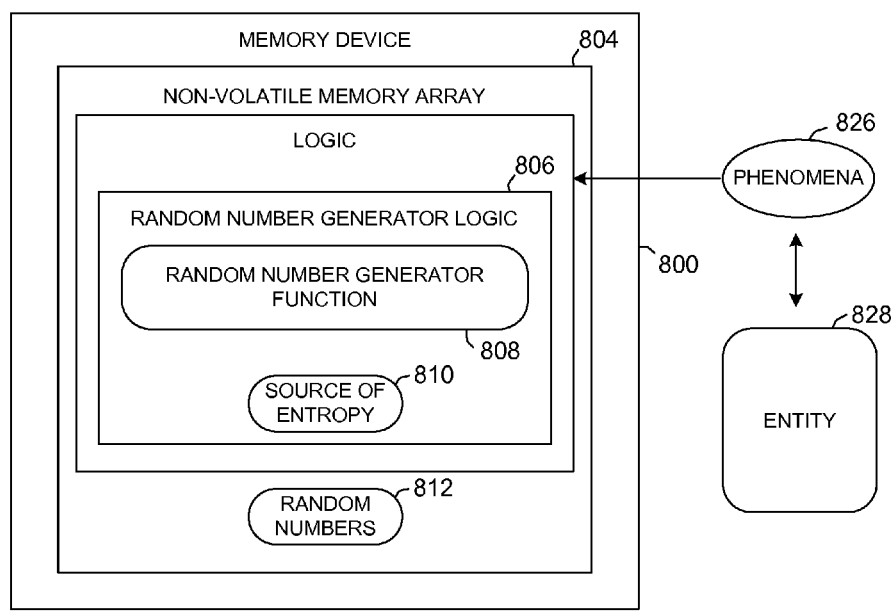
FIGS. 8A and 8B are schematic block diagrams depicting respective top and side view of an embodiment of a memory device that includes random number generator functionality in logic integrated with non-volatile memory and uses various phenomena to at least in part as a source of entropy for random number generation.
Figure 8B:
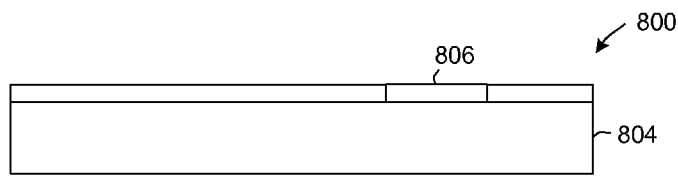

Referring to FIGS. 8A and 8B, schematic block diagrams depict respective top and side view of an embodiment of a memory device that includes random number generator functionality in logic integrated with non-volatile memory and uses various phenomena to at least in part as a source of entropy for random number generation. Thus, the memory device 800 can be implemented in a way that the random number generator logic 806 operable to perform at least one random number generator function 808 in association with the non-volatile memory array 804 is operable to monitor phenomena 826 detectable at the memory device and determine a source of entropy 810 for generating random numbers 812 based on the monitored phenomena 826.

Detected or received information associated with various phenomena can be used to supply an extrinsic source of entropy. In an example embodiment and/or application, the random number generator function can be a hash function or other suitable function that uses entropy from such detected or received phenomena information. Example phenomena can include a current process identifier (ID), a current thread ID, a hash of a user's environmental block including user name, computer name, search path, and others. Other information processing system phenomena can include system information fields, performance counters, and the like. Additional physical phenomena can be monitored via sensors or other components incorporated into the memory device that detect phenomena which can be monitored by the control logic to detect magnetic fields, temperature, velocity, rotation, acceleration, inclination, gravity, humidity, moisture, vibration, pressure, sound, electrical fields or conditions such as voltage, current, power, resistance, and other physical aspects of the environment to enable the control logic to perform actions to maintain, repair, clean, or other operations applied to the memory.

For example, the memory device 800 can be formed where the random number generator logic 806 operable to perform at least one random number generator function 808 in association with the non-volatile memory array 804 is operable to accumulate and communicate information about phenomena 826 associated with use of the memory device 800 and determine a source of entropy 810 for generating random numbers 812 based on the monitored phenomena 826.

The memory device can accumulate, compile, and communicate phenomena to enable an entity such as a person or system to assess operation of the phenomena in association with random number generation, for example to monitor performance and quality of the generated random numbers. Accumulation and communication of phenomena can be used for performance testing of the random number generator to test whether the source of entropy is operating suitably. Statistical tests can be used to detect failure of a random or noise source. A random noise generator signal can be sampled for testing before passage through a whitener. Some whiteners can pass statistical tests with no random input. A detected large deviation from an optimal condition is evidence that a true random noise source has degraded. Small deviations are typical and can be an indication of proper operation. Correlation of bias in input signals to a random number generator with other parameters such as internal temperature, bus voltage, and the like, can be useful as an additional check. Verifying operation of the random number generator can improve physical security and enable detection of tampering.

In certain applications and/or embodiments, the memory device 800 can be implemented in a way that the random number generator logic 806 operable to perform at least one random number generator function 808 in association with the non-volatile memory array 804 is operable to accumulate and communicate information about phenomena 826 associated with at least one entity 828 in association with the memory device 800 and determine a source of entropy 810 for generating random numbers 812 based on the monitored phenomena 826. In various embodiments and/or applications, an entity can be a person, a living being, a non-living being, an organization (business, political, or otherwise), a device, a computer, a network, or the like. For purposes of example, the memory device can be integrated into a biocompatible, biodegradable form for hemodynamic monitoring of pressure and blood flow within the circulatory system. Thus, the processor and integrated memory in the memory device can include encryption logic in which security is facilitated by a random number generator to control access to algorithm control parameters specific to the patient or to limit access to patient data accumulated and stored in the memory device, for example in a product for Holter monitoring of an ambulatory patient independently of any external device, although supporting communication with a device external to the patient's body via telemetry for exchange of commands, instructions, control information, and data. Other embodiments of the memory device can be used in combination with suitable sensors that can sense touch, tactile phenomena, pressure, vibration, velocity, acceleration, rotation, angular acceleration, angular velocity, ionic potential, optical radiation, electrochemical potential, infrared radiation, temperature, ionizing radiation, moisture, and the like that can supply phenomena information associated with an entity.

Figure 9A:
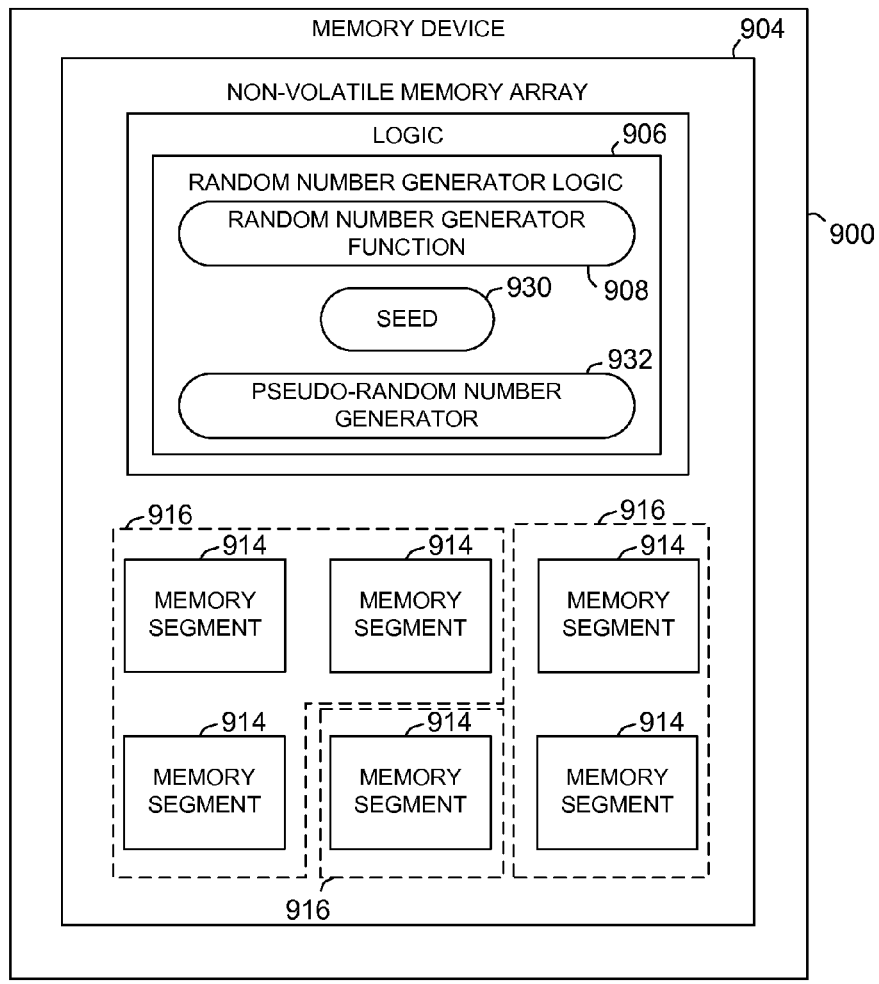
FIGS. 9A and 9B are schematic block diagrams showing respective top and side view of an embodiment of a memory device that includes random number generator functionality in logic integrated with non-volatile memory and uses the memory to supply a seed for random number generation.
Figure 9B:
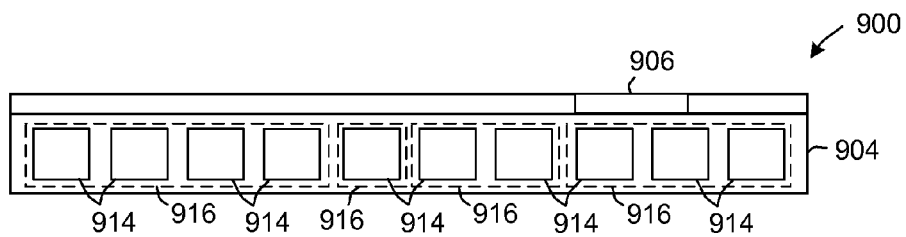

Referring to FIGS. 9A and 9B, schematic block diagrams show respective top and side view of an embodiment of a memory device that includes random number generator functionality in logic integrated with non-volatile memory and uses the memory to supply a seed for random number generation. Accordingly, the memory device 900 can be constructed with the random number generator logic 906 operable to perform at least one random number generator function 908 in association with the non-volatile memory array 904 operable to supply a seed 930 for a pseudo-random number generator 932 in association with the non-volatile memory array 904.

The memory device that includes logic integrated with non-volatile memory has inherent characteristics a seed for a random number generator. The seed or random seed is a number or vector that is used to initialize a pseudo-random number generator. The seed can be used, for example, in security applications in which a secret encryption key is generated by pseudo-random number generation. Possession of the seed enables access to the secret encryption key. A seed can be deliberately shared to form a secret key that enables two or more systems to use matching pseudo-random number algorithms and matching seeds can generate matching sequences of non-repeating numbers for usage in synchronizing remote systems.

The seed can be used in a computational method for generating random numbers in which long sequences of apparently random numbers are produced which are completely determined by a shorter initial value, called the seed or key. A pseudo-random number generator is an algorithm for automatically creating long runs of numbers with good random properties which is limited in the sense that a sequence eventually repeats or memory usage grows unbounded. The generated values are determined by the seed, which is a fixed number. One example pseudo-random number generator generates random numbers using a recurrence of the form $X_{N+1}=(aX_n+b)$ mod m. The maximum number of numbers produced is the modulus, m. In some embodiments, the arithmetic operations of the recurrence algorithm can be integrated into the random number generator logic. In other embodiments, one or more operations of the algorithm can be implemented outside of the memory device.

In some embodiments, the random number generator logic can include multiple random number generators with slightly different values of the multiplier coefficient that operate in parallel and logic for selecting among the multiple generators, thus avoiding non-random properties of a single linear congruent generator.

In some applications and/or embodiments, the memory device 900 can be configured such that the non-volatile memory array 904 includes a plurality of non-volatile memory segments 914 characterized by a respective plurality of non-volatile memory types 916. The random number generator logic 906 operable to perform at least one random number generator function 908 in association with the non-volatile memory array 904 can be operable to supply a seed 930 for a pseudo-random number generator 932 in association with a plurality of non-volatile memory segments 914 characterized by a respective plurality of non-volatile memory types 916.

In an example embodiment, the random number generator logic can include multiple random number generators associated with different non-volatile memory segments with minor differences in values of the multiplier coefficient that operate in parallel and logic for selecting among the multiple generators to further enable avoidance of non-random properties of a single generator.

Figure 10A:
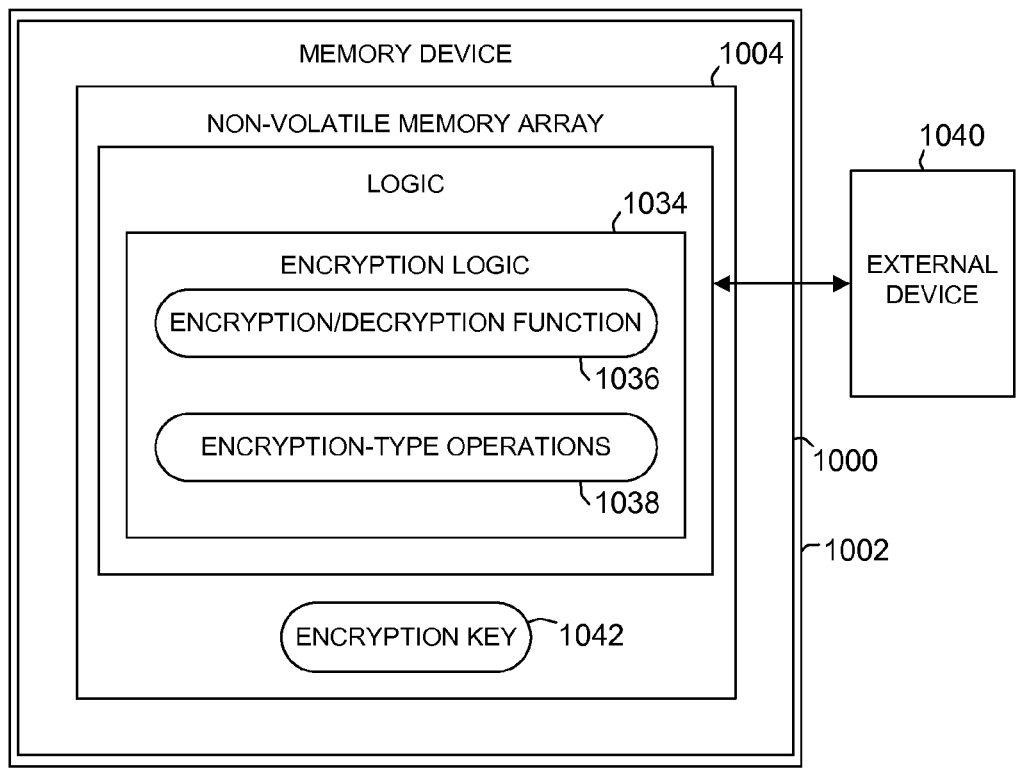
FIGS. 10A and 10B are schematic block diagrams illustrating respective top and side view of an embodiment of a memory device that includes random number generator functionality in logic integrated with non-volatile memory and includes encryption logic for performing various encryption functions.
Figure 10B:
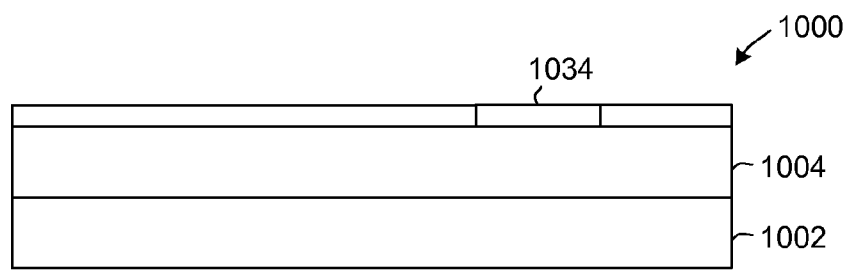

Referring to FIGS. 10A and 10B, schematic block diagrams illustrate respective top and side view of an embodiment of a memory device that includes random number generator functionality in logic integrated with non-volatile memory and includes encryption logic for performing various encryption functions. Accordingly, the memory device 1000 can further include encryption logic 1034 integrated with the non-volatile memory array 1004 on the substrate 1002. The encryption logic 1034 can be operable to perform at least one encryption/decryption function 1036 associated with the non-volatile memory array 1004.

Random number generators can have applications in cryptography. Random numbers can be used in both symmetric and asymmetric cryptography to generate keys and random values used in operations. In some embodiments, the encryption logic can support symmetric-key cryptography (block ciphers or stream ciphers) in which both the sender and receiver share the same key or different, related keys which are computable. The encryption logic can implement Data Encryption Standard (DES) and/or Advanced Encryption Standard (AES) block cipher designs in which data is input in blocks of plaintext. Embodiments of the encryption logic can also implement stream ciphers which create an arbitrarily long stream of key material, which is combined with the plaintext bit-by-bit or character-by-character. An output stream is formed based on a hidden internal state which changes as the cipher operates and is initialized up using the secret key material. The encryption logic can also implement cryptographic hash functions that can receive a message of any length as an input signal, and can produce a short, fixed length hash for use, for example, as a digital signature.

In some embodiments, the encryption logic can support public key cryptography in which a public key may be freely distributed, while a paired private key remains secret. In a public-key encryption system, the public key is used for encryption, while the private or secret key is used for decryption. Public-key cryptography can be used, for example, for implementing digital signature techniques.

In some embodiments, the memory device 1000 can further include encryption logic 1034 integrated with the non-volatile memory array 1004 on the substrate 1002. The encryption logic 1034 can be operable to perform at least one encryption/decryption function 1036 associated with the non-volatile memory array 1004 that increases throughput of encryption-type operations 1038 in combination with a device external to the memory device 1040. By distributing random number generator functionality and encryption functionality in combination with the memory, outside a main CPU and main memory in a computer system, throughput can be increased for encryption-type activities at least partly because transfer of data between the memory device and the CPU and main memory can be greatly reduced.

In a particular embodiment, the memory device 1000 can further include encryption logic 1034 integrated with the non-volatile memory array 1004 on the substrate 1002. The encryption logic 1034 can be operable to perform at least one encryption/decryption function 1036 associated with the non-volatile memory array 1004 that holds at least one encryption key 1042 secure from a device external to the memory device 1040. Accordingly, the memory device further can be beneficial on the basis of improving security, for example by retaining encryption keys in the memory device, outside of main memory, until the keys are required in main memory. Holding (hiding) the encryption keys in the memory device, outside the main memory, until essential guards against malware. Typically, malware reads passcodes or encryption keys from main memory and uses the violated passcodes and encryption keys to perform decryption and/or decryption, generally impersonating an authorized user. In a secure environment, a user or system can transfer the passcodes and encryption keys to main memory only when essential, and otherwise maintain them securely in the memory device.

The memory device, by virtue of distributed processing with the memory, can enable the random number generator logic to improve security by holding data in a secure location on the non-volatile memory and hide a substantial amount of information secure from attacks that would affect a CPU and main memory. The distributed logic can execute simple or minor, dedicated processing due to the substantial amount of silicon available on the memory device.

Figure 11A:
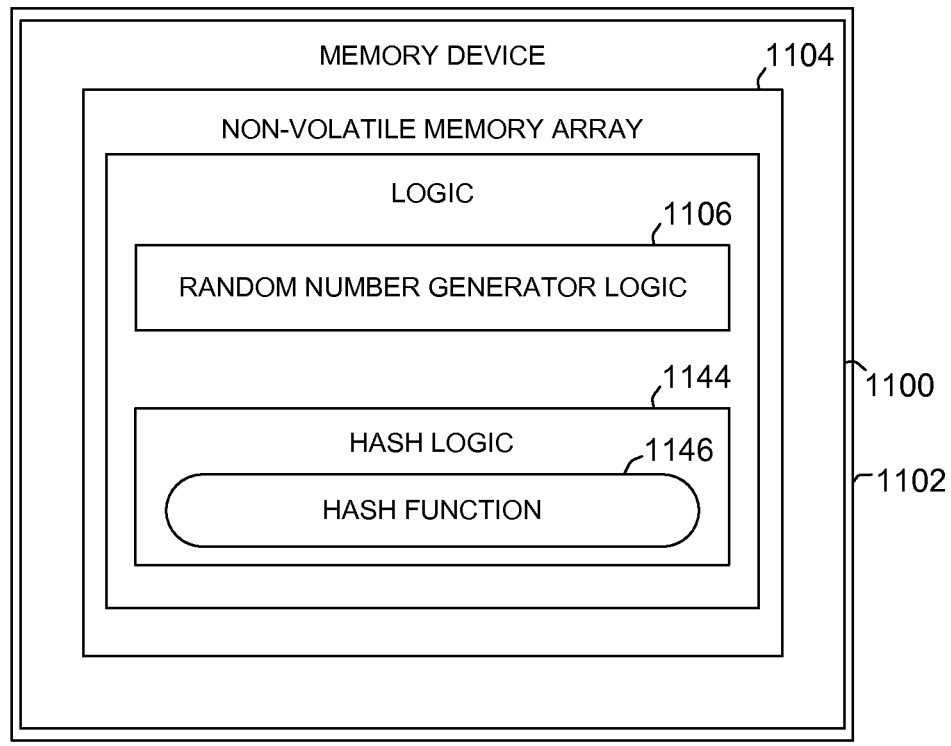
FIGS. 11A and 11B are schematic block diagrams depicting respective top and side view of an embodiment of a memory device that includes random number generator functionality in logic integrated with non-volatile memory and includes hash logic for executing hash functions for various purposes.
Figure 11B:
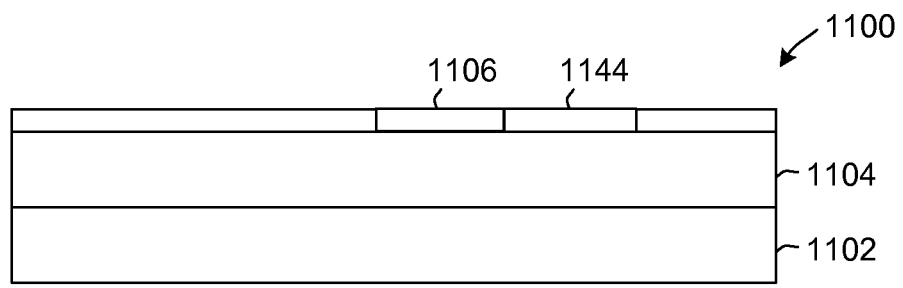

Referring to FIGS. 11A and 11B, schematic block diagrams depict respective top and side view of an embodiment of a memory device that includes random number generator functionality in logic integrated with non-volatile memory and includes hash logic for executing hash functions for various purposes. Thus, the memory device 1100 can further include hash logic 1144 integrated with the non-volatile memory array 1104 on the substrate 1102. The hash logic 1144 can be operable to perform a hash function 1146 using randomness supplied by the random number generator logic 1106. A hash function can be any algorithm or subroutine that maps large data sets of variable length, called keys, to smaller data sets of a fixed length. The values returned by a hash function can be called hash values, hash codes, hash sums, checksums, or hashes.

The hash logic can be used in conjunction with the random number generator on the memory device for various purposes. For example, a pseudo-random number generator function P(key) can be uniform on an interval $[0, 2^{b-1}]$ and a hash function uniform on the interval $[0, n-1]$ is $nP[key]/2^b$ so that a division operation can be replaced by a more simple and possibly faster right bit shift, $nP(key)>>b$, in an operation that can simplify the logic in the memory device. In another example operation, hashing logic in the memory device can be formed to perform hashing by nonlinear table lookup in which tables of random numbers can enable high-quality nonlinear functions to be used as hash functions or other purposes such as cryptography. The key to be hashed can be divided into parts with individual parts used as an index for a non-linear table. Table values can be added by arithmetic or XOR addition to the hash value, reducing memory size and enabling fast hash execution, which can be particularly beneficial in a memory device that includes simplified logic integrated with the non-volatile memory.

Figure 12A:
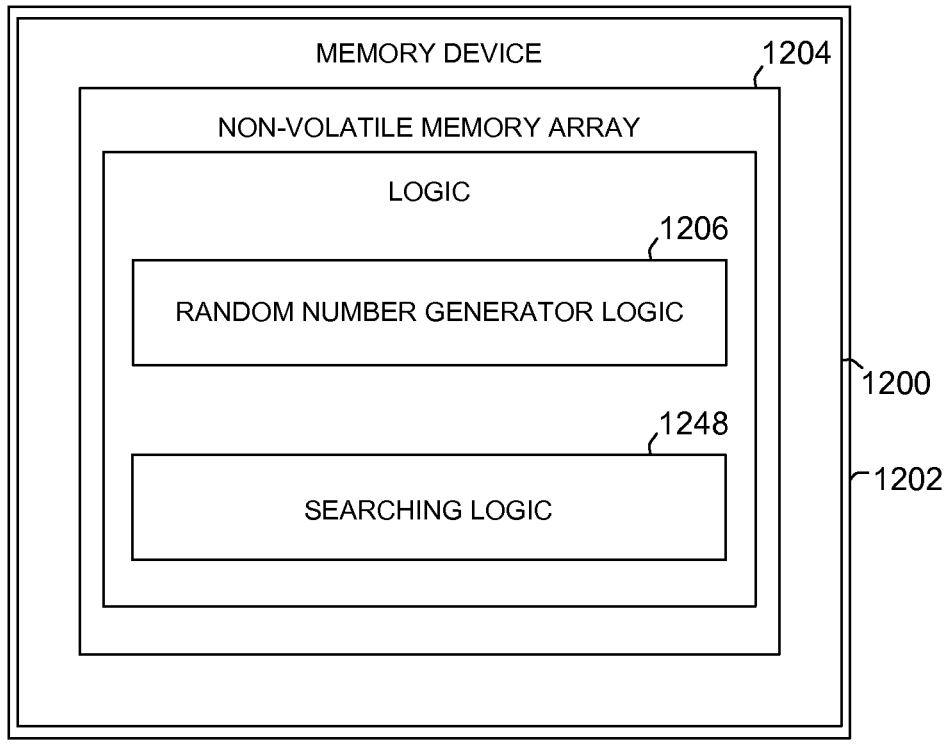
FIGS. 12A and 12B are respective top and side views of schematic block diagrams illustrating embodiments of a memory device that includes random number generator functionality in logic integrated with non-volatile memory and includes searching logic for executing various search functions.
Figure 12B:
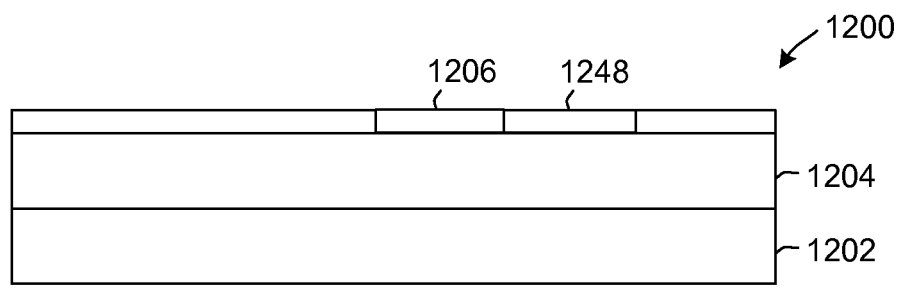

Referring to FIGS. 12A and 12B, respective top and side views of schematic block diagrams illustrate embodiments of a memory device that includes random number generator functionality in logic integrated with non-volatile memory and includes searching logic for executing various search functions. For example, the memory device 1200 can further include searching logic 1248 integrated with the non-volatile memory array 1204 on the substrate 1202. The searching logic 1248 can be operable to perform amortized searching using randomness supplied by the random number generator logic 1206.

In particular embodiments, the logic, including random number generator logic, can perform pattern recognition in an integrated circuit chip and perform analysis in operations that are background to data communication via a bus to a device such as a processor external to the memory device. Background tasks that are local to the memory device can include maximum and minimum sorting, medium, and mode computation. Operations perform by the logic can include statistical measurements, indexing, synchronizing, detection of repetitive tasks, and the like.

Figure 13A:
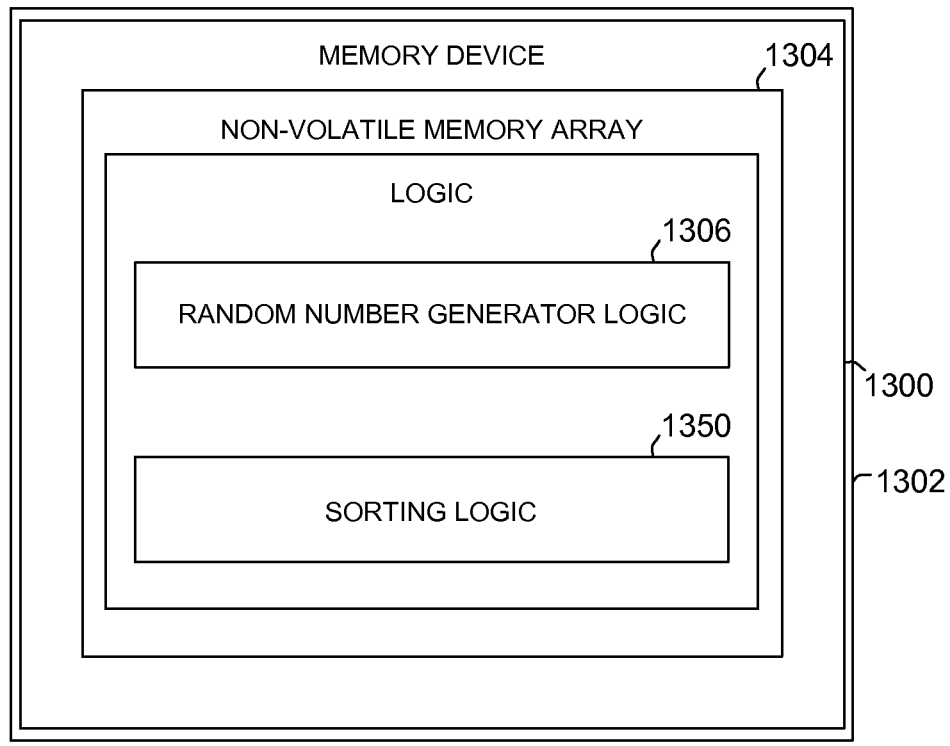
FIGS. 13A and 13B are respective top and side views of schematic block diagrams showing embodiments of a memory device that includes random number generator functionality in logic integrated with non-volatile memory and includes sorting logic for executing various sort operations.
Figure 13B:
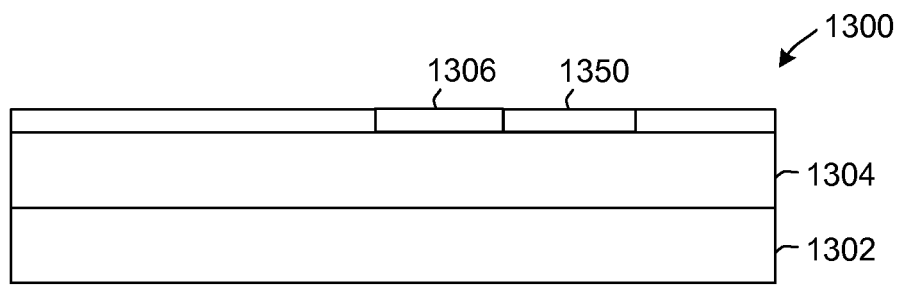

Referring to FIGS. 13A and 13B, respective top and side views of schematic block diagrams show embodiments of a memory device that includes random number generator functionality in logic integrated with non-volatile memory and includes sorting logic for executing various sort operations. Hence, the memory device 1300 can further include sorting logic 1350 integrated with the non-volatile memory array 1304 on the substrate 1302. The sorting logic 1350 can be operable to perform data sorting using randomness supplied by the random number generator logic 1306.

Sorting logic can be used in combination with random number generator logic to perform randomized sorting. Any deterministic version of a sort algorithm uses a determined amount of time proportional to $n^2$ to sort n numbers for a class of degenerate input values, such as a presorted array, with the specific class of input values that generate the behavior defined by the protocol for pivot selection. The algorithm can be implemented to select the pivot elements uniformly at random using the random number generator logic to give a high probability of finishing in a time proportional to n log n, a substantial reduction in comparison to the time proportional to $n^2$.

In some embodiments and/or applications, the memory device 1300 can further include sorting logic 1350 integrated with the non-volatile memory array 1304 on the substrate 1302. The sorting logic 1350 can be operable to monitor a history and pattern of memory accesses and perform sorting during system idle.

One problem inherent to non-volatile memory is failure that results from multiple writes to a memory element. The logic can operate to suitably allocate and distribute writes to non-volatile memory cells to avoid or prevent failure, for example by shifting through memory as particular cells are written or by allocating newer or less-written memory to operations, applications, or contexts characterized by a requirement for higher accuracy. Random number generator logic can be used to randomly allocate writes to portions of non-volatile memory to spread write durability across the memory.

In an example embodiment, the memory device can include logic can allocate writes according to memory type. For example, the memory device can include a section of PCRAM. Writes can result in substantial wear in PCRAM. When current is injected into a volume of phase-change material, thermal expansion and contraction degrade the electrode storage contact, resulting in programming currents injected into the memory cell that are insufficiently reliable. PCRAM material resistivity is highly dependent on current injection so that current variability leads to resistance variability, degrading the read window of suitable programmed minimum and maximum resistances. Accordingly, the logic and monitor and determine applications characterized by repeated and enduring writes, and allocate such applications to memory segments other than PCRAM segments.

A memory device can be configured with logic that is operable to mitigate wear and energy. For example, PCRAM, which is susceptible to wear and failure for high levels of writing to a PCRAM cell over a memory lifetime, can be managed using mitigation techniques of write reduction and leveling to improve PCRAM endurance. In a particular operation, the logic can allocate some memory to function as a cache and track written cache lines and written cache words to implement partial writes and reduce wear. In another technique, the logic can monitor writes to eliminate redundant bit writes. In a typical memory access, a write updates an entire row of memory cells, many of which are redundant. The logic can remove the redundant bit writes and thereby substantially increase memory lifetimes, for example by preceding a write with a read and compare. Following the read, an XNOR gate can be used to filter redundant bit-writes. A PCRAM read is sufficiently faster than a PCM write and writes are less latency critical, so the performance reduction from reading before a write is in consequential.

In addition to eliminating redundant writes, the logic can also improve write wear performance by row shifting. After removing redundant bit writes, bits most written in a row tend to be localized so that the logic can perform simple shifting to more evenly distribute writes within a row.

The logic can attain additional wear improvement by segment swapping in which memory segments of high and low write accesses are periodically swapped. The logic can track write counts and manage a mapping table between segments.

In another example embodiment, the memory device can include logic operable to allocate memory according to wear such as by limiting the frequency of allocation for a particular memory block and by maintaining frequently changing metadata in DRAM that is separate from managed blocks of non-volatile memory.

Embodiments of the memory device can perform wear-leveling via managed allocation. For example, the logic can avoid allocation of a newly released memory block but rather time-stamp the block and add the block to a first-in-first-out queue. On subsequent allocations or releases, the logic can examine the block at the head of the queue and, if resident on the queue for a sufficient time, can remove the block from the queue and mark eligible for re-allocation. The logic can maintain list pointers in headers and footers of freed blocks and update the list pointers when adjacent free blocks are merged into a larger free region. In another technique, the logic can track the allocated or free state of memory blocks using a DRAM bitmap and manage the bitmap dynamically during operations.

In an example arrangement, the memory device can include memory of two types, such as non-volatile RAM (NVRAM) and DRAM in combination with logic that allocates memory accesses for the NVRAM. The logic prevents frequent reuse of memory locations and stores frequently-changing metadata in DRAM. Random number generator logic can also add checksums to detect and correct corruption.

In embodiments adapted to promote write durability, the memory device can include a non-volatile memory array with multiple types of memory including at least one portion of memory characterized by elevated write endurance. In a particular embodiment, the non-volatile memory array can include at least on portion formed of M-RAM which is based on a tunneling magneto-resistive (TMR) effect. The individual M-RAM memory cells include a magnetic tunnel junction (MTJ) which can be a metal-insulator-metal structure with ferromagnetic electrodes. A small bias voltage applied between the electrode causes a tunnel current to flow. The MTJ is exposed to an external magnetic field and forms a hysteresis loop with two stable states, corresponding to 0 and 1 data states at zero magnetic field. M-RAM is characterized among non-volatile memory technologies as having excellent write endurance with essentially no significant degradation in magneto-resistance or tunnel junction resistance through millions of write cycles. Accordingly, the logic can monitor and determine whether a particular application or process is characterized by frequent, enduring write operations and assign a portion of M-RAM to handle memory accesses.

Another memory technology characterized by write endurance is ferroelectric RAM (FeRAM). FeRAM can be constructed using material such as lead-zirconate-titanate (PZT), strontium-bismuth-tantalate (SBT), lanthanum substituted bismuth-tantalate (BLT), and others. An externally applied electric field causes polarization of the FeRAM material to be switched and information retained even upon removal of the field. In absence of the electric field, polarization has two distinct stable states to enable usage in memory storage. FeRAM can have write endurance at the level of M-RAM and is further characterized by a reduced cell size and thus higher density. Thus, the logic can monitor and determine whether a particular application or process is characterized by frequent, enduring write operations in combination with a relatively large number of storage cells. The logic can assign a portion of FeRAM to handle memory accesses.

In further applications and/or embodiments, the random number generator logic can be used in other operations such as error detection and/or error correction. For example, error correction codes defined over real number and complex number fields can be used in various applications but can suffer from numerical instability. Numerically stable real number and complex number codes can be attained via usage of a random number generator as described by Chen, Z. and Dongarra, J. ("Numerically Stable Real-Number Codes Based on Random Matrices", Information Theory Workshop 2004, San Antonio, Tex. (IEEE Information Theory Society), October 2004.

In a particular embodiment, the memory device can include the non-volatile memory array which is inexpensive and can be maintained in close proximity to other types of memory either internal to the memory device or in a nearby integrated circuit chip. The logic can be configured to perform bit-error correction by maintaining multiple copies of data in the high capacity enabled by non-volatile memory arrays, rather than the bit-checks of other error correction techniques. The multiple copies of data in the non-volatile memory can be used to occasionally detect errors using the multiple data copies. Accordingly, the memory device can include a relatively high capacity non-volatile memory array with high capacity and logic operable to perform error correction. The high capacity in non-volatile memory can be used for error detection and correction in which redundant data is held in the non-volatile memory for error correction in the form of multiple data copies to enable recovery by the receiving memory even when a number of errors up to the capability of the code in use are introduced during transmission or on storage. Errors can be corrected without requesting retransmission by the sender.

Figure 14A:
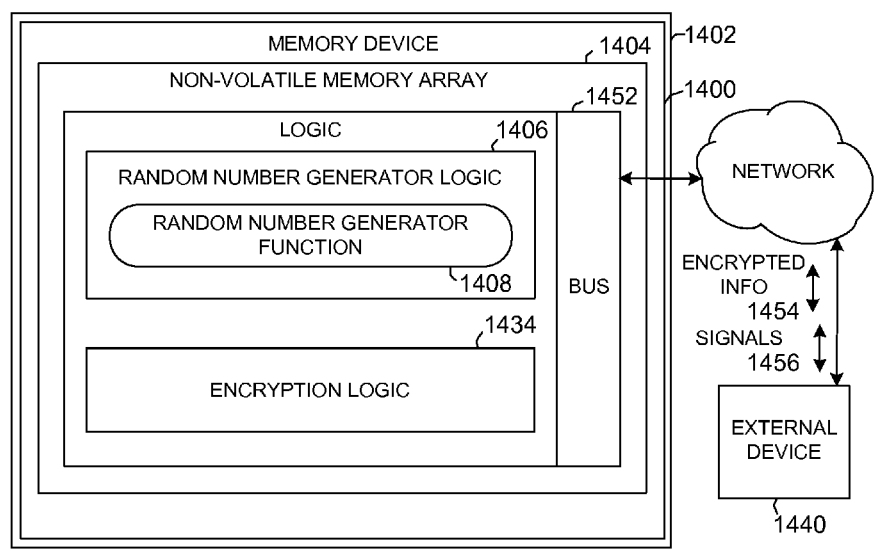
FIGS. 14A and 14B are schematic block diagrams depicting respective top and side view of an embodiment of a memory device that includes random number generator functionality in logic integrated with non-volatile memory and a bus.
Figure 14B:
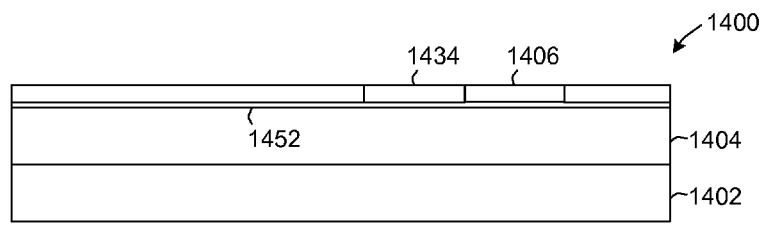

Referring to FIGS. 14A and 14B, schematic block diagrams depict respective top and side view of an embodiment of a memory device that includes random number generator functionality in logic integrated with non-volatile memory and a bus for communication with devices external to the memory device such as one or more processors. Accordingly, the memory device 1400 can further include a bus 1452 integrated with the encryption logic 1434 and the non-volatile memory array 1404 on the substrate 1402. The bus 1452 can be operable to transmit encrypted information 1454 between the memory device 1400 and a device external to the memory device 1440. The memory device can facilitate communication and handle additional bandwidth via usage of logic that can predict subsequent transfers and write to memory accordingly to enable processing on the predicted data values. In some embodiments, the memory device can include communication channels in addition to the bus to facilitate transfer of information for various management functions, alleviating the traffic on the bus.

A memory device that includes a communication interface or bus can communicate with other such devices or any type of device or system to enable multiple distributed devices to intercommunicate or to communicate with a network, for example in a cloud system. Thus, the memory device can be widely distributed or even ubiquitous, to perform selected local processing regarding usage and environment, for example to enable history tracking, data pre-processing, and sharing to other devices or through the cloud.

In some embodiments, the memory device 1400 can be configured such that the random number generator logic 1406 operable to perform at least one random number generator function 1408 in association with the non-volatile memory array 1404 is operable to perform at least one random number generator function 1408 independently of signals 1456 external to the memory device 1400.

In some embodiments, a memory device can include random number generator logic that facilitates sampling, for example in statistics and survey methodology to select a subset of entities from a statistical population to estimate characteristics of an entire population. Statistical sampling enables lower cost, faster data collection, and improved accuracy and quality of data. The random number generator logic can be used to facilitate random sampling of a selected size in which subsets can have a selected probability. In a simple random sample, each element of a frame has an equal probability of occurrence, minimizing bias and simplifying results.

Figure 15A:
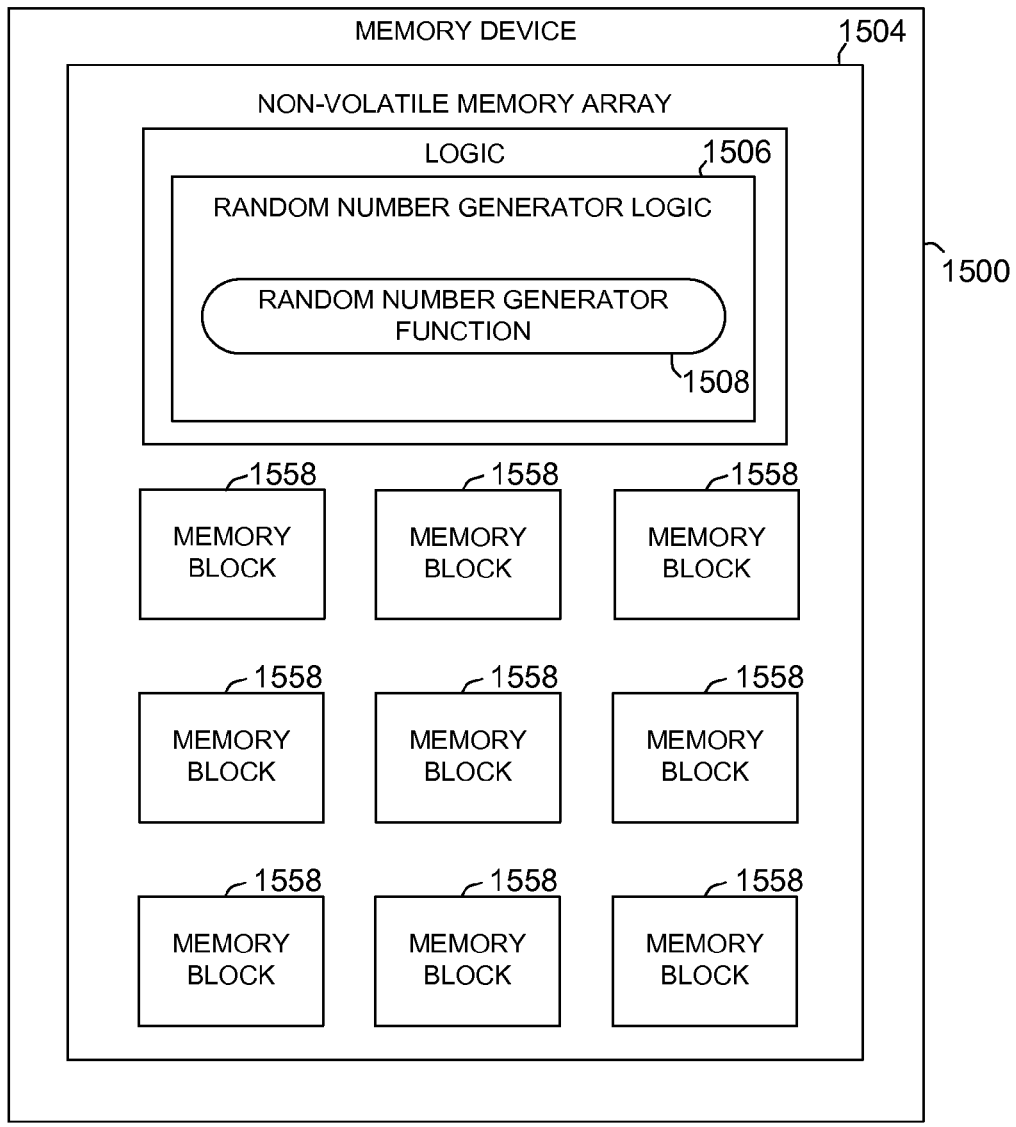
FIGS. 15A and 15B are respective top and side views of schematic block diagrams illustrating embodiments of a memory device that includes random number generator functionality in logic integrated with non-volatile memory that is partitioned into multiple memory blocks.
Figure 15B:
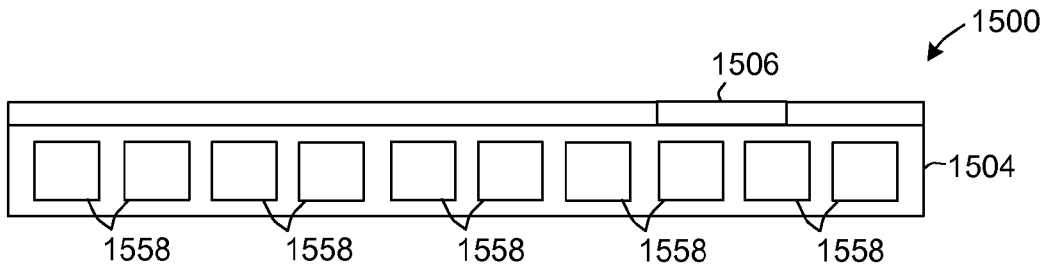

Referring to FIGS. 15A and 15B, respective top and side views of schematic block diagrams show embodiments of a memory device that includes random number generator functionality in logic integrated with non-volatile memory that is partitioned into multiple memory blocks. In a particular example, the memory device 1500 can be constructed with the non-volatile memory array 1504 partitioned into a plurality of memory blocks 1558. The random number generator logic 1506 operable to perform at least one random number generator function 1508 in association with the non-volatile memory array 1504 can be operable to monitor memory accesses, determine statistics on type and number of instructions of the monitored memory accesses, and allocate at least one random number generator function 1508 among the plurality of memory blocks 1558 based on the determined statistics.

Accordingly, random number generator logic 1506 can be operable to monitor memory accesses, determine statistics on type and number of instructions of the monitored memory accesses, and predict a sequence of instructions and data using the determined statistics. The logic can oversee operations of an overall system, maintaining statistics on the type and number of instructions communicated and processed. In some embodiments, logic can be operable to monitor memory accesses, detect a pattern of instructions and data from the monitored memory accesses, predict expected instructions and data from the detected pattern of instructions and data using, for example, a probability sampling, and preprocessing the predicted expected instructions. In probability sampling, instructions and/or data in the population of instructions and/or data can have a greater than zero probability of being selected in the sample, and the probability can be accurately determined. In some applications, the logic can use the statistics to predict a future sequence of instructions and data. The logic can detect patterns in which a first sequence of data and/or instructions is commonly followed by a second sequence. Upon detection of such a first sequence, the logic can apply the second sequence to the memory without actually receiving the second sequence, for example from a processor via the data bus. Thus, the logic can accelerate data handling and work throughput. The logic can monitor data and/or instructions and anticipate requests for memory. The logic can also detect an indexing pattern of instructions and interactions with memory using specialized logic that is integrated into the non-volatile memory area, enabling preprocessing of expected instructions within the memory. The logic thus can perform statistical operations that analyze instruction sequences to predict the type of instructions to perform using logic that is distributed within the non-volatile memory arrays of the memory device.

In another example embodiment, the memory device 1500 can be formed where the non-volatile memory array 1504 includes a plurality of memory blocks 1558. The random number generator logic 1506 operable to perform at least one random number generator function 1508 in association with the non-volatile memory array 1504 can be operable to monitor writes to the plurality of memory blocks 1558 of the non-volatile memory array 1504 and allocate at least one random number generator function 1508 among the plurality of memory blocks 1558 based on results of the monitoring.

Figure 16A:
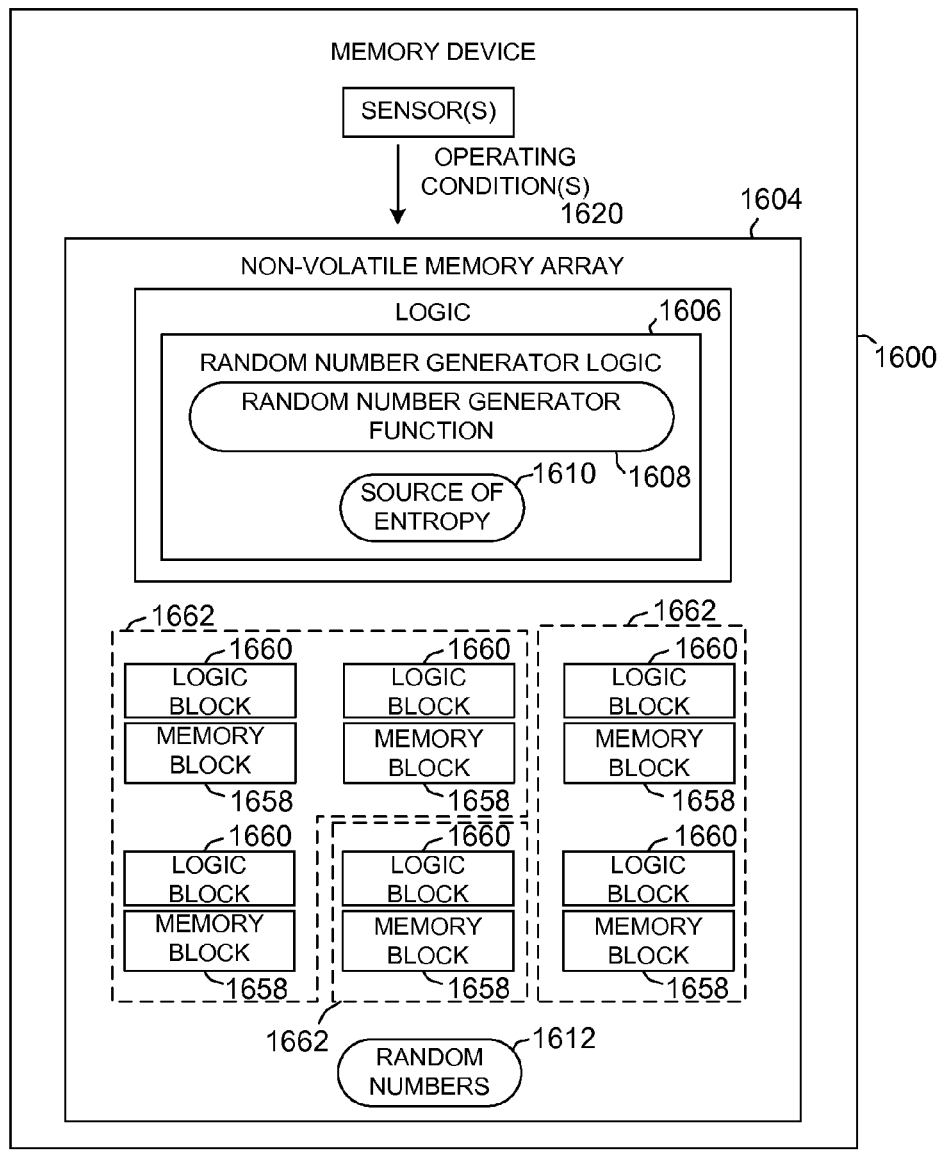
FIGS. 16A and 16B are respective top and side views of schematic block diagrams depicting embodiments of a memory device that includes random number generator functionality in logic partitioned into logic blocks integrated with non-volatile memory that is partitioned into multiple memory blocks corresponding to the logic blocks.
Figure 16B:
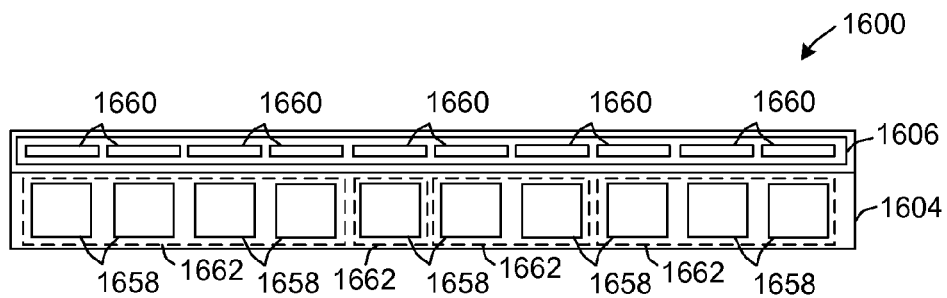

Referring to FIGS. 16A and 16B, respective top and side views of schematic block diagrams illustrate embodiments of a memory device that includes random number generator functionality in logic partitioned into logic blocks integrated with non-volatile memory that is partitioned into multiple memory blocks corresponding to the logic blocks. Accordingly, the memory device 1600 can be arranged in a manner that the non-volatile memory array 1604 is partitioned into a plurality of memory blocks 1658. The random number generator logic 1606 operable to perform at least one random number generator function 1608 in association with the non-volatile memory array 1604 can be partitioned into a plurality of logic blocks 1660 spatially distributed over the non-volatile memory array 1604 wherein one or more of the plurality of logic blocks 1660 are associated with one or more of the plurality of memory blocks 1658.

In some applications and/or embodiments, different memory blocks can be allocated for respective different functionality so that the logic blocks can support functionality that is specific to the appropriate memory blocks.

In further applications and/or embodiments, the memory device 1600 can be implemented in a way that the non-volatile memory array 1604 is partitioned into a plurality of memory blocks 1658. The random number generator logic 1606 operable to perform at least one random number generator function 1608 in association with the non-volatile memory array 1604 can be partitioned into a plurality of logic blocks 1660 spatially distributed over the non-volatile memory array 1604 and is operable to receive a report on at least one operating condition 1620 of system performance at system bootstrap loading and allocate functionality of one or more of the plurality of logic blocks 1660 with one or more of the plurality of memory blocks 1658 based on the report. An operation at bootstrap loading can cause the system to report on the operating condition of all components (including all chunks of memory) to enable allocation of functionality based on performance of the components.

In a particular application, the memory device can include logic that restores a persistent application state by mapping non-volatile memory pages across system reboot operations, for example by mapping non-volatile RAM pages in different processes including processes that are not necessarily concurrent. The logic can also support access control in portions of the non-volatile RAM in the manner of file system access control.

Some types of memory can be susceptible to failure under specified conditions. For example, two-terminal non-volatile memory devices based on resistance switching effects, called memristors, are susceptible to damage from temperature and bias field conditions. Placing a memristor in an oven or applying a bias field can erase the entire memory. A memory device can include a portion of memory which is susceptible to a particular condition and another, redundant portion which is resistant to the condition, thereby enabling operation in a RAID (redundant array of independent disk) array fashion to ensure retention of data during condition episodes. In case of accidental erasure, the logic can perform functionality analogous to that of a RAID array, for example, to use a slow memory that is impervious to magnetic fields to rebuild the erased data. In a particular embodiment, the slow memory can maintain hash tables are can be heat or magnetic-resistant. A two-way hash can be used to represent data as a hash, thereby reducing memory size.

The memory device can include logic that facilitates accessing of memory based on a determination of the type of operations being performed. For example, the logic can detect high traffic in video streaming and modify data handling to shift from 16-bit byte memory accesses to accessing of blocks of data. For cloud computing applications which are limited by bandwidth, the logic in the locally-controlled memory device can push all physical parameters off an external processor into the memory device, avoiding the bandwidth limitation and enabling additional memory-local capability including potentially different error correction algorithms. The memory device can thus enable a large scale memory with local control, such as a video memory with frame buffers or a dedicated image memory.

In some applications and/or embodiments, a memory device can incorporate reduced data set redundancy in which a data copy can be compressed in a suitable manner. The logic can perform redundant data management relatively slowly, avoiding the heat buildup that can result from a fast data transfer. Thus, redundant backup memory buses can be run at comparatively slow speed, thereby avoiding a significant increase in the heat budget for redundancy processing.

The control store can be configured to enable new operations. For example, the logic can be configured to facilitate efficient memory accesses. In a particular example, the logic can support a particular type of special image store which stores information of a particular size and form efficiently in memory, that writes different memory elements concurrently to a value that is suitable according to characteristics of the incoming image data. Special instructions can be used that can efficiently perform transforms on the image data.

In still further embodiments, the memory device 1600 can be formed where the non-volatile memory array 1604 is partitioned into a plurality of memory blocks 1658 characterized by a plurality of different operating characteristics 1662. The random number generator logic 1606 operable to perform at least one random number generator function 1608 in association with the non-volatile memory array 1604 can be partitioned into a plurality of logic blocks 1660 spatially distributed over the non-volatile memory array 1604 wherein one or more of the plurality of logic blocks 1660 are associated with one or more of the plurality of memory blocks 1658 at least partly based on the operating characteristics 1662 of the plurality of memory blocks 1658.

In a particular application, the random number generator logic can be used to facilitate sampling, for example in seeking knowledge about the cause system of which an observed condition is an outcome. Sampling theory can treat the observed condition as a sample of a larger super-condition or for handling a condition from which a sample is drawn may not be the same as a condition for which information is sought. In the application of failure prediction, the logic can analyze the monitored operating characteristics, detect a precursor to a memory failure based on the analysis, and allocate memory accesses based on the detected precursor. Accordingly, the logic can be used to predict how and when failures will take place using any suitable information for making the prediction. For example, the logic can use temperature measurements to predict failure or use various forms of information to make predictions. In a particular embodiment, the logic can enable writing data at a high rate in some conditions and limit writing speed in other conditions. For example, at high temperatures for a memory that is susceptible to failure, the logic can limit writing speed to a low rate while allowing higher write data rates at lower temperature. In some applications or contexts, the logic can perform performance mapping at selected time intervals, for example updating a map of sections of memory every 10,000 writes. The operating logic can determine how the memory is used and project back to determine characteristics of the operating environment.

In additional example embodiments or applications, the memory device 1600 can be configured such that the non-volatile memory array 1604 is partitioned into a plurality of memory blocks 1658 characterized by a plurality of different operating characteristics 1662. The random number generator logic 1606 operable to perform at least one random number generator function 1608 in association with the non-volatile memory array 1604 can be operable to monitor operating characteristics 1662 of the memory device, analyze the monitored operating characteristics 1662, and allocate at least one random number generator function 1608 among the plurality of memory blocks 1658 based on the analysis.

Different types of memory can have different operating characteristics. The memory device can be formed of multiple memory segments that have different operating characteristics, for example in aspects of speed, power consumption, size, as well as susceptibility or resistance to particular operating conditions such as magnetic field characteristics, temperature, and voltage. The logic can operate as a memory controller integrated with the non-volatile memory array to optimize for the particular memory type depending, for example, on application constraints such as the amount of computation, energy consumption load, and many other conditions. For example, logic metadata can supplies intra-memory hints about heat generation.

For example, in some embodiments, the memory device can include both phase change memory (PCRAM) and other memory types and the logic can assign memory usage according to various operating characteristics such as available power. In a specific example, PCRAM and DRAM may be selected based on power considerations. PCRAM access latencies are typically in the range of tens of nanoseconds, but remain several times slower than DRAM. PCRAM writes use energy-intensive current injection, causing thermal stress within a storage cell that degrades current-injection contacts and limits endurance to hundreds of millions of writes per cell. In a memory device that uses both PCRAM and DRAM, the logic can allocate memory usage according to the write density of an application.

A memory device can allocate memory for a particular application or operation based on scalability, for example by determining whether a substantial number of storage cells is to be used. PCRAM can be a highly scalable memory technology since thermal resistivity increases, contact area decreases, and the volume of phase-change material to block current flow decreases with feature size. As feature size becomes smaller, contact area decreases quadratically, and reduced contact area causes resistivity to increase linearly, causing programming current to decrease linearly. Thus PCRAM can attain not only smaller storage elements but also smaller access devices for current injection, leading to lower memory subsystem energy. Thus, the logic can allocate PCRAM segments to applications characterized by large memory use and density.

In some embodiments and/or applications, the memory device can be configured to allocate different portions of memory that have differing characteristics to specific applications. Some characteristics of memory can be better for some applications. For example, the logic can assign data in high-speed operations to high-speed memory while assigning less time-critical applications to slower memory. The logic can assign frequently updated information to memory types that are more durable to writes. In another example application, the memory device can be used in an end-to-end image storage system which includes multiple types of memory including multiple types of non-volatile RAM. For example, the memory device can be used to supply inexpensive memory such as memory stripes that are not part of a device such as a picture telephone, but is used to accumulate data (such as pictures) using some mirror communications that are facilitated by intelligence supplied by the logic. In an example application, the logic can activate to perform data communication when the memory device is in a location sufficiently proximal to the picture telephone to enable data transfer. The logic can be used to detect that the picture telephone and the memory device are sufficiently close to perform a data transfer and, if so, operate in a low operation, low power mode to perform the data communication. Accordingly, the intelligence of the logic can enable data transmission when the memory is in any location that is sufficiently close to the data source.

In some embodiments, the memory device can include some memory that is unacceptable for standard processing but very inexpensive and thus may have some usefulness and cost-effectiveness in some operations. For example, a relatively fast but error-prone memory may be useful for video processing. In various applications, the basis of memory quality may vary, for example, error rate, speed, and the like.

The memory device can thus be used for a wide variety of data communication operations to enable concentration of data originating from many sources. In particular arrangements, a memory device can include multiple types of memory with multiple memory characteristics in terms of cost, price, power, reliability, and the like. A memory device can be optimized to any desired characteristic such as memory quality, memory power, cost in terms of number of electrons, noise, power consumption, and others. For example, power consumption can be optimized by lowering access threshold. The logic can be configured to determine the source of noise, for example if noisy during writing, the logic can determine how little write current can be used, thereby reducing power consumption. The logic can be used to monitor electrical characteristics such as power or charge. Only so many electrons are available in a memory and the logic can be configured to determine how few electrons can be used to perform a particular operation such as read/write operations.

The memory device can include multiple types of memory including the non-volatile memory array in the form of multiple types of non-volatile memory technologies, in addition to portions of memory that may be volatile. The memory device may include multiple types of memory for use in a redundant fashion. Accordingly, the memory device can include two or more memory segments of any non-volatile memory type or technology including read-only memory, flash memory, ferroelectric random access memory (F-RAM), magneto-resistive RAM (M-RAM) or the like. The logic can operate a segment of M-RAM which is comparable in speed and capacity to volatile RAM while enabling conservation of energy, rapid or instantaneous start-up and shutdown sequences. In other applications, the memory device can include memory in the form of charge-coupled devices (CCDs) that are not directly addressable or other pure solid state memory that is reliable and inexpensive for use as separate memory device for various applications such as cell phones, and the like.

In a memory device that includes multiple different types of memory including a spin-transfer M-RAM, the logic can assign functionality at least in part based on the magnetic properties of memory. In a system that includes at least one portion of F-RAM, the logic can exploit operating characteristics of extremely high endurance, very low power consumption (since F-RAM does not require a charge pump like other non-volatile memories), single-cycle write speeds, and gamma radiation tolerance. The memory device can include different segments of different types of memory including volatile and non-volatile memory, flash, dynamic RAM (DRAM) and the like, and use the logic to attain different performance/cost benefits.

The memory device can, in addition to including multiple types of memory, can include multiple different classes of memory of the same memory type to attain a desired operating characteristic. The different classes of memory may include memory of the same technology with different operating parameters or different fabrication process parameters. The different classes of memory may be formed with different polysilicon types, different metal types, different silicides or salicides, various source, gate, and spacer dimensions, different annealing processes, and any other suitable variation in fabrication technique.

In some embodiments and/or applications, the logic can allocate instruction cache and data cache depending on the application and environment. In further arrangements, the logic can also select physical locations of memory depending on application and operating environment.

Thus, the logic can be operable to perform maintenance operations of the memory in response to physical phenomena imposes on the memory. For example, the memory device can incorporate sensors or other components that detect phenomena which can be monitored by the logic to detect magnetic fields, electrical conditions, temperature, and the like to enable the logic to perform actions to maintain, repair, clean, or other operations applied to the memory.

In various embodiments, the memory device 1600 can be constructed with the non-volatile memory array 1604 partitioned into a plurality of memory blocks 1658 characterized by a plurality of different operating characteristics 1662. The random number generator logic 1606 operable to perform at least one random number generator function 1608 in association with the non-volatile memory array 1604 can be operable to monitor operating characteristics 1662 of the memory device, analyze the monitored operating characteristics 1662, and determine a source of entropy 1610 for generating random numbers 1612 based on the analysis of the monitored operating characteristics 1662. The memory device that includes logic integrated with non-volatile memory has inherent characteristics for supplying a source of entropy for generating random numbers. Operating characteristics of the memory device can operate as a physical source of randomness. A physical random number generator can be based on effectively random atomic or subatomic physical phenomenon having unpredictability based on quantum dynamic considerations. Various sources of entropy can include aspects of speed, power consumption, size, as well as susceptibility or resistance to particular operating conditions such as magnetic field characteristics, temperature, and voltage.

Figure 17A:
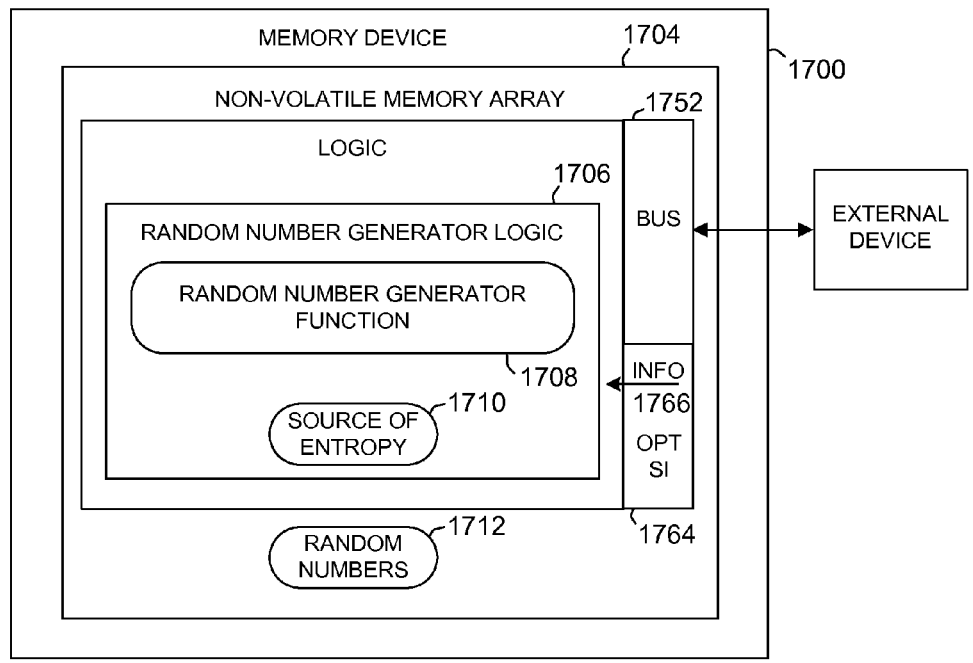
FIGS. 17A and 17B are respective top and side views of schematic block diagrams showing embodiments of a memory device that includes random number generator functionality in logic integrated with non-volatile memory and optical silicon that enables communication independent of a bus structure.
Figure 17B:
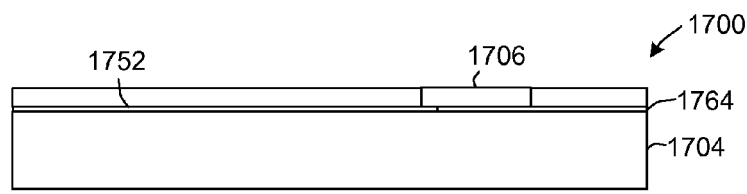

Referring to FIGS. 17A and 17B, respective top and side views of schematic block diagrams show embodiments of a memory device that includes random number generator functionality in logic integrated with non-volatile memory and optical silicon that enables communication independent of a bus structure. Thus, the memory device 1700 can further include optical silicon 1764 operable to communicate optically, independently of a bus 1752 coupled to the memory device 1700. The random number generator logic 1706 operable to perform at least one random number generator function 1708 in association with the non-volatile memory array 1704 can be operable to receive information 1766 from the optical silicon 1764 and determine a source of entropy 1710 for generating random numbers 1712 based on the received information 1766. Usage of optical silicon can enable the memory device to avoid the bandwidth and bottleneck problems of a system bus. The optical silicon can enable data to pass more quickly from outside the memory device to the memory. The memory device can support a WiFi network which optimizes memory for a particular application. Optical silicon can be used to alleviate some of the bandwidth problem for reading high volumes of data, such as for moving photographs from a camera or camera-phone to a storage device such as a computer or library.

For example, an optical sensor or silicon-based optical data connection can use silicon photonics and a hybrid silicon laser for communication between integrated circuit chips at distributed locations using plasmons (quanta of plasma oscillation) to communicate over relatively long distances, for example 2-3 inches on a narrow nano-wire coupler. The plasmon is a quasiparticle that results from quantization of plasma oscillations. Data can be received and converted using an optical antenna, a nano-cavity, or a quantum dot. The communication field can travel independently of a wired bus structure. For example, the memory device can receive information via the optical link, independently of the system bus connected to a processor, and the logic can use the extra-bus information to perform management or housekeeping functions to track applications and/or processes (or, for example, bit correction) via data sent optically to the memory device. The optical link thus enables low-bandwidth, back-channel communication, enabling formation of a memory that can communicate with large bursts of data for placement with optical accessibility.

The memory device can use the optical communication interface to substantially increase bandwidth. For example, dynamic random access memory (DRAM) cannot maintain synchrony over a distance of about four inches so that DRAM must be within four inches or less of a communicating processor, resulting in the memory bus becoming a data choke point, which can be relieved by the optical communication interface. Embodiments of the memory device with an optical interface can use the logic to perform bus control operations using an optical clock and interferometry using interfering optical beams to accelerate data communication.

In some specific embodiments, the optical silicon interface can be operated by the logic to increase data communication speed and reliability by constructing signals in the form of a sine-wave in a piece-wise manner, measuring segments above and below a base line and assigning digital values as 0 or 1 depending on wave position. Accordingly, formation of square wave signals is avoided, which attains benefits to heat dissipation, which is proportional to frequency squared.

Figure 18:
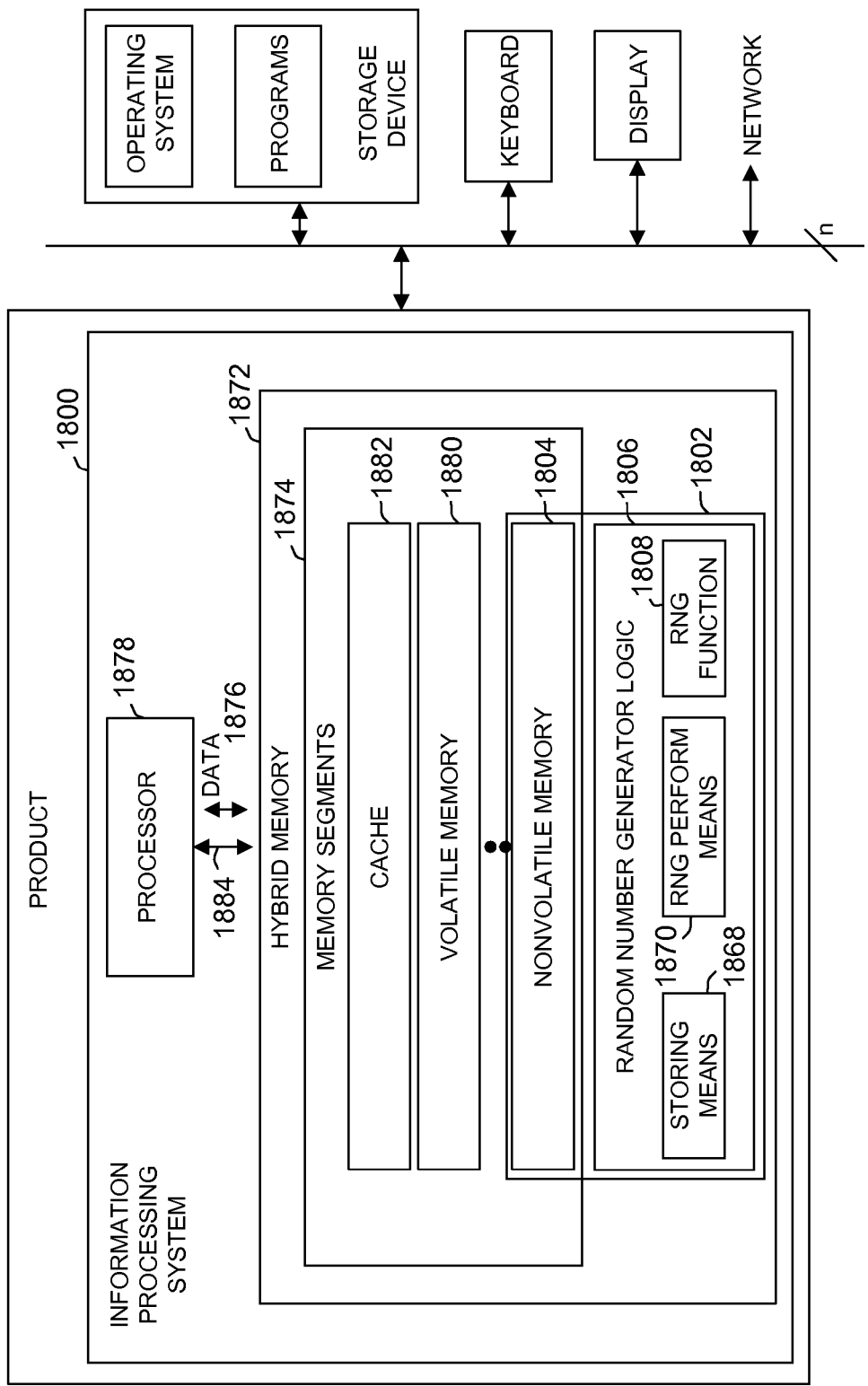
FIG. 18 is a schematic block diagram showing an embodiment of an information processing system including random number generator functionality in logic integrated with non-volatile memory.

Referring to FIG. 18, a schematic block diagram shows an embodiment of an information processing system including random number generator functionality in logic integrated with non-volatile memory. Accordingly, in some embodiments, an information processing system 1800 can include a means 1868 for storing information including random number generator logic 1806 integrated in combination with a non-volatile memory array 1804 on a substrate 1802, and means 1870 for performing at least one random number generator function 1808 in association with the non-volatile memory array 1804.

In an example embodiment, the information processing system 1800 can include a hybrid memory 1872 that includes multiple memory segments 1874 characterized by a multiple different operating characteristics. The hybrid memory 1872 can store data 1876 communicated from a processor 1878. The information processing system 1800 can further include logic for performing encryption operations on the data 1876 during transfers between the memory segments 1874.

In some embodiments, the information processing system 1800 can be constituted wherein the logic operable to perform encryption operations is operable to perform encryption operations on the data 1876 during transfers between the processor 1878 and the multiple memory segments 1874.

The multiple memory segments 1874 can be arranged to include various types of memory with different characteristics and speeds, for example the multiple memory segments 1874 can comprise volatile main memory 1880, non-volatile main memory 1804, or a combination of memory types.

In particular embodiments, the multiple memory segments 1874 can constitute a volatile main memory 1880 and a non-volatile main memory 1804 wherein the volatile main memory 1880 has faster operating characteristics than the non-volatile main memory 1804. For example, the multiple memory segments 1874 can be formed in memory subsystem combining DRAM and a large amount of nonvolatile memory such as flash or phase change memory (PCM).

In some information processing system 1800 embodiments, the multiple memory segments 1874 can include a cache 1882. In an example embodiment, DRAM can operate as a cache 1882 for the PCM or nonvolatile memory, facilitating channel encryption between the processor 1878 and the information processing system 1800. The logic operable to perform encryption operations can decrypt the information encrypted by the processor 1878 and sent over the channel and store the decrypted information in the DRAM, then can use storage encryption when passing the information from the DRAM to the PCM or nonvolatile memory 1804.

Various embodiments of the information processing system 1800 can be configured for channel encryption. For instance, the logic operable to perform encryption operations can function to encrypt data 1876 on a communication channel 1884 that communicates information between the processor 1878 and the hybrid memory 1872.

The information processing system 1800 can be configured to perform one or more of several channel encryption operations in cooperation with a processor 1878. For instance, the logic operable to perform encryption operations can operable to decrypt information encrypted by the processor 1878. In some embodiments and/or conditions, the logic operable to perform encryption operations is operable to decrypt address and data information encrypted by the processor 1878 and store data at the address in the hybrid memory 1872. Similarly, the information processing system 1800 can be configured wherein the logic operable to perform encryption operations is operable to partially decrypt information encrypted by the processor 1878.

Some embodiments of the information processing system 1800 can include a random number generator, for example which can be closely associated to and integrated onto the information processing system 1800 chip. Accordingly, the processor 1878 can implement a pseudo-random number generator coupled to the hybrid memory 1872 and coupled to the logic operable to perform encryption operations. The pseudo-random number generator can be operable to generate numbers for usage in encrypting information.

The information processing system 1800 can be configured to implement one or more of a variety of security schemes including channel encryption, storage encryption, RSA (Rivest, Shamir, Adleman) cryptography and key distribution, Public Key Infrastructure (PKI). Accordingly, the logic operable to perform encryption operations can be operable to perform stream encryption of communicated information wherein processor and memory sides are assigned a key. In another example functionality, the logic operable to perform encryption operations can be operable to encrypt information that is storage encrypted wherein the storage-encrypted information is encrypted by the processor 1878, stored in the hybrid memory 1872, accessed from the hybrid memory 1872, and decrypted by the processor 1878.

In some embodiments and/or applications, the information processing system 1800 can be configured to use of cryptographic processing to facilitate information handling. For example, data can be copied for redundant storage and the redundant copy can be secured by encryption and stored in the non-volatile memory in encrypted form. The encrypted redundant copy of the data can be used for restoration in the event of a detected error. In another example, A cryptographic hash function generates information indicative of data integrity, whether changes in data are accidental or maliciously and intentional. Modification to the data can be detected through a mismatching hash value. For a particular hash value, finding of input data that yields the same hash value is not easily possible, if an attacker can change not only the message but also the hash value, then a keyed hash or message authentication code (MAC) can supply additional security. Without knowing the key, for the attacker to calculate the correct keyed hash value for a modified message is not feasible.

In a particular applications and/or arrangements, the security perimeter can be formed within the information processing system 1800 and, for example, enclose the entire information processing system 1800, between dynamic random access memory (DRAM) and the information processing system 1800, between non-volatile random access memory (RAM) and the information processing system 1800, or any other suitable position. The cryptographic and/or tamper-handling perimeter can further be generalized for positioning between a smaller amount of memory and a larger amount of memory in the information processing system 1800. Some embodiments can include a cryptographic perimeter in the absence of a tamper-handling perimeter.

In some embodiments, the logic operable to perform encryption operations can be operable to perform time-varying encryption. For example, channel encryption assisted by the information processing system 1800 can enable randomization of encrypted information wherein encrypted data is read back and encryption can be stripped off by the receiving processor 1878. The information processing system 1800 with logic or other smart component can enable time-varying encryption. Data can be written to an address which, when read back, is different, but no information is lost since the reading processor 1878 or other reading device at the opposite side of the channel from the smart memory has sufficient intelligence capability to strip off the encryption.

In an example embodiment, the information processing system can include logic can allocate writes according to memory type. For example, the information processing system can include a section of PCRAM. Writes can result in substantial wear in PCRAM. When current is injected into a volume of phase-change material, thermal expansion and contraction degrade the electrode storage contact, resulting in programming currents injected into the memory cell that are insufficiently reliable. PCRAM material resistivity is highly dependent on current injection so that current variability leads to resistance variability, degrading the read window of suitable programmed minimum and maximum resistances. Accordingly, the logic and monitor and determine applications characterized by repeated and enduring writes, and allocate such applications to memory segments other than PCRAM segments.

A information processing system can be configured with logic that is operable to mitigate wear and energy. For example, PCRAM, which is susceptible to wear and failure for high levels of writing to a PCRAM cell over a memory lifetime, can be managed using mitigation techniques of write reduction and leveling to improve PCRAM endurance. In a particular operation, the logic can allocate some memory to function as a cache and track written cache lines and written cache words to implement partial writes and reduce wear. In another technique, the logic can monitor writes to eliminate redundant bit writes. In a typical memory access, a write updates an entire row of memory cells, many of which are redundant. The logic can remove the redundant bit writes and thereby substantially increase memory lifetimes, for example by preceding a write with a read and compare. Following the read, an XNOR gate can be used to filter redundant bit-writes. A PCRAM read is sufficiently faster than a PCM write and writes are less latency critical, so the performance reduction from reading before a write is in consequential.

In some embodiments and/or applications, the logic can allocate instruction cache and data cache depending on the application and environment. In further arrangements, the logic can also select physical locations of memory depending on application and operating environment.

In addition to eliminating redundant writes, the logic can also improve write wear performance by row shifting. After removing redundant bit writes, bits most written in a row tend to be localized so that the logic can perform simple shifting to more evenly distribute writes within a row.

The logic can attain additional wear improvement by segment swapping in which memory segments of high and low write accesses are periodically swapped. The logic can track write counts and manage a mapping table between segments.

In another example embodiment, the information processing system can include logic operable to allocate memory according to wear such as by limiting the frequency of allocation for a particular memory block and by maintaining frequently changing metadata in DRAM that is separate from managed blocks of non-volatile memory.

Embodiments of the information processing system can perform wear-leveling via managed allocation. For example, the logic can avoid allocation of a newly released memory block but rather time-stamp the block and add the block to a first-in-first-out queue. On subsequent allocations or releases, the logic can examine the block at the head of the queue and, if resident on the queue for a sufficient time, can remove the block from the queue and mark eligible for re-allocation. The logic can maintain list pointers in headers and footers of freed blocks and update the list pointers when adjacent free blocks are merged into a larger free region. In another technique, the logic can track the allocated or free state of memory blocks using a DRAM bitmap and manage the bitmap dynamically during operations.

Figure 19A:
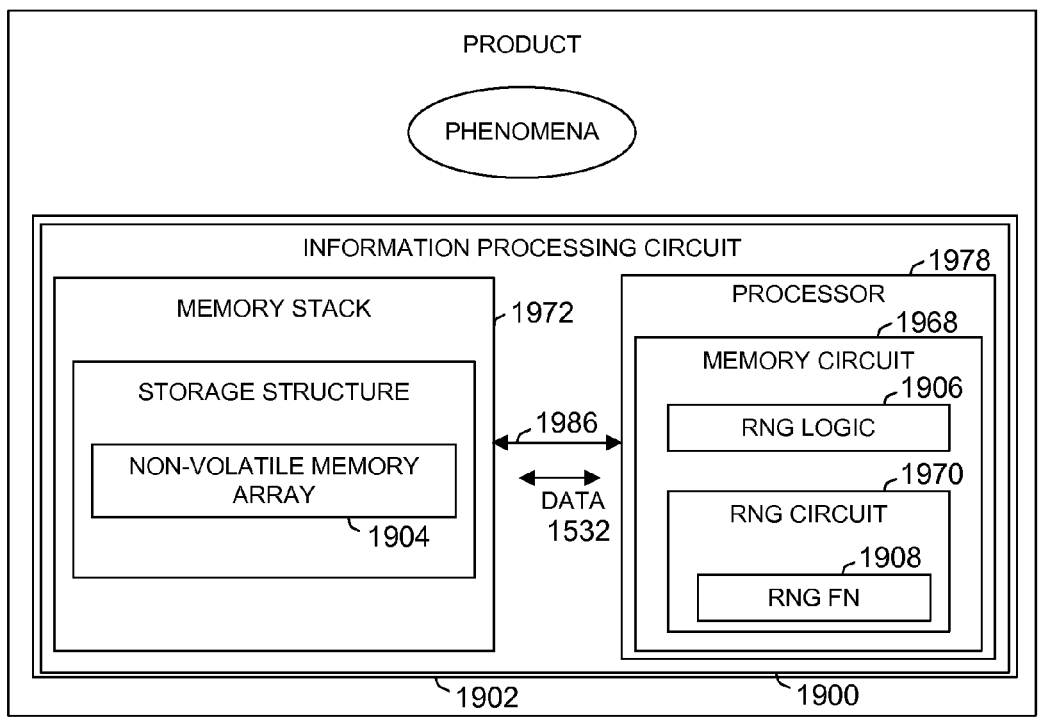
FIGS. 19A and 19B are a schematic block diagram and a side pictorial view illustrating an embodiment of an information processing circuit that includes random number generator functionality in logic integrated with non-volatile memory.
Figure 19B:
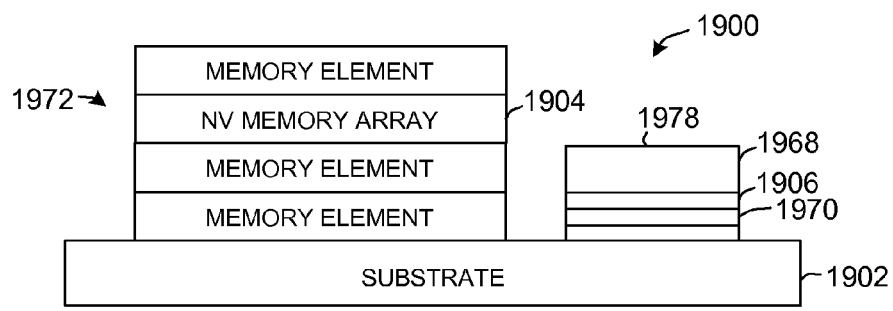

Referring to FIGS. 19A and 19B, a schematic block diagram and a side pictorial view illustrate an embodiment of an information processing circuit that includes random number generator functionality in logic integrated with non-volatile memory. An embodiment of an information processing circuit 1900 can include a memory circuit 1968 including random number generator logic 1906 integrated in combination with the non-volatile memory array 1904 on a substrate 1902, and circuitry 1970 for performing at least one random number generator function 1908 in association with the non-volatile memory array 1904.

Embodiments of a information processing circuit 1900 can make use of a memory stack 1972 to facilitate intelligent memory computation. In a particular example embodiment, intelligent memory computation can include security capabilities, including cryptographic security. The information processing circuit 1900 can be constituted to facilitate channel encryption through operation of the logic operable to perform encryption operations. Accordingly, the logic operable to perform encryption operations can be operable to perform channel encryption operations on a communication channel 1986 that communicates information between the processor 1978 and the memory stack 1972. Channel encryption can improve performance and economy in various applications and conditions in comparison to expensive storage encryption. The logic operable to perform encryption operations can facilitate good memory encryption, for example between the processor 1978 and the memory stack 1972. An illustrative configuration can include a CPU that interacts with the memory stack 1972 comprising multiple DRAM chips and the logic operable to perform encryption operations integrated into a logic chip operable to perform strong channel encryption between the CPU and the memory stack 1972.

In various embodiments, the information processing circuit 1900, the memory stack 1972, and the logic operable to perform encryption operations can be constituted to perform one or more of several security operations. For example, the logic operable to perform encryption operations is operable to decrypt information encrypted by the processor 1978. Similarly, the logic operable to perform encryption operations is operable to partially decrypt information encrypted by the processor 1978. The logic can also be operable to perform encryption operations is operable to perform stream encryption of information communicated on a communication channel 1986 wherein processor and memory sides of the communication channel 1986 are assigned a key. In an embodiment or circumstances where security can be best attained by using a combination of storage encryption and channel encryption, the logic operable to perform encryption operations is operable to perform channel encryption operations on a communication channel 1986 for information that is storage encrypted wherein the storage-encrypted information is encrypted by the processor 1978, stored in the memory stack 1972, accessed from the memory stack 1972, and decrypted by the processor 1978. The logic operable to perform encryption operations can also be operable to perform time-varying encryption.

Information can be stored in the memory stack 1972 unencrypted or the logic can encrypt the data for storage. Thus, channel encryption can be performed between the CPU and a logic chip, enabling cryptographic security without requiring storage encryption of data stored in the logic chip.

Various techniques may be used for forming an integrated circuit with a combination of the non-volatile memory array and the logic. In one example technique, an integrated circuit for a non-volatile memory cell transistor can be formed by constructing a layer of discrete storage cells over a substrate in two substrate regions, applying a dielectric layer over the layer of discrete storage cells in the two substrate regions, and building a barrier layer over the dielectric layer in the two regions. The barrier layer, dielectric layer, and the layer of discrete storage cells are then removed in one of the two substrate regions, leaving the layers intact in the other of the two substrate regions. An additional barrier layer is then formed over the substrate in the two substrate regions, then removed from the substrate region from which the barrier layer, dielectric layer, and the layer of discrete storage cells were previously removed. Two gates of a memory element are then formed respectively in the two substrate regions with one gate including a portion of the first barrier layer and another gate including a portion of the additional barrier layer. One aspect of fabricating a circuit that integrates the non-volatile memory array and the logic on the system is selection of a suitable annealing process. For example, the illustrative integrated circuit can include a charge storage layer and a barrier layer formed over both a non-volatile memory region and a logic region. The charge storage layer can be formed of one or more layers and can include multiple discrete storage cells for storing charge which are isolated by a dielectric layer of insulating material with a suitably high dielectric constant. The charge storage layer can be constructed by depositing and annealing the discrete storage cells (for example, one or more of a silicon material such as polysilicon, silicon carbide, or the like, or a suitable metal such as germanium) on a dielectric area. The thermal annealing action can be performed by rapid thermal annealing (RTA) or a slower annealing process such as laser spike annealing (LSA). Memory properties can be selected and controlled by optimizing the annealing condition, thereby resulting in an improved reliability, write durability, and failure resistance.

In another example technique for forming an integrated circuit with a combination of the non-volatile memory array and the logic, a non-volatile memory cell with improved charge retention on a substrate common with logic devices using a single-gate logic process in which a silicide-blocking dielectric barrier is formed over a floating gate of a non-volatile memory cell so that silicide cannot be formed over the floating gate but is formed over logic devices, thereby preventing bridging and silicide spiking in the non-volatile memory cell. The silicide-blocking dielectric barrier prevents silicide metal from contacting the floating gate or sidewall spacers while allowing the silicide metal in parts of active regions of the non-volatile memory cell at locations removed from the floating gate and spacers. The silicide regions can be constructed by initially depositing a refractory metal layer over the surface of the non-volatile memory cell, followed by a reactive anneal which causes the metal layer to react with the underlying contacted silicon regions to form silicide regions. A metal strip removed unreacted portions of the metal layer but leaves the silicide regions which are formed by a logic process using metals such as titanium, cobalt, nickel, or the like. A relatively slow annealing process can be used to produce suitable memory performance.

In a further example technique for forming an integrated circuit with a combination of the non-volatile memory array and the logic, a scalable, logic transistor can be constructed with drain and source formed as a pair of doped regions and a gate insulator layer formed over the substrate and between the drain and source. A gate stack can include a gate layer (polysilicon or metal) between two metal nitride layers. A non-volatile memory transistor that is compatible with the logic transistor can be added via a high-K dielectric constant film with an embedded metal nano-dot layer between a tunnel insulator and the gate stack. The drain and source doped regions can be n+ regions doped into a p-type substrate to form an n-channel Field Effect Transistor (FET) device. The diffusion regions can be formed using n+ doped amorphous silicon, followed by an anneal such as a rapid thermal anneal (RTA) to reduce thermal budget and silicidation. A p-channel FET can similarly be formed via p+ diffusion source/drain regions applied over an n-well region. In other embodiments, annealing can be performed using a slow annealing process to improve memory performance and write durability while reducing stress and defects.

In an additional example technique for forming an integrated circuit with a combination of the non-volatile memory array and the logic, non-volatile memory process steps can be added to a processor for forming high-voltage complementary metal-oxide semiconductor (CMOS) devices. The fabrication technique can include formation of isolation areas for the non-volatile memory and the high-voltage CMOS elements, forming high thermal drive process elements of both the memory and CMOS cells, forming mid thermal drive process elements of the logic CMOS cells, and forming low thermal process elements for logic CMOS, non-volatile memory, and high-voltage CMOS cells. Dopants for forming the devices can include masked implantation of boron, phosphorus and other species and subsequent annealing of the dopings, for example, using a slow annealing process to enhance charge retention in the system.

The non-volatile memory can be formed of one or more of any non-volatile memory type or technology including read-only memory, flash memory, ferroelectric random access memory (F-RAM), magneto-resistive RAM (M-RAM) or the like.

Figure 20P:
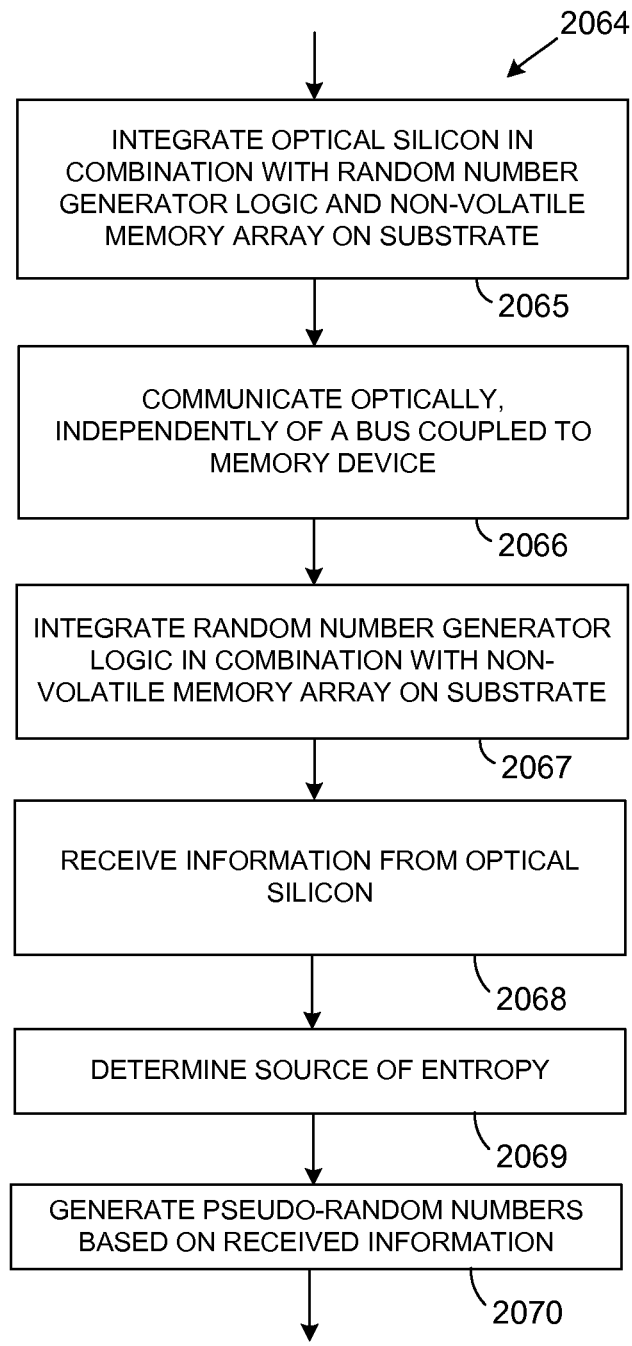

Referring to FIGS. 20A through 20P, multiple schematic flow charts show several embodiments and/or aspects of a method of manufacturing a memory device that includes random number generator functionality in logic integrated with non-volatile memory. The illustrative method 2000, depicted in FIG. 20A, of manufacturing a memory device can include forming 2001 a non-volatile memory array on a substrate, and integrating 2002 random number generator logic in combination with the non-volatile memory array on the substrate. The random number generator logic can be operable to perform 2003 at least one random number generator function in association with the non-volatile memory array.

Referring to FIG. 20B, in some embodiments, the method 2004 of manufacturing the memory device can further include forming 2005 a plurality of non-volatile memory segments characterized by a respective plurality of non-volatile memory types in the non-volatile memory array, and integrating 2006 the random number generator logic in combination with the non-volatile memory array on the substrate that is operable to use 2007 a plurality of non-volatile memory segments characterized by a respective plurality of non-volatile memory types to supply 2008 a source of entropy for generating 2009 random numbers.

In further embodiments and/or applications, as shown in FIG. 20C, the method 2010 of manufacturing the memory device can further include forming 2011 a plurality of non-volatile memory segments characterized by a respective plurality of non-volatile memory types in the non-volatile memory array, and integrating 2012 the random number generator logic in combination with the non-volatile memory array on the substrate that is operable to supply 2013 a seed for a pseudo-random number generator in association with a plurality of non-volatile memory segments characterized by a respective plurality of non-volatile memory types.

In various embodiments, as depicted in FIG. 20D, the method 2014 of manufacturing the memory device can further include coupling 2015 at least one sensor operable to detect at least one operating condition to the memory device, and integrating 2016 the random number generator logic in combination with the non-volatile memory array on the substrate that is operable use 2017 the at least one operating condition to supply 2018 a source of entropy for generating 2019 random numbers.

Referring to FIG. 20E, in some embodiments, the method 2020 of manufacturing the memory device can further include forming 2021 a plurality of non-volatile memory segments including at least in part lossy memory, and integrating 2022 the random number generator logic in combination with the non-volatile memory array on the substrate that is operable to use 2023 the lossy memory to supply 2024 a source of entropy for generating 2025 random numbers.

As shown in FIG. 20F, in various embodiments and/or applications, the method 2026 of manufacturing the memory device can further include coupling 2027 an interface to access a time signal to the random number generator logic, and integrating 2028 the random number generator logic in combination with the non-volatile memory array on the substrate that is operable to access 2029 the time signal and determine 2030 a source of entropy for generating 2031 random numbers based at least partly on the time signal.

In some embodiments, illustrated in FIG. 20G, the method 2032 of manufacturing the memory device can further include coupling 2033 an interface to access phenomena detectable at the memory device, and integrating 2034 the random number generator logic in combination with the non-volatile memory array on the substrate that is operable to monitor 2035 the phenomena detectable at the memory device and determine 2036 a source of entropy for generating 2037 random numbers based on the monitored phenomena.

In various embodiments and/or applications, as shown in FIG. 20H, the method 2038 of manufacturing the memory device can further include integrating 2039 encryption logic in combination with the random number generator logic and the non-volatile memory array on the substrate. The encryption logic can be operable to perform 2040 at least one encryption/decryption function associated with the non-volatile memory array.

Referring to FIG. 20I, selected embodiments of the method 2041 of manufacturing the memory device can further include integrating 2042 hash logic in combination with the random number generator logic and the non-volatile memory array on the substrate. The hash logic can be operable to perform 2043 a hash function using randomness supplied by the random number generator logic.

As illustrated in FIG. 20J, some embodiments of the method 2044 of manufacturing the memory device can further include integrating 2045 searching logic in combination with the random number generator logic and the non-volatile memory array on the substrate. The searching logic operable to perform 2046 amortized searching using randomness supplied by the random number generator logic.

As shown in FIG. 20K, an embodiment of the method 2047 of manufacturing the memory device can further include integrating 2048 sorting logic in combination with the random number generator logic and the non-volatile memory array on the substrate. The sorting logic can be operable to perform 2049 data sorting using randomness supplied by the random number generator logic.

Referring to FIG. 20L, in some embodiments, the method 2050 of manufacturing the memory device can further include integrating 2051 a bus and encryption logic in combination with the random number generator logic and the non-volatile memory array on the substrate. The bus can be operable to transmit 2052 encrypted information between the memory device and a device external to the memory device.

In further embodiments and/or applications, as shown in FIG. 20M, the method 2053 of manufacturing the memory device can be configured such that integrating 2054 random number generator logic in combination with the non-volatile memory array on the substrate further includes selectively distributing 2055 functionality of the random number generator logic across the non-volatile memory array.

In various embodiments, as depicted in FIG. 20N, the method 2056 of manufacturing the memory device can further include partitioning 2057 the non-volatile memory array into a plurality of memory blocks, and partitioning 2058 the random number generator logic into a plurality of logic blocks spatially distributed over the non-volatile memory array in a manner that one or more of the plurality of logic blocks are associated 2059 with one or more of the plurality of memory blocks.

Referring to FIG. 20O, in some embodiments, the method 2060 of manufacturing the memory device can further include partitioning 2061 the non-volatile memory array into a plurality of memory blocks characterized by a plurality of different operating characteristics, and partitioning 2062 the random number generator logic into a plurality of logic blocks spatially distributed over the non-volatile memory array. One or more of the plurality of logic blocks are associated 2063 with one or more of the plurality of memory blocks at least partly based on the operating characteristics of the plurality of memory blocks.

As shown in FIG. 20P, in various embodiments and/or applications, the method 2064 of manufacturing the memory device can further include integrating 2065 optical silicon in combination with the random number generator logic and the non-volatile memory array on the substrate. The optical silicon can be operable to communicate 2066 optically, independently of a bus coupled to the memory device, and integrating 2067 the random number generator logic in combination with the non-volatile memory array on the substrate that is operable receive 2068 information from the optical silicon and determine 2069 a source of entropy for generating 2070 random numbers based on the received information.

Referring to FIGS. 21A through 21X and FIGS. 22A through 22D, multiple schematic flow charts show several embodiments and/or aspects of a method of operating a memory device that includes random number generator functionality in logic integrated with non-volatile memory. The illustrative method 2100, depicted in FIG. 21A, of operating a memory device can include providing 2101 the memory device including random number generator logic integrated in combination with the non-volatile memory array on a substrate, and operating 2102 the random number generator logic. Operating 2102 the random number generator logic can include performing 2103 at least one random number generator function in association with the non-volatile memory array.

Referring to FIG. 21B, in some embodiments, the method 2104 of operating a memory device can be implemented in a way that performing 2103 at least one random number generator function in association with the non-volatile memory array includes supplying 2105 a source of entropy, and generating 2106 random numbers using the supplied source of entropy.

In further embodiments and/or applications, as shown in FIG. 21C, the method 2107 of operating a memory device can further include providing 2108 a plurality of non-volatile memory segments characterized by a respective plurality of non-volatile memory types in the non-volatile memory array. Performing 2103 at least one random number generator function in association with the non-volatile memory array can include using 2109 the plurality of non-volatile memory segments characterized by a respective plurality of non-volatile memory types in the non-volatile memory array to supply a source of entropy, and generating 2110 random numbers using the supplied source of entropy.

Figure 21D:
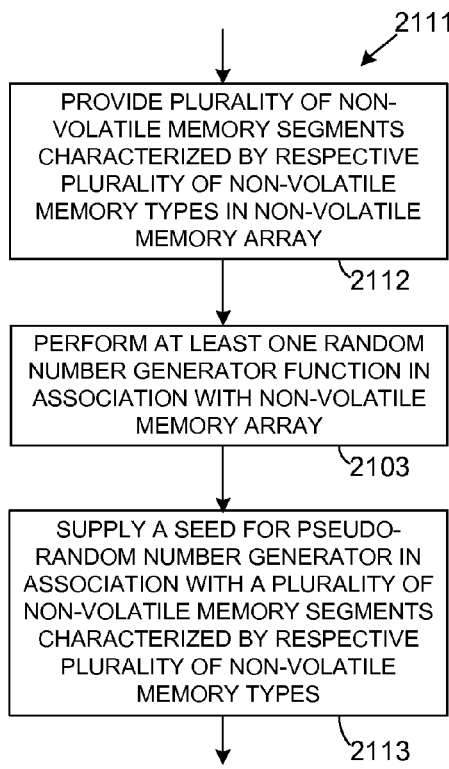
FIGS. 21A through 21X and FIGS. 22A through 22D are multiple schematic flow charts showing several embodiments and/or aspects of a method of operating a memory device that includes random number generator functionality in logic integrated with non-volatile memory.

In various embodiments, as depicted in FIG. 21D, the method 2111 of operating a memory device can further include providing 2112 a plurality of non-volatile memory segments characterized by a respective plurality of non-volatile memory types in the non-volatile memory array. Performing 2103 at least one random number generator function in association with the non-volatile memory array can include supplying 2113 a seed for a pseudo-random number generator in association with a plurality of non-volatile memory segments characterized by a respective plurality of non-volatile memory types.

Figure 21E:
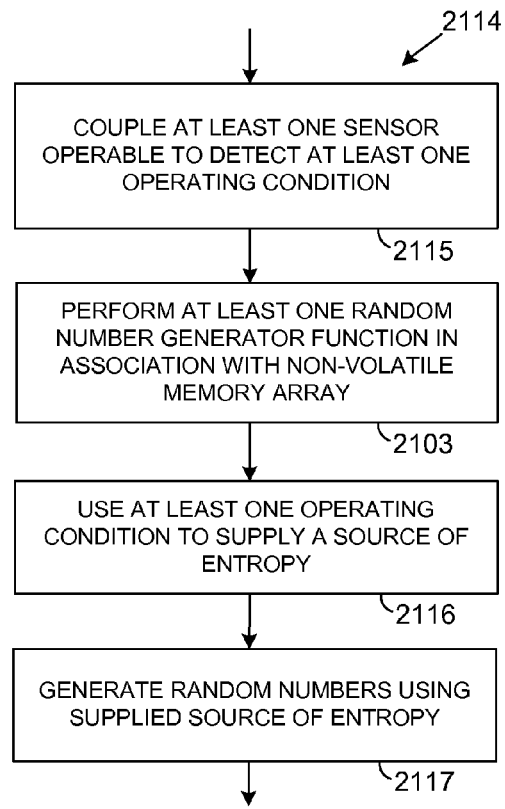

Referring to FIG. 21E, in some embodiments, the method 2114 of operating a memory device can further include coupling 2115 at least one sensor operable to detect at least one operating condition. Performing 2103 at least one random number generator function in association with the non-volatile memory array can include using 2116 the at least one operating condition to supply a source of entropy, and generating 2117 random numbers using the supplied source of entropy.

As shown in FIG. 21F, in various embodiments and/or applications, the method 2118 of operating a memory device can further include coupling 2119 at least one sensor operable to detect at least one operating condition. Performing 2103 at least one random number generator function in association with the non-volatile memory array can include monitoring 2120 the at least one operating condition, monitoring 2121 memory accesses, analyzing 2122 the monitored at least one operating condition and memory accesses, determining 2123 a source of entropy for generating random numbers based on the analysis of the monitored at least one operating condition and memory accesses, and generating 2124 random numbers using the supplied source of entropy.

In some embodiments, illustrated in FIG. 21G, the method 2125 of operating a memory device can further include providing 2126 a plurality of non-volatile memory segments including at least in part lossy memory. Performing 2103 at least one random number generator function in association with the non-volatile memory array can include using 2127 the lossy memory to supply a source of entropy for generating random numbers, and generating 2128 random numbers using the supplied source of entropy.

In various embodiments and/or applications, as shown in FIG. 21H, the method 2129 of operating a memory device can further include providing 2130 a time signal. Performing 2103 at least one random number generator function in association with the non-volatile memory array can include accessing 2131 the time signal, and determining 2132 a source of entropy for generating random numbers based on the time signal.

Referring to FIG. 21I, selected embodiments of the method 2133 of operating a memory device can further include providing 2134 a time signal. Performing 2103 at least one random number generator function in association with the non-volatile memory array can include accessing 2135 the time signal, monitoring 2136 memory accesses referenced by the time signal, and determining 2137 a source of entropy for generating random numbers based on the time signal and the memory accesses referenced by the time signal.

As illustrated in FIG. 21J, some embodiments of the method 2138 of operating a memory device can further include providing 2139 a device for detecting phenomena at the memory device. Performing 2103 at least one random number generator function in association with the non-volatile memory array can include monitoring 2140 the phenomena detectable at the memory device, and determining 2141 a source of entropy for generating random numbers based on the monitored phenomena.

As shown in FIG. 21K, an embodiment of the method 2142 of operating a memory device can further include providing 2143 an interface for communicating phenomena at the memory device. Performing 2103 at least one random number generator function in association with the non-volatile memory array can include accumulating 2144 information about phenomena associated with use of the memory device, and determining 2145 a source of entropy for generating random numbers based on the monitored phenomena.

Referring to FIG. 21L, in some embodiments, the method 2146 of operating a memory device can further include providing 2147 an interface for communicating phenomena at the memory device. Performing 2103 at least one random number generator function in association with the non-volatile memory array can include accumulating 2148 information about phenomena associated with at least one entity in association with the memory device, and determining 2149 a source of entropy for generating random numbers based on the monitored phenomena.

In further embodiments and/or applications, as shown in FIG. 21M, the method 2150 of operating a memory device can be implemented in a way that performing 2103 at least one random number generator function in association with the non-volatile memory array can include supplying 2151 a seed for a pseudo-random number generator in association with the non-volatile memory array.

In various embodiments, as depicted in FIG. 21N, the method 2152 of operating a memory device can further include providing 2153 the memory device including encryption logic integrated in combination with the random number generator logic and the non-volatile memory array on the substrate, and operating 2154 the encryption logic. Operating 2154 the encryption logic can include performing 2155 at least one encryption/decryption function associated with the non-volatile memory array.

Referring to FIG. 21O, in some embodiments, the method 2156 of operating a memory device can further include providing 2157 the memory device including encryption logic integrated in combination with the random number generator logic and the non-volatile memory array on the substrate, and operating 2158 the encryption logic. Operating 2158 the encryption logic can include performing 2159 at least one encryption/decryption function associated with the non-volatile memory array, and increasing 2160 throughput of encryption-type operations in combination with a device external to the memory device.

As shown in FIG. 21P, in various embodiments and/or applications, the method 2161 of operating a memory device can further include providing 2162 the memory device including encryption logic integrated in combination with the random number generator logic and the non-volatile memory array on the substrate, and operating 2163 the encryption logic. Operating 2163 the encryption logic can include performing 2164 at least one encryption/decryption function associated with the non-volatile memory array, and holding 2165 at least one encryption key secure from a device external to the memory device.

In some embodiments, illustrated in FIG. 21Q, the method 2166 of operating a memory device can further include providing 2167 the memory device including hash logic integrated in combination with the random number generator logic and the non-volatile memory array on the substrate, and operating 2168 the hash logic. Operating 2168 the hash logic can include performing 2169 at least one hash function using randomness supplied by the random number generator logic.

In various embodiments and/or applications, as shown in FIG. 21R, the method 2170 of operating a memory device can further include providing 2171 the memory device including searching logic integrated in combination with the random number generator logic and the non-volatile memory array on the substrate, and operating 2172 the searching logic. Operating 2172 the searching logic can include performing 2173 amortized searching using randomness supplied by the random number generator logic.

Referring to FIG. 21S, selected embodiments of the method 2174 of operating a memory device can further include providing 2175 the memory device including sorting logic integrated in combination with the random number generator logic and the non-volatile memory array on the substrate, and operating 2176 the sorting logic. Operating 2176 the sorting logic can include performing 2177 data sorting using randomness supplied by the random number generator logic.

Referring to FIG. 21T, in some embodiments, the method 2178 of operating a memory device can further include providing 2179 the memory device including sorting logic integrated in combination with the random number generator logic and the non-volatile memory array on the substrate, and operating 2180 the sorting logic. Operating 2180 the sorting logic can include monitoring 2181 a history and pattern of memory accesses, and performing 2182 sorting during system idle.

In various embodiments and/or applications, as shown in FIG. 21U, the method 2183 of operating a memory device can further include providing 2184 a bus and encryption logic integrated in combination with the random number generator logic and the non-volatile memory array on the substrate, and operating 2185 the bus. Operating 2185 the bus can include transmitting 2186 encrypted information between the memory device and a device external to the memory device.

As shown in FIG. 21V, in various embodiments and/or applications, the method 2187 of operating a memory device can be configured such that performing 2103 at least one random number generator function in association with the non-volatile memory array can include performing 2188 at least one random number generator function independently of signals external to the memory device.

Figure 21W:
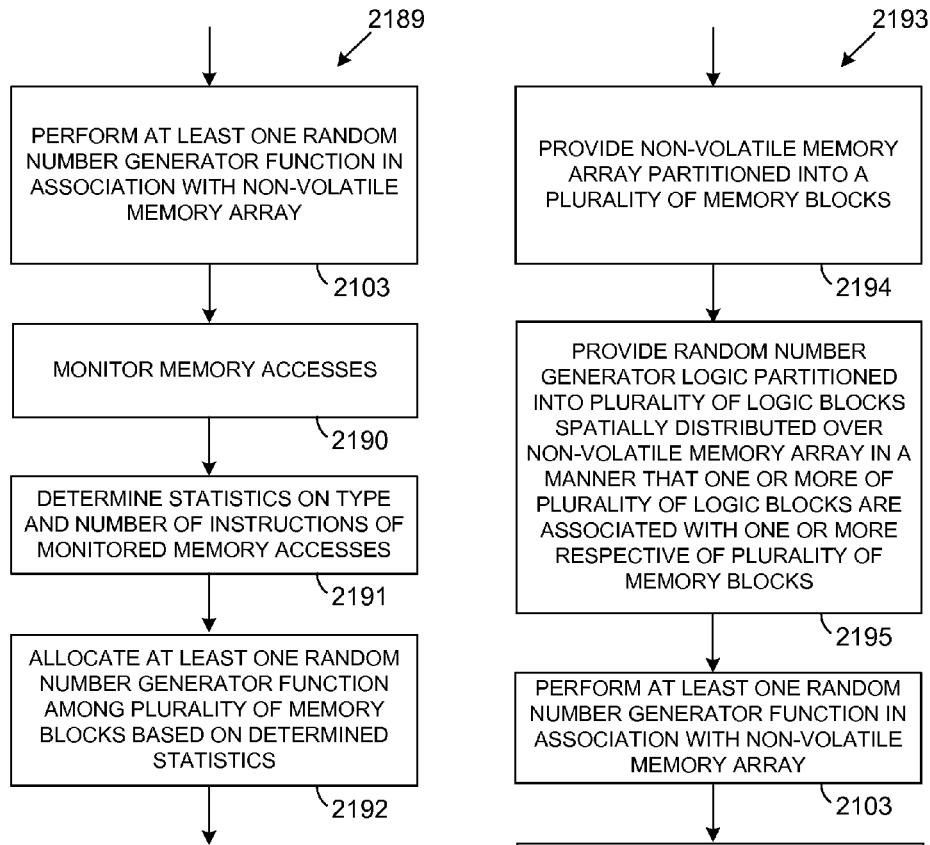

As illustrated in FIG. 21W, some embodiments of the method 2189 of operating a memory device can be implemented in a way that performing 2103 at least one random number generator function in association with the non-volatile memory array can include monitoring 2190 memory accesses, determining 2191 statistics on type and number of instructions of the monitored memory accesses, and allocating 2192 at least one random number generator function among the plurality of memory blocks based on the determined statistics.

Figure 21X:
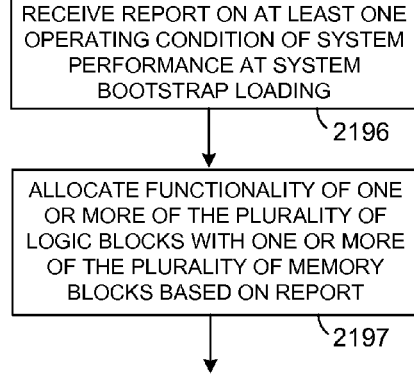

As shown in FIG. 21X, an embodiment of the method 2193 of operating a memory device can further include providing 2194 the non-volatile memory array partitioned into a plurality of memory blocks, and providing 2195 the random number generator logic partitioned into a plurality of logic blocks spatially distributed over the non-volatile memory array in a manner that one or more of the plurality of logic blocks are associated with one or more respective of the plurality of memory blocks. Performing 2103 at least one random number generator function in association with the non-volatile memory array can include receiving 2196 a report on at least one operating condition of system performance at system bootstrap loading, and allocating 2197 functionality of one or more of the plurality of logic blocks with one or more of the plurality of memory blocks based on the report.

Figures 22A, 22B:
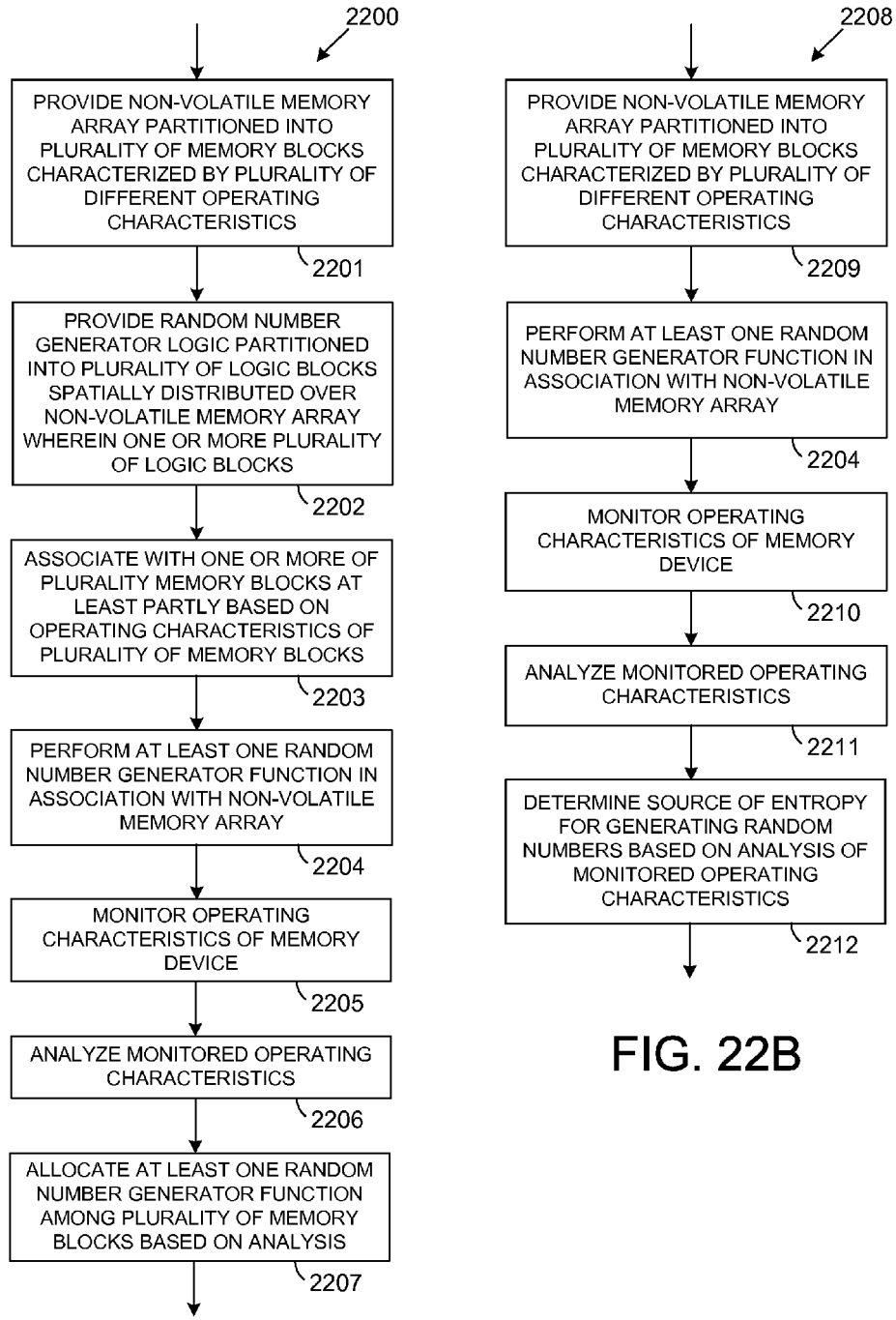

The illustrative method 2200, depicted in FIG. 22A, of operating a memory device can further include providing 2201 the non-volatile memory array partitioned into a plurality of memory blocks characterized by a plurality of different operating characteristics, and providing 2202 the random number generator logic partitioned into a plurality of logic blocks spatially distributed over the non-volatile memory array wherein one or more of the plurality of logic blocks are associated 2203 with one or more of the plurality of memory blocks at least partly based on the operating characteristics of the plurality of memory blocks. Performing 2204 at least one random number generator function in association with the non-volatile memory array can include monitoring 2205 operating characteristics of the memory device, analyzing 2206 the monitored operating characteristics, and allocating 2207 at least one random number generator function among the plurality of memory blocks based on the analysis.

As shown in FIG. 22B, an embodiment of the method 2208 of operating a memory device can further include providing 2209 the non-volatile memory array partitioned into a plurality of memory blocks characterized by a plurality of different operating characteristics. Performing 2204 at least one random number generator function in association with the non-volatile memory array can include monitoring 2210 operating characteristics of the memory device, analyzing 2211 the monitored operating characteristics, and determining 2212 a source of entropy for generating random numbers based on the analysis of the monitored operating characteristics.

Figures 22C, 22D:
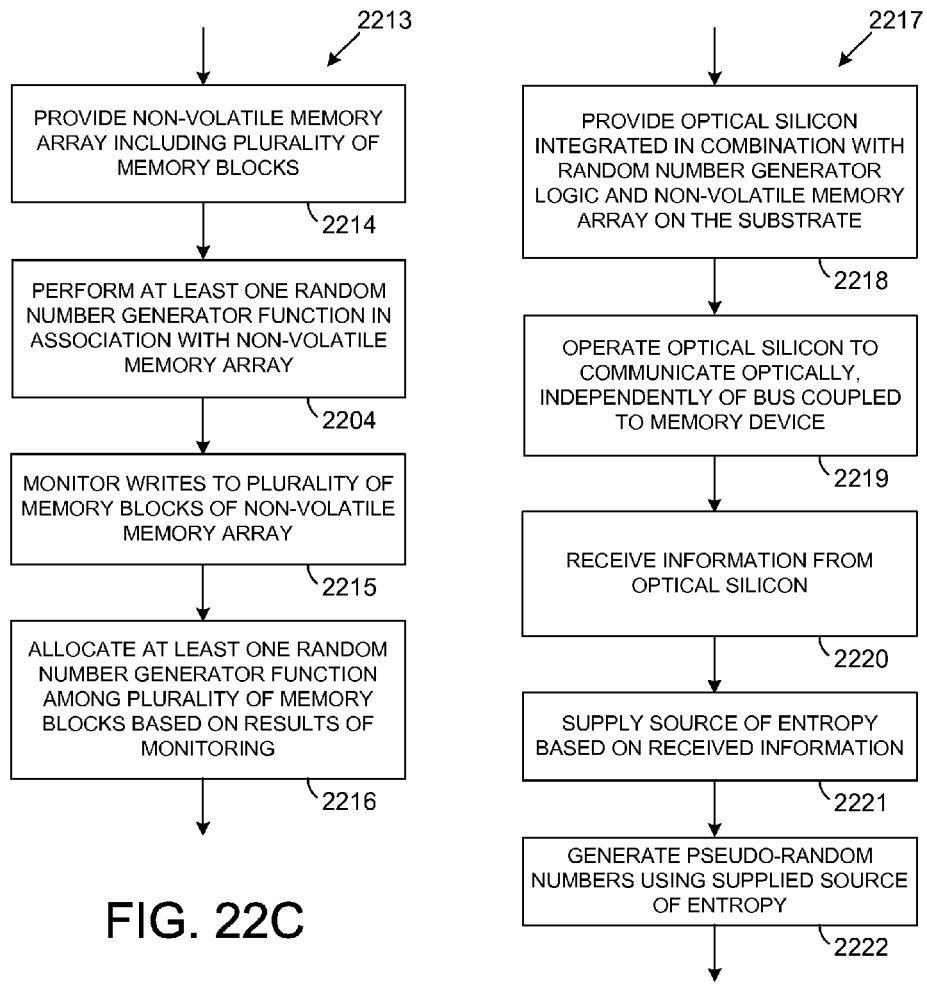

Referring to FIG. 22C, in some embodiments, the method 2213 of operating a memory device can further include providing 2214 the non-volatile memory array including a plurality of memory blocks. Performing 2204 at least one random number generator function in association with the non-volatile memory array can include monitoring 2215 writes to the plurality of memory blocks of the non-volatile memory array, and allocating 2216 at least one random number generator function among the plurality of memory blocks based on results of the monitoring.

In further embodiments and/or applications, as shown in FIG. 22D, the method 2217 of operating a memory device can further include providing 2218 optical silicon integrated in combination with the random number generator logic and the non-volatile memory array on the substrate, and operating 2219 the optical silicon to communicate optically, independently of a bus coupled to the memory device. Operating 2219 the random number generator logic can include receiving 2220 information from the optical silicon, supplying 2221 a source of entropy based on the received information, and generating 2222 random numbers using the supplied source of entropy.

In various embodiments, a memory device with integrated logic and memory can be integrated into a product. For example, the memory device can be integrated to a product in the form of a security device for securing an item such as a home, an automobile, or any other item of value. The memory device can monitor conditions of the product autonomously of devices external to the product, while supporting updates to the memory device.

In other embodiments, the memory device can be integrated into other products, for example electronic devices, such as mobile and cell phones, notebook computers, personal digital assistants, medical devices, medical diagnostic systems, digital cameras, audio players, digital televisions, automotive and transportation engine control units, USB flash personal discs, and global positioning systems.

In other applications and/or contexts, a memory system can be formed of printed non-volatile memory on polymer. In some arrangements, a printed non-volatile memory on polymer can form flexible memories. For example, a flexible memory can be integrated with processors for further integration into any type of product, even very simple products such as bottles, cans, or packaging materials. A non-volatile memory can be integrated in a system of any suitable product such as, for example, a door handle sleeve to detect and record who, what, when, and how anyone has touched the door handle. Such a system can be used to facilitate access or to provide security. In other examples, a non-volatile memory and processor in some applications with sensors and/or a communication interface can be used in a flexible device for a medical product such as bandages or implants. These products can be formed of dissolvable materials for temporary usage, for example in biocompatible electronic or medical devices that can dissolve in a body environment, or environmental monitors and consumer electronics that can dissolve in compost. Other applications of products incorporating non-volatile memory and processor can include sporting equipment, tags such as for rental cars, patient armbands in hospitals tied to sensors, smart glasses, or any type of device.

In further embodiments, instead of a flexible polymer, the non-volatile memory and processor can be formed of silicon that is sufficiently thin to become flexible and thus formed as an inexpensive printed circuit component. Flexible memory in ubiquitous items, using polymer memory or silicon memory, can enable various profitable services, for example in conjunction with medical devices, security services, automotive products, and the like.

In embodiments of the memory device with processing capability of logic integrated in a distributed manner with non-volatile memory, the processing capability can be implemented with relatively low speed requirement to enable processors to be available in a ubiquitous manner. Accordingly, information can be acquired in a dispersed manner and intercommunicated over vast systems. Thus processors can be inexpensive and memory readily available for various consumer items. Custom versions of memory including non-volatile memory and RAM can be integrated into virtually any product, enabling widespread preprocessing in items such as door handles to determine who has accessed a location and how the access was made to allow any type of processing on the information.

Modules, logic, circuitry, hardware and software combinations, firmware, or so forth may be realized or implemented as one or more general-purpose processors, one or more processing cores, one or more special-purpose processors, one or more microprocessors, at least one Application-Specific Integrated Circuit (ASIC), at least one Field Programmable Gate Array (FPGA), at least one digital signal processor (DSP), some combination thereof, or so forth that is executing or is configured to execute instructions, a special-purpose program, an application, software, code, some combination thereof, or so forth as at least one special-purpose computing apparatus or specific computing component. One or more modules, logic, or circuitry, etc. may, by way of example but not limitation, be implemented using one processor or multiple processors that are configured to execute instructions (e.g., sequentially, in parallel, at least partially overlapping in a time-multiplexed fashion, at least partially overlapping across multiple cores, or a combination thereof, etc.) to perform a method or realize a particular computing machine. For example, a first module may be embodied by a given processor executing a first set of instructions at or during a first time, and a second module may be embodied by the same given processor executing a second set of instructions at or during a second time. Moreover, the first and second times may be at least partially interleaved or overlapping, such as in a multi-threading, pipelined, or predictive processing environment. As an alternative example, a first module may be embodied by a first processor executing a first set of instructions, and a second module may be embodied by a second processor executing a second set of instructions. As another alternative example, a particular module may be embodied partially by a first processor executing at least a portion of a particular set of instructions and embodied partially by a second processor executing at least a portion of the particular set of instructions. Other combinations of instructions, a program, an application, software, or code, etc. in conjunction with at least one processor or other execution machinery may be utilized to realize one or more modules, logic, or circuitry, etc. to implement any of the processing algorithms described herein.

Those having ordinary skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those having ordinary skill in the art will recognize that optical aspects of implementations will typically employ optically-oriented hardware, software, and or firmware.

In some implementations described herein, logic and similar implementations may include software or other control structures suitable to operation. Electronic circuitry, for example, may manifest one or more paths of electrical current constructed and arranged to implement various logic functions as described herein. In some implementations, one or more media are configured to bear a device-detectable implementation if such media hold or transmit a special-purpose device instruction set operable to perform as described herein. In some variants, for example, this may manifest as an update or other modification of existing software or firmware, or of gate arrays or other programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or otherwise invoking circuitry for enabling, triggering, coordinating, requesting, or otherwise causing one or more occurrences of any functional operations described above. In some variants, operational or other logical descriptions herein may be expressed directly as source code and compiled or otherwise invoked as an executable instruction sequence. In some contexts, for example, C++ or other code sequences can be compiled directly or otherwise implemented in high-level descriptor languages (e.g., a logic-synthesizable language, a hardware description language, a hardware design simulation, and/or other such similar mode(s) of expression). Alternatively or additionally, some or all of the logical expression may be manifested as a Verilog-type hardware description or other circuitry model before physical implementation in hardware, especially for basic operations or timing-critical applications. Those having ordinary skill in the art will recognize how to obtain, configure, and optimize suitable transmission or computational elements, material supplies, actuators, or other common structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those having ordinary skill in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those having ordinary skill in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those having ordinary skill in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electromagnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those having ordinary skill in the art will also appreciate that examples of electro-mechanical systems include but are not limited to a variety of consumer electronics systems, medical devices, as well as other systems such as motorized transport systems, factory automation systems, security systems, and/or communication/computing systems. Those having ordinary skill in the art will recognize that electro-mechanical as used herein is not necessarily limited to a system that has both electrical and mechanical actuation except as context may dictate otherwise.

In a general sense, those having ordinary skill in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those having ordinary skill in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those having ordinary skill in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems. Those having ordinary skill in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, applications programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems.

Specific examples of such components entail such as Intel Corporation's and/or Crossbow Corporation's mote components and supporting hardware, software, and/or firmware.

Those having ordinary skill in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory). A sale of a system or method may likewise occur in a territory even if components of the system or method are located and/or used outside the territory. Further, implementation of at least part of a system for performing a method in one territory does not preclude use of the system in another territory.

One of ordinary skill in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Those having ordinary skill in the art will appreciate that a user may be representative of a human user, a robotic user (e.g., computational entity), and/or substantially any combination thereof (e.g., a user may be assisted by one or more robotic agents) unless context dictates otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those having ordinary skill in the art will recognize that "configured to" can generally encompass active-state components and/or inactive-state components and/or standby-state components, unless context requires otherwise. While particular aspects of the present subject matter described herein have been shown and described, it will be apparent to those having ordinary skill in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those having ordinary skill in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms. For example, the phrase "A or B" will be typically understood to include the possibilities of "A" or "B" or "A and B."

With respect to the appended claims, those having ordinary skill in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A memory device comprising:
   a substrate;
   a non-volatile memory array integrated on the substrate, wherein the non-volatile memory array is partitioned into a plurality of memory blocks; and
   random number generator logic integrated with the non-volatile memory array on the substrate, the random number generator logic operable to perform at least one random number generator function in association with the non-volatile memory array partitioned into a plurality of logic blocks spatially distributed over the non-volatile memory array wherein one or more of the plurality of logic blocks are associated with one or more of the plurality of memory blocks.

2. The memory device according to claim 1 wherein:
   the random number generator logic operable to perform at least one random number generator function in association with the non-volatile memory array is operable to supply a source of entropy for generating random numbers.

3. The memory device according to claim 1 wherein:
   the non-volatile memory array includes a plurality of non-volatile memory segments characterized by a respective plurality of non-volatile memory types; and
   the random number generator logic operable to perform at least one random number generator function in association with the non-volatile memory array is operable to use the plurality of non-volatile memory segments characterized by the respective plurality of non-volatile memory types to supply a source of entropy for generating random numbers.

4. The memory device according to claim 1 further comprising:
   at least one sensor operable to detect at least one operating condition, wherein:
   the random number generator logic operable to perform at least one random number generator function in association with the non-volatile memory array is operable to use the at least one operating condition to supply a source of entropy for generating random numbers.

5. The memory device according to claim 1 further comprising:
   at least one sensor operable to detect at least one operating condition, wherein:
   the random number generator logic operable to perform at least one random number generator function in association with the non-volatile memory array is operable to monitor the at least one operating condition, monitor memory accesses, analyze the monitored at least one operating condition and memory accesses, and determine a source of entropy for generating random numbers based on the analysis of the monitored at least one operating condition and memory accesses.

6. The memory device according to claim 1 wherein:
   the non-volatile memory array includes at least in part lossy memory; and
   the random number generator logic operable to perform at least one random number generator function in association with the non-volatile memory array is operable use the lossy memory to supply a source of entropy for generating random numbers.

7. The memory device according to claim 1 wherein:
   the random number generator logic operable to perform at least one random number generator function in association with the non-volatile memory array is operable to access a time signal and determine a source of entropy for generating random numbers based on the time signal.

8. The memory device according to claim 1 wherein:
   the random number generator logic operable to perform at least one random number generator function in association with the non-volatile memory array is operable to access a time signal, monitor memory accesses referenced by the time signal, and determine a source of entropy for generating random numbers based on the time signal and the memory accesses referenced by the time signal.

9. The memory device according to claim 1 wherein:
   the random number generator logic operable to perform at least one random number generator function in association with the non-volatile memory array is operable to monitor phenomena detectable at the memory device and determine a source of entropy for generating random numbers based on the monitored phenomena.

10. The memory device according to claim 1 wherein:
    the random number generator logic operable to perform at least one random number generator function in association with the non-volatile memory array is operable to accumulate and communicate information about phenomena associated with use of the memory device and determine a source of entropy for generating random numbers based on the monitored phenomena.

11. The memory device according to claim 1 wherein:
    the random number generator logic operable to perform at least one random number generator function in association with the non-volatile memory array is operable to accumulate and communicate information about phenomena associated with at least one entity in association with the memory device and determine a source of entropy for generating random numbers based on the monitored phenomena.

12. The memory device according to claim 1 wherein:

the random number generator logic operable to perform at least one random number generator function in association with the non-volatile memory array is operable to supply a seed for a pseudo-random number generator in association with the non-volatile memory array.

13. The memory device according to claim 1 wherein:

the non-volatile memory array includes a plurality of non-volatile memory segments characterized by a respective plurality of non-volatile memory types; and the random number generator logic operable to perform at least one random number generator function in association with the non-volatile memory array is operable to supply a seed for a pseudo-random number generator in association with the plurality of non-volatile memory segments characterized by the respective plurality of non-volatile memory types.

14. The memory device according to claim 1 further comprising:

encryption logic integrated with the non-volatile memory array on the substrate, the encryption logic operable to perform at least one encryption/decryption function associated with the non-volatile memory array.

15. The memory device according to claim 1 further comprising:

encryption logic integrated with the non-volatile memory array on the substrate, the encryption logic operable to perform at least one encryption/decryption function associated with the non-volatile memory array that increases throughput of encryption-type operations in combination with a device external to the memory device.

16. The memory device according to claim 1 further comprising:

encryption logic integrated with the non-volatile memory array on the substrate, the encryption logic operable to perform at least one encryption/decryption function associated with the non-volatile memory array that secures at least one encryption key from access by a device external to the memory device.

17. The memory device according to claim 1 further comprising:

hash logic integrated with the non-volatile memory array on the substrate, the hash logic operable to perform a hash function using randomness supplied by the random number generator logic.

18. The memory device according to claim 1 further comprising:

searching logic integrated with the non-volatile memory array on the substrate, the searching logic operable to perform amortized searching using randomness supplied by the random number generator logic.

19. The memory device according to claim 1 further comprising:

sorting logic integrated with the non-volatile memory array on the substrate, the sorting logic operable to perform data sorting using randomness supplied by the random number generator logic.

20. The memory device according to claim 1 further comprising:

sorting logic integrated with the non-volatile memory array on the substrate, the sorting logic operable to monitor a history and pattern of memory accesses and perform sorting during system idle.

21. The memory device according to claim 1 further comprising:

a bus integrated with the encryption logic and the non-volatile memory array on the substrate, the bus operable to transmit encrypted information between the memory device and a device external to the memory device.

22. The memory device according to claim 1 wherein:

the random number generator logic operable to perform at least one random number generator function in association with the non-volatile memory array is operable to perform at least one random number generator function independently of signals external to the memory device.

23. The memory device according to claim 1 wherein:

the random number generator logic operable to perform at least one random number generator function in association with the non-volatile memory array is configured with functionality selectively distributed across the non-volatile memory array.

24. The memory device according to claim 1 wherein:

the random number generator logic operable to perform at least one random number generator function in association with the non-volatile memory array is operable to receive a report on at least one operating condition of system performance at system bootstrap loading and allocate functionality of one or more of the plurality of logic blocks with one or more of the plurality of memory blocks based on the report.

25. The memory device according to claim 1 further comprising:

optical silicon operable to communicate optically, independently of a bus coupled to the memory device wherein:

the random number generator logic operable to perform at least one random number generator function in association with the non-volatile memory array is operable to receive information from the optical silicon and determine a source of entropy for generating random numbers based on the received information.

26. The memory device according to claim 1 wherein:

the non-volatile memory array partitioned into a plurality of memory blocks includes at least one memory technology of flash, embedded flash, read-only memory (ROM), electrical fuse (one-time programmable), CMOS floating gate (multiple time programmable), CMOS floating gate (one-time programmable), anti-fuse (one-time programmable), phase-change memory (PCRAM), spin-torque transfer (STT) magneto-resistive RAM (M-RAM), or ferroelectric RAM (FRAM).

27. A memory device comprising:

a substrate;

a non-volatile memory array integrated on the substrate, wherein the non-volatile memory array is partitioned into a plurality of memory blocks; and random number generator logic integrated with the non-volatile memory array on the substrate, the random number generator logic operable to perform at least one random number generator function in association with the non-volatile memory array including monitoring memory accesses, determining statistics on type and number of instructions of the monitored memory accesses, and allocating at least one random number generator function among the plurality of memory blocks based on the determined statistics.

28. A memory device comprising:

a substrate;

a non-volatile memory array integrated on the substrate, wherein the non-volatile memory array is partitioned into a plurality of memory blocks characterized by a plurality of different operating characteristics; and random number generator logic integrated with the non-volatile memory array on the substrate, the random number generator logic operable to perform at least one random number generator function in association with the non-volatile memory array partitioned into a plurality of logic blocks spatially distributed over the non-volatile memory array wherein one or more of the plurality of logic blocks are associated with one or more of the plurality of memory blocks at least partly based on the operating characteristics of the plurality of memory blocks.

29. The memory device according to claim 28 wherein:
the random number generator logic operable to perform at least one random number generator function in association with the non-volatile memory array is operable to monitor operating characteristics of the memory device, analyze the monitored operating characteristics, and allocate at least one random number generator function among the plurality of memory blocks based on the analysis.

30. The memory device according to claim 28 wherein:
the random number generator logic operable to perform at least one random number generator function in association with the non-volatile memory array is operable to monitor operating characteristics of the memory device, analyze the monitored operating characteristics, and determine a source of entropy for generating random numbers based on the analysis of the monitored operating characteristics.

31. A memory device comprising:
a substrate;
a non-volatile memory array integrated on the substrate, wherein the non-volatile memory array includes a plurality of memory blocks; and
random number generator logic integrated with the non-volatile memory array on the substrate, the random number generator logic operable to perform at least one random number generator function in association with the non-volatile memory array including monitoring writes to the plurality of memory blocks of the non-volatile memory array and allocating at least one random number generator function among the plurality of memory blocks based on results of the monitoring.

32. A method of manufacturing a memory device comprising:
forming a non-volatile memory array on a substrate;
partitioning the non-volatile memory array into a plurality of memory blocks;
integrating random number generator logic in combination with the non-volatile memory array on the substrate, the random number generator logic operable to perform at least one random number generator function in association with the non-volatile memory array; and
partitioning the random number generator logic into a plurality of logic blocks spatially distributed over the non-volatile memory array wherein one or more of the plurality of logic blocks are associated with one or more of the plurality of memory blocks.

33. The method of manufacturing the memory device according to claim 32 further comprising:
forming a plurality of non-volatile memory segments characterized by a respective plurality of non-volatile memory types in the non-volatile memory array; and
integrating the random number generator logic in combination with the non-volatile memory array on the substrate that is operable to use a plurality of non-volatile memory segments characterized by a respective plurality of non-volatile memory types to supply a source of entropy for generating random numbers.

34. The method of manufacturing the memory device according to claim 32 further comprising:
forming a plurality of non-volatile memory segments characterized by a respective plurality of non-volatile memory types in the non-volatile memory array; and
integrating the random number generator logic in combination with the non-volatile memory array on the substrate that is operable to supply a seed for a pseudo-random number generator in association with a plurality of non-volatile memory segments characterized by a respective plurality of non-volatile memory types.

35. The method of manufacturing the memory device according to claim 32 further comprising:
coupling at least one sensor operable to detect at least one operating condition to the memory device; and
integrating the random number generator logic in combination with the non-volatile memory array on the substrate that is operable use the at least one operating condition to supply a source of entropy for generating random numbers.

36. An information processing system comprising:
means for storing information including random number generator logic integrated in combination with a non-volatile memory array on a substrate;
means for partitioning the non-volatile memory array into a plurality of memory blocks;
means for performing at least one random number generator function in association with the non-volatile memory array; and
means for partitioning the random number generator logic into a plurality of logic blocks spatially distributed over the non-volatile memory array wherein one or more of the plurality of logic blocks are associated with one or more of the plurality of memory blocks.

* * * * *